United States Patent [19]

Arimoto et al.

[11] Patent Number: 5,481,334
[45] Date of Patent: Jan. 2, 1996

[54] IMAGE PROCESSING APPARATUS HAVING MEANS FOR DETECTING NON-VISIBLE LIGHT, AND IMAGE PROCESSING METHOD THEREFOR

[75] Inventors: Shinobu Arimoto, Yokohama; Katsuichi Shimizu, Kawasaki; Yutaka Komiya, Tokyo; Kazuo Yoshinaga, Machida; Toshio Hayashi, Kawasaki; Takehiko Nakai, Tokyo; Tsutomu Utagawa, Yokohama; Tetsuya Nagase, Kawasaki; Nobuatsu Sasanuma, Yokohama, all of Japan

[73] Assignee: Canon Kabushiki Kaisha, Tokyo, Japan

[21] Appl. No.: 139,174

[22] Filed: Oct. 21, 1993

[30] Foreign Application Priority Data

Oct. 23, 1992 [JP] Japan .................................. 4-286350

[51] Int. Cl.⁶ .................................................. G03G 21/04
[52] U.S. Cl. ................................................ 355/201; 250/556
[58] Field of Search .................................. 355/201, 133; 356/71; 250/556; 358/500

[56] References Cited

U.S. PATENT DOCUMENTS

| | | | |
|---|---|---|---|
| 4,047,033 | 9/1977 | Malmberg et al. | 250/341 |
| 4,524,276 | 6/1985 | Ohtombo | 356/71 |
| 4,739,377 | 4/1988 | Allen | 355/133 |
| 5,140,411 | 8/1992 | Haneda et al. | 358/75 |

FOREIGN PATENT DOCUMENTS

| | | | |
|---|---|---|---|
| 0342060 | 11/1989 | European Pat. Off. | |
| 4011281 | 10/1990 | Germany | |
| 2-83571 | 3/1990 | Japan | 355/201 |

*Primary Examiner*—Joan H. Pendegrass
*Attorney, Agent, or Firm*—Fitzpatrick, Cella, Harper & Scinto

[57] ABSTRACT

A specified original that is not supposed to be copied is marked with a pattern that is formed by infrared reflected light. A copying apparatus includes a detecting unit for detecting the pattern and determines that an original is the specified original in accordance with the detection by the detecting unit. A copying operation is controlled in accordance with the determination of whether the original is the specified original that is not supposed to be copied.

22 Claims, 47 Drawing Sheets

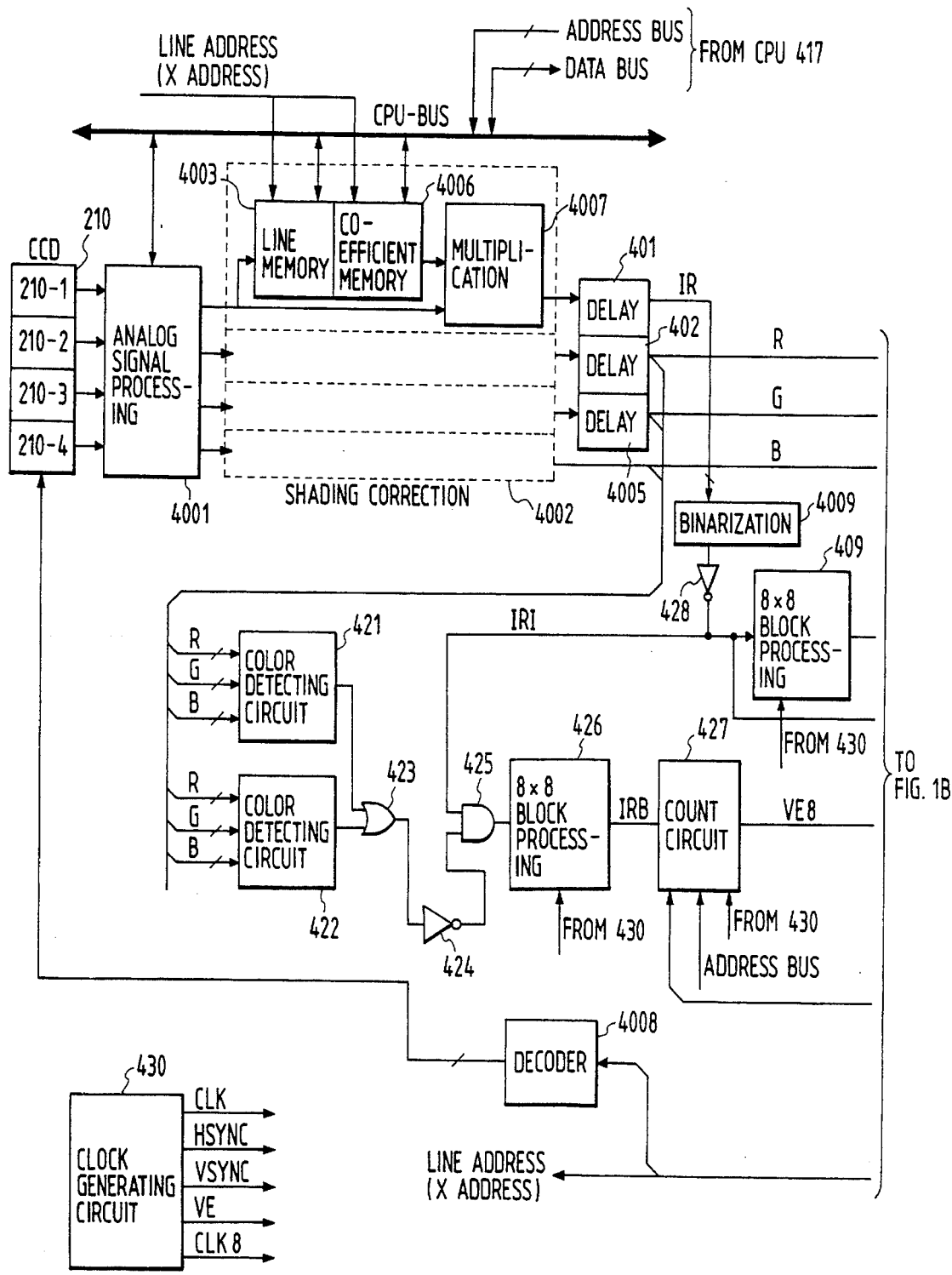

FIG. 3

| | IMAGE SCANNER | PRINTER | |
|---|---|---|---|
| FIRST SCAN | MODE 1 DETECTION OF ROUGH POSITION OF INFRARED MARK | MAGENTA OUTPUT | DETECTION OF HINDERANCE ACTION AGAINST DETECTING OPERATION OF INFRARED RECOGNITION MARK |
| SECOND SCAN | MODE 2 EXTRACTION AND DETERMINATION OF INFRARED MARK | CYAN OUTPUT | |
| THIRD AND FOURTH SCAN | MODE 3 PREVENTION PROCESS OF FORGERY | YELLOW OUTPUT BLACK OUTPUT | |

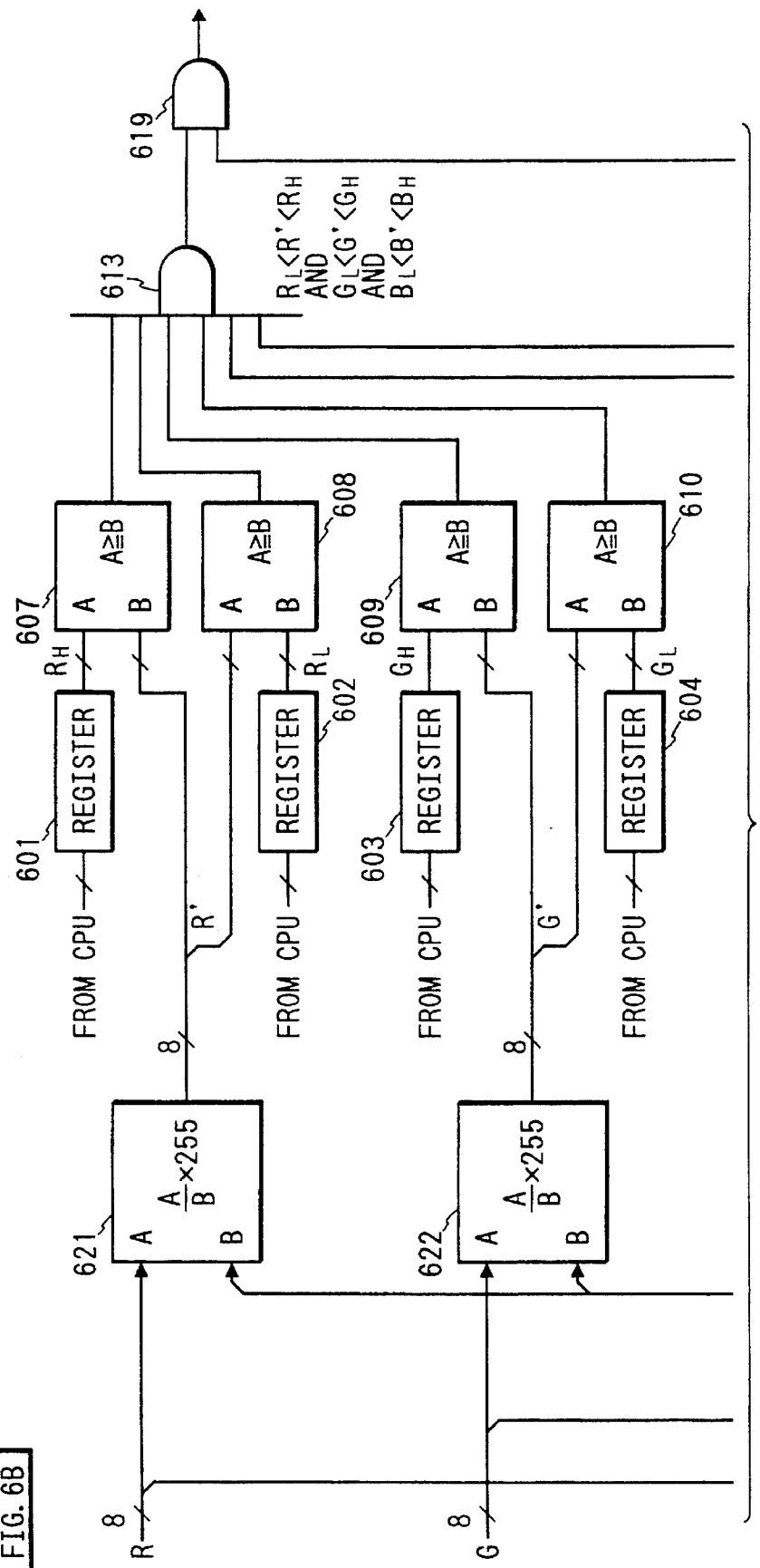

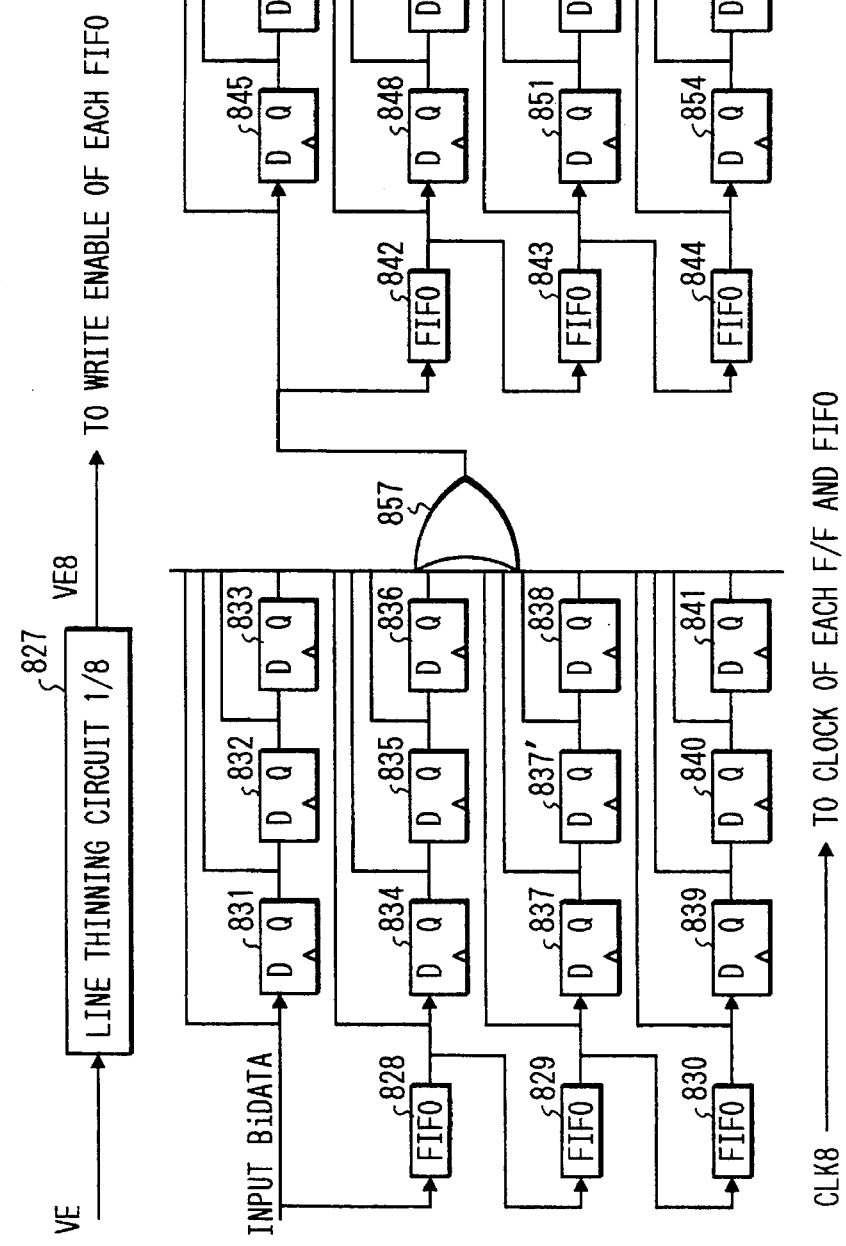

FIG. 12
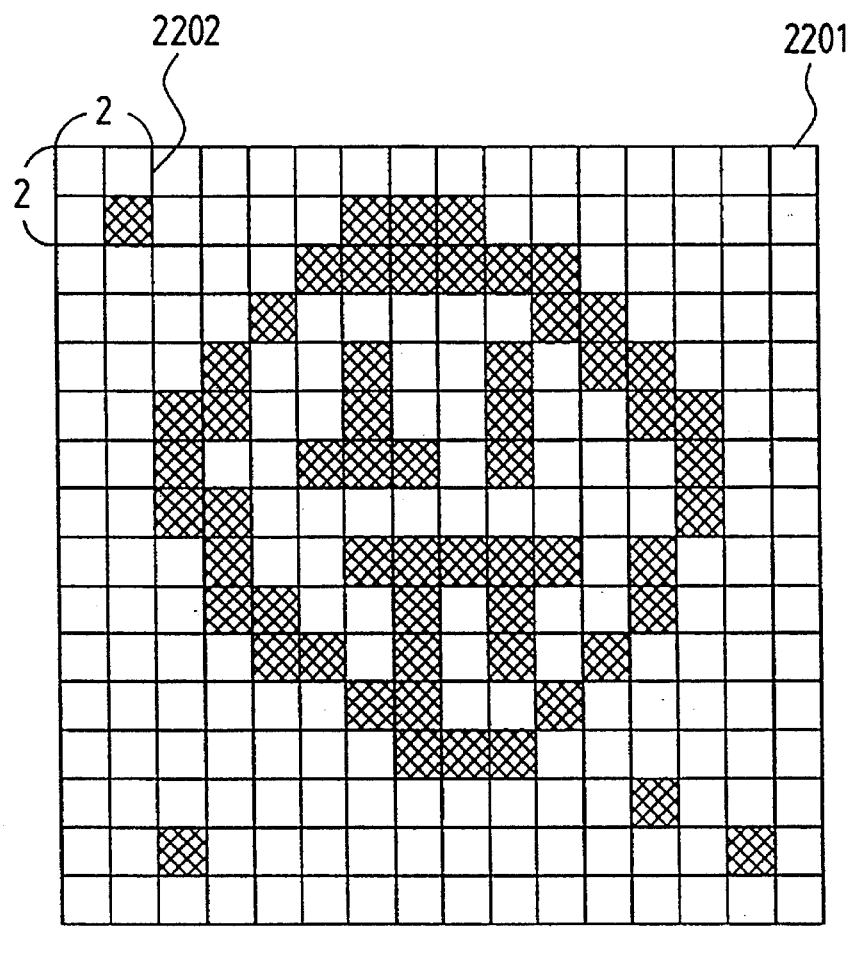
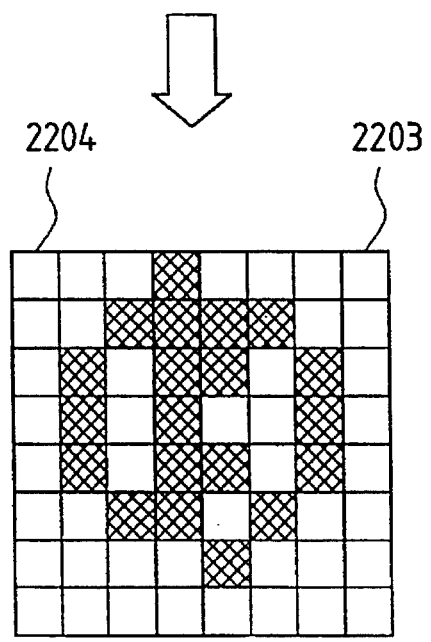

EXTRACTED SPECIFIED PORTION

STANDARD PATTERN WHEN NOT ROTATED

MAIN SCAN DIRECTION

FIG. 23A
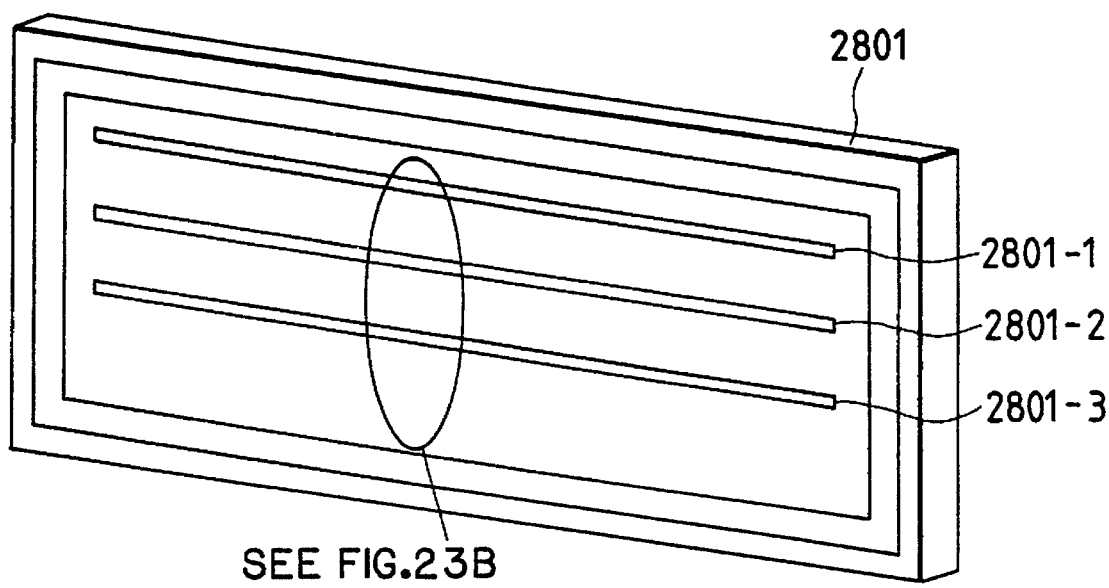
SEE FIG.23B
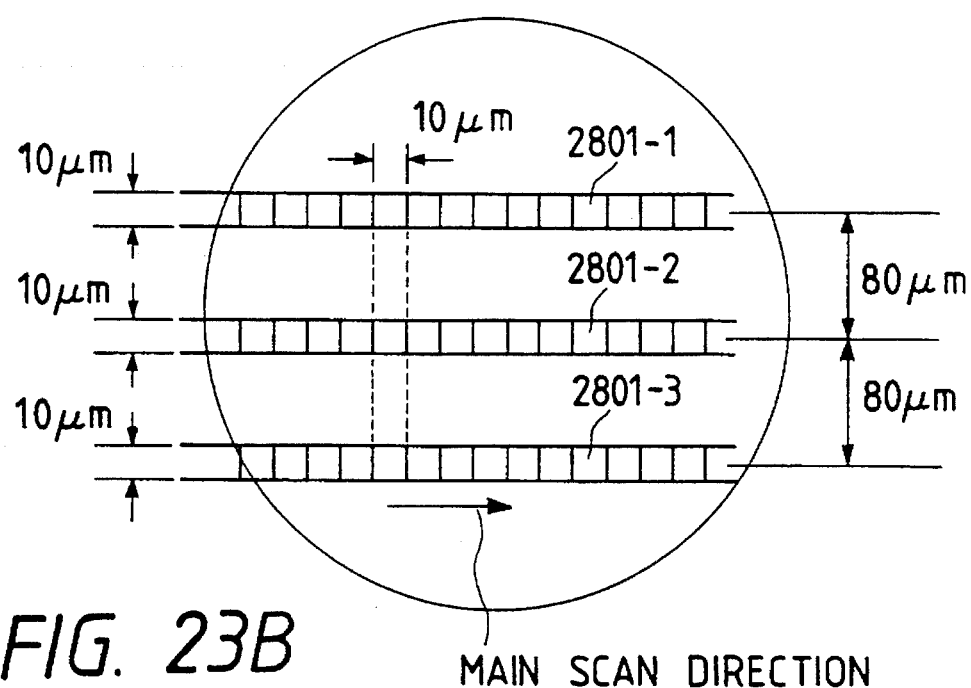
FIG. 23B

FIG. 24A
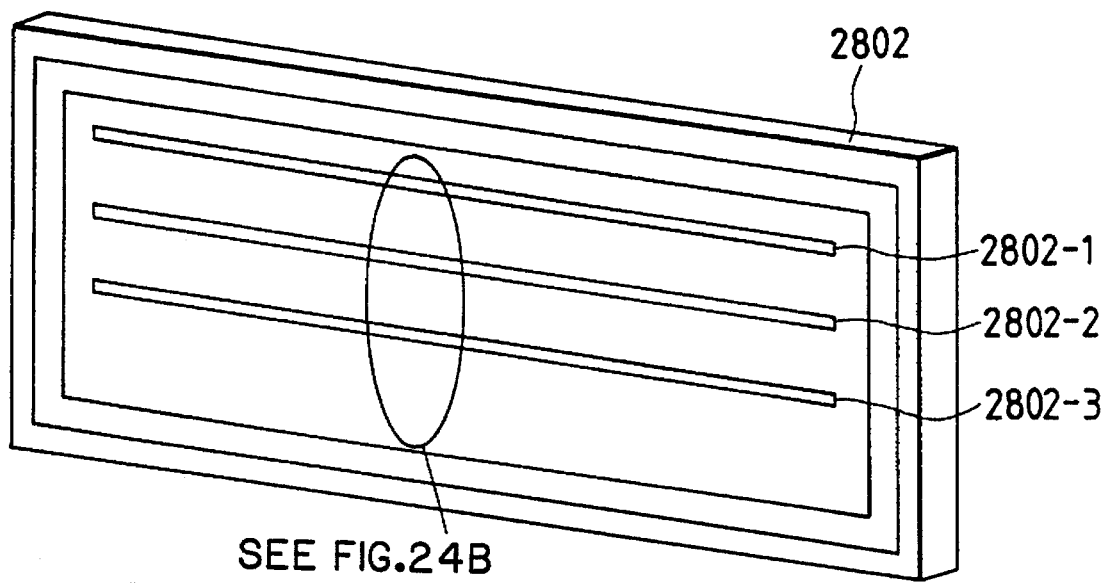
SEE FIG.24B
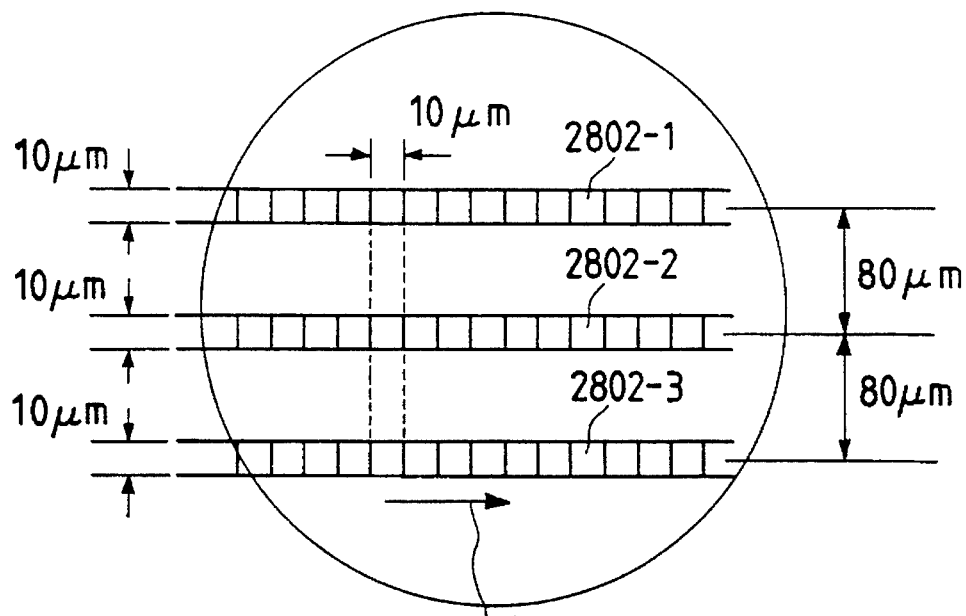
FIG. 24B   MAIN SCAN DIRECTION

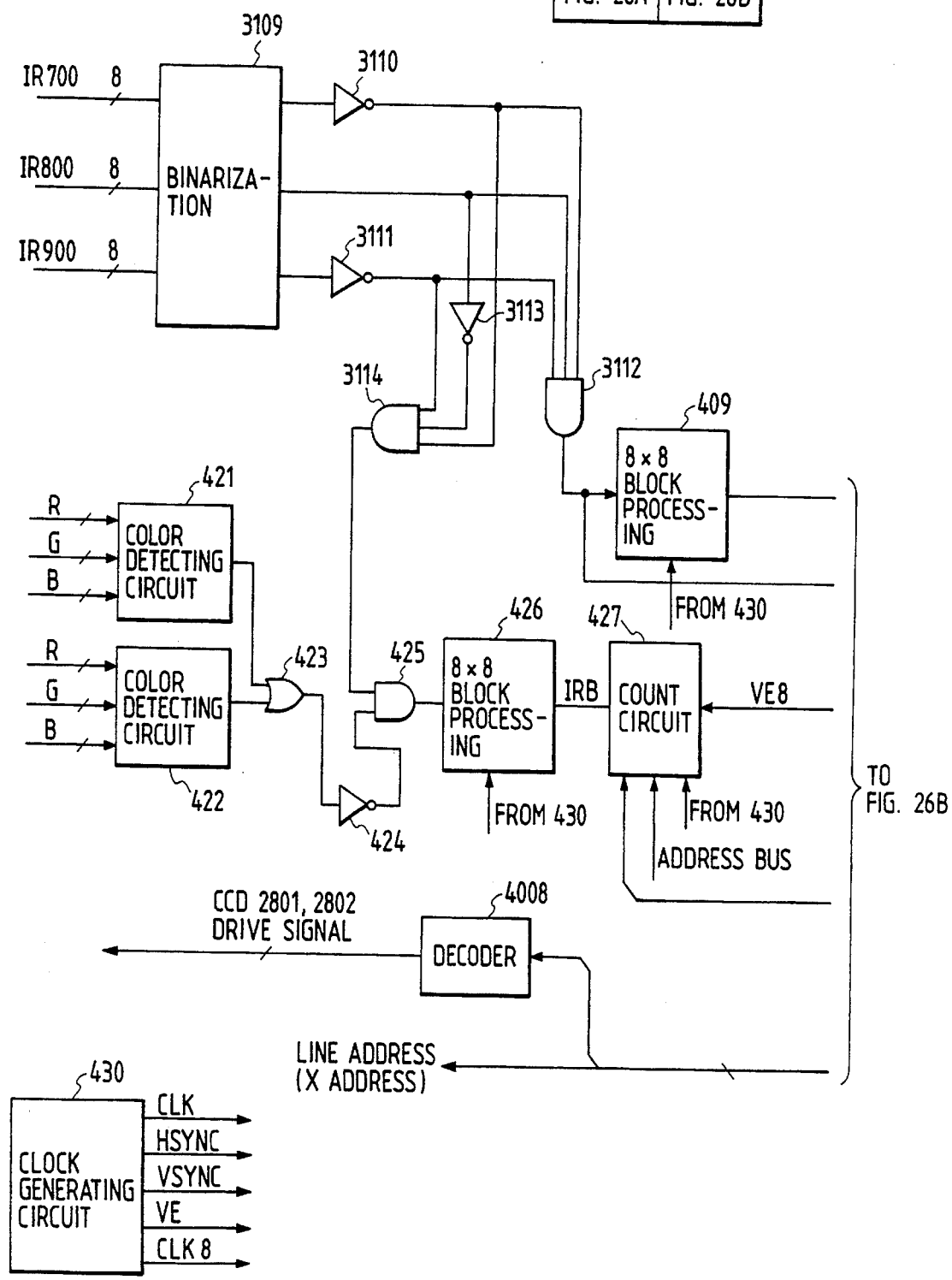

| FIG. 28A | FIG. 28B |

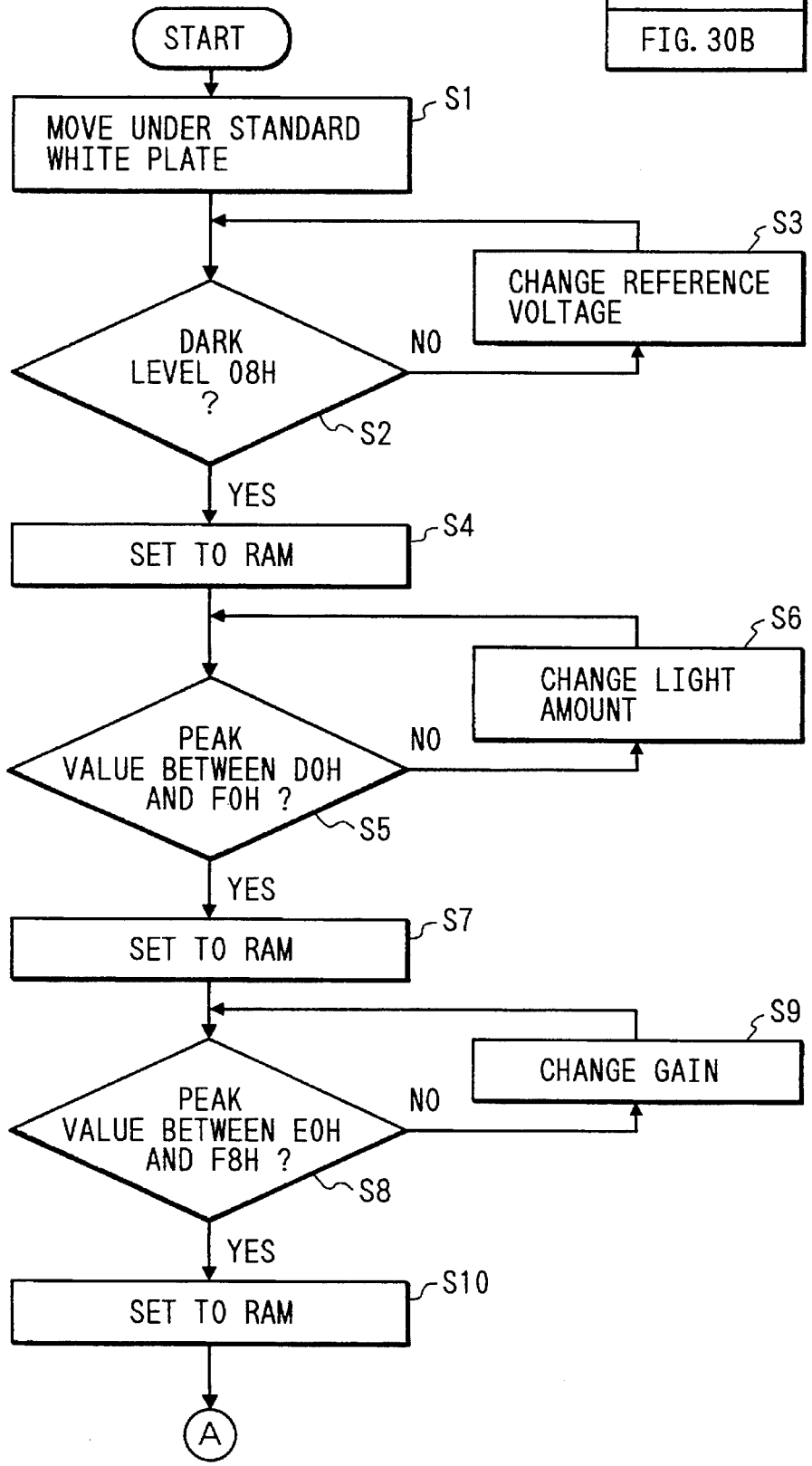

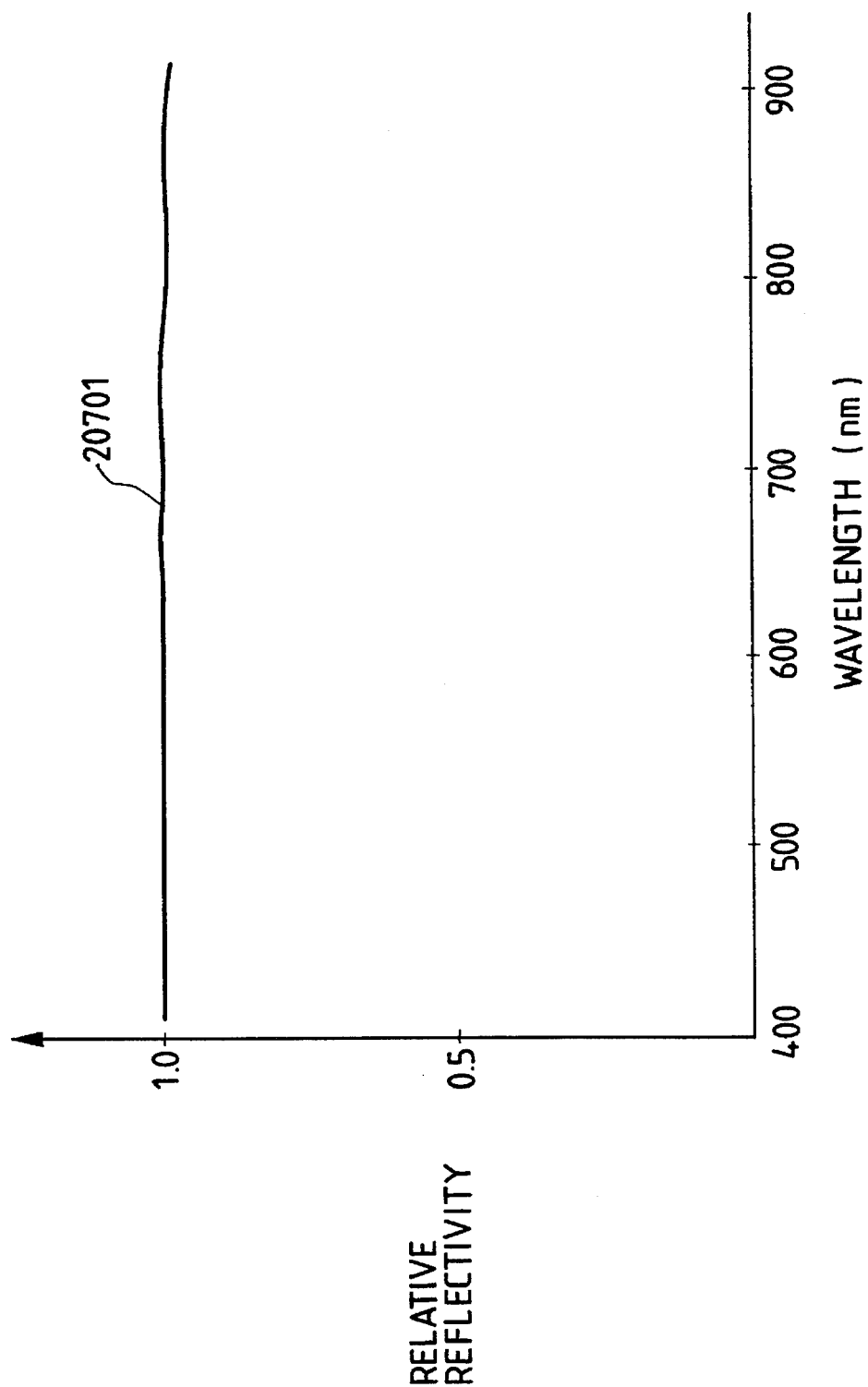

MAIN SCAN DIRECTION

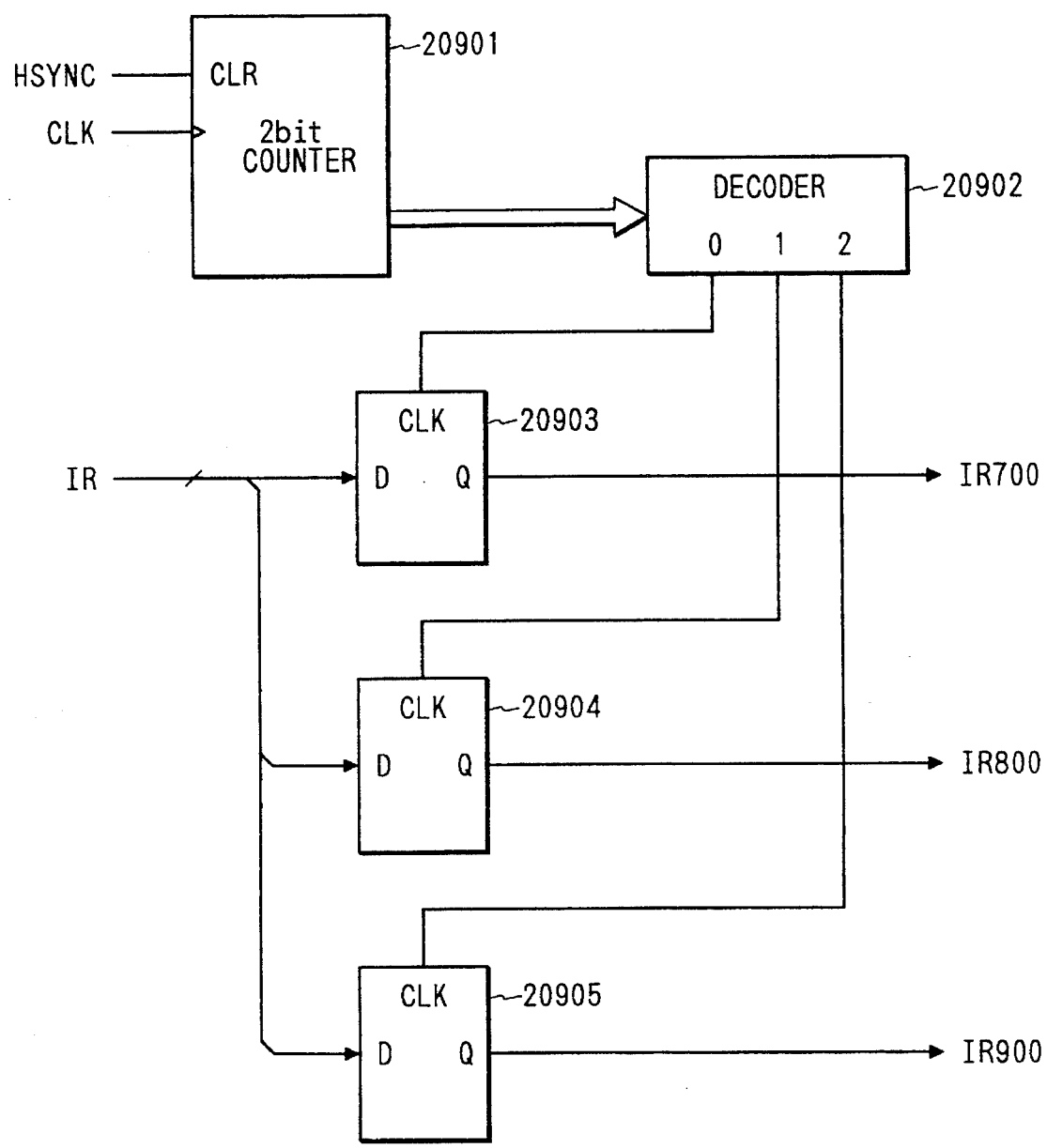

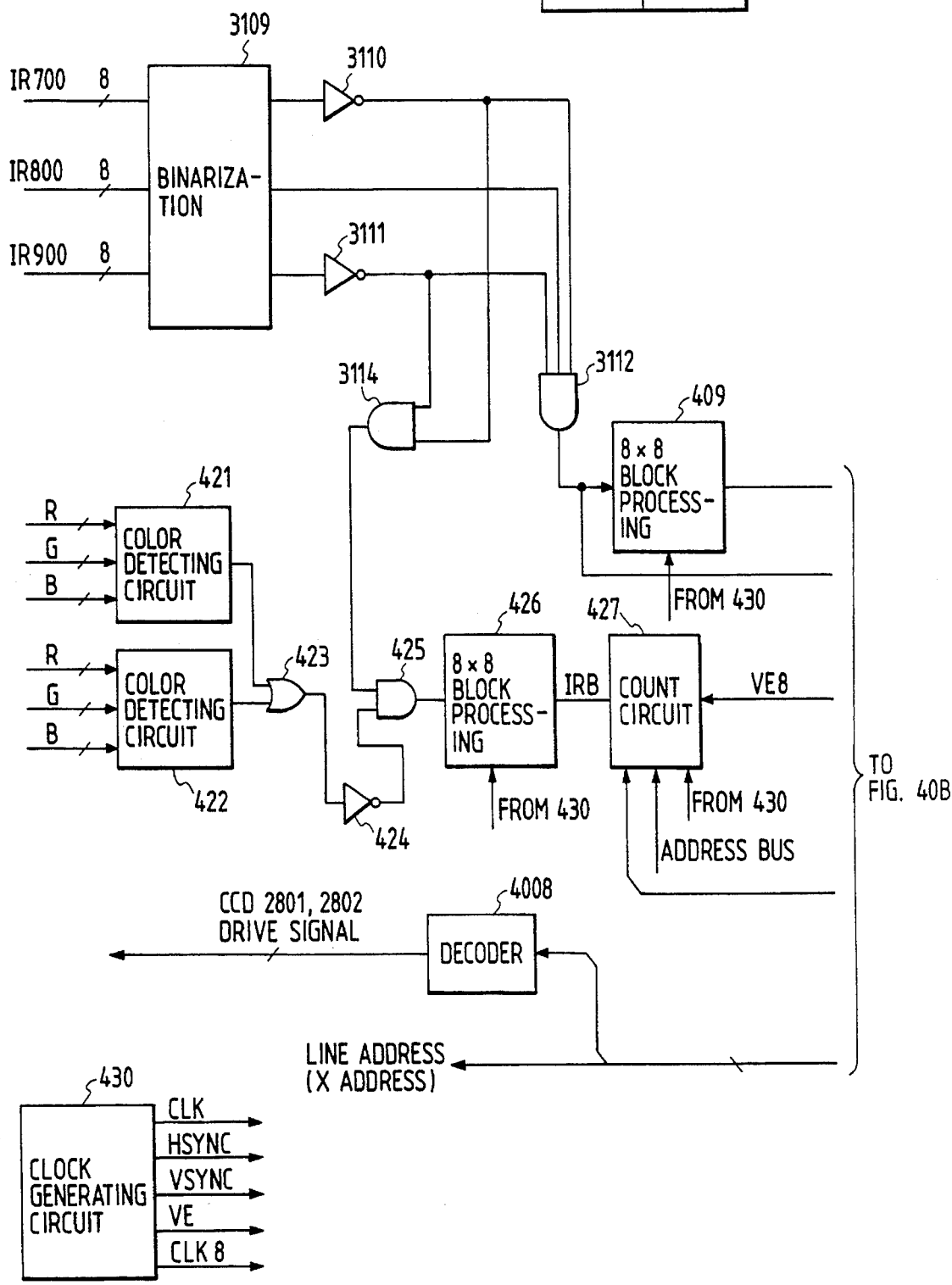

5,481,334

IMAGE PROCESSING APPARATUS HAVING MEANS FOR DETECTING NON-VISIBLE LIGHT, AND IMAGE PROCESSING METHOD THEREFOR

BACKGROUND OF THE INVENTION

1. Field of the Invention

The present invention relates to an image processing apparatus having a function of determining a specified original.

2. Related Background Arts

Various schemes have been devised to recognize specified originals.

A scheme for recognizing that the image pattern of an original is formed by a line drawing and a scheme for recognizing the color tone of an image original have also been proposed.

In addition, according to still another scheme, a specified original is also determined such that an infrared absorption ink is printed on the original, and an infrared ray is radiated on this original to detect the absorption rate.

When such a scheme is applied to, e.g., a copying machine, however, it is difficult to detect a specified original which forms an arbitrary angle with an arbitrary position on the original table of the copying machine. As a result, it is difficult to prevent a copying action of such an original.

Even if the line drawing information or the color tone of an original is detected, originals exhibiting the same characteristics as those of a specified original may be included in general originals. As a result, there is a possibility of erroneously determining a general original as a copy-prohibited original.

When infrared absorption of an original is detected, and image processing is performed as a result of the detection result, it is not determined whether an infrared absorbing material that is detected is a material purposely attached to indicate a specified original or accidentally attached to a general original, because a material (e.g., a green ink) for absorbing infrared rays may be present on general originals. There is a high possibility of erroneous determination.

SUMMARY OF THE INVENTION

The present invention has been made in consideration of the above problems, and has as its object to provide a method of efficiently determining a specified original.

It is another object of the present invention to prevent a hindrance action in detecting reflected light of an infrared range so as to determine a specified original.

It is still another object of the present invention to systemize the arrangement of a determination apparatus.

It is still another object of the present invention to provide an image processing apparatus for detecting information of a plurality of wavelengths except for a visible range and determining a specified original.

It is still another object of the present invention to provide a method of determining a specified original on the basis of original information except for the visible range.

It is still another object of the present invention to provide an image processing apparatus having an image processing unit for properly determining a specified original supposed not to be copied.

In order to achieve the above objects, according a preferred aspect of the present invention, there is disclosed an image processing apparatus comprising detecting means for detecting a pattern formed by reflected light of an infrared range and control means for determining that an original is a specified original in accordance with the pattern detected by the detecting means and for controlling to output visible component data.

The above and other objects, features, and advantages of the present invention will be apparent from the following detailed description of the present invention in conjunction with the accompanying drawings.

BRIEF DESCRIPTION OF THE DRAWINGS

FIG. 3 is a table showing the detecting operation of a copy forbidden original in the first embodiment;

FIG. 12 is a view showing the thinning operation of the infrared mark according to the first embodiment;

FIG. 23 is a view showing the arrangement of an infrared CCD sensor according to the second embodiment;

FIG. 24 is a view showing the arrangement of a visible CCD sensor according to the second embodiment;

FIG. 36 is a graph showing the characteristics of a standard white plate used in this embodiment;

FIG. 38 is a block diagram of a signal separating circuit;

DETAILED DESCRIPTION OF THE PREFERRED EMBODIMENTS

<First Embodiment>

The present invention will be described with reference to a preferred embodiment of the present invention.

This embodiment exemplifies a copying apparatus, but the present invention is not limited to this. The present invention is also applicable to a variety of apparatuses such as an image scanner connected to a computer, as a matter of course.

Figure 2:
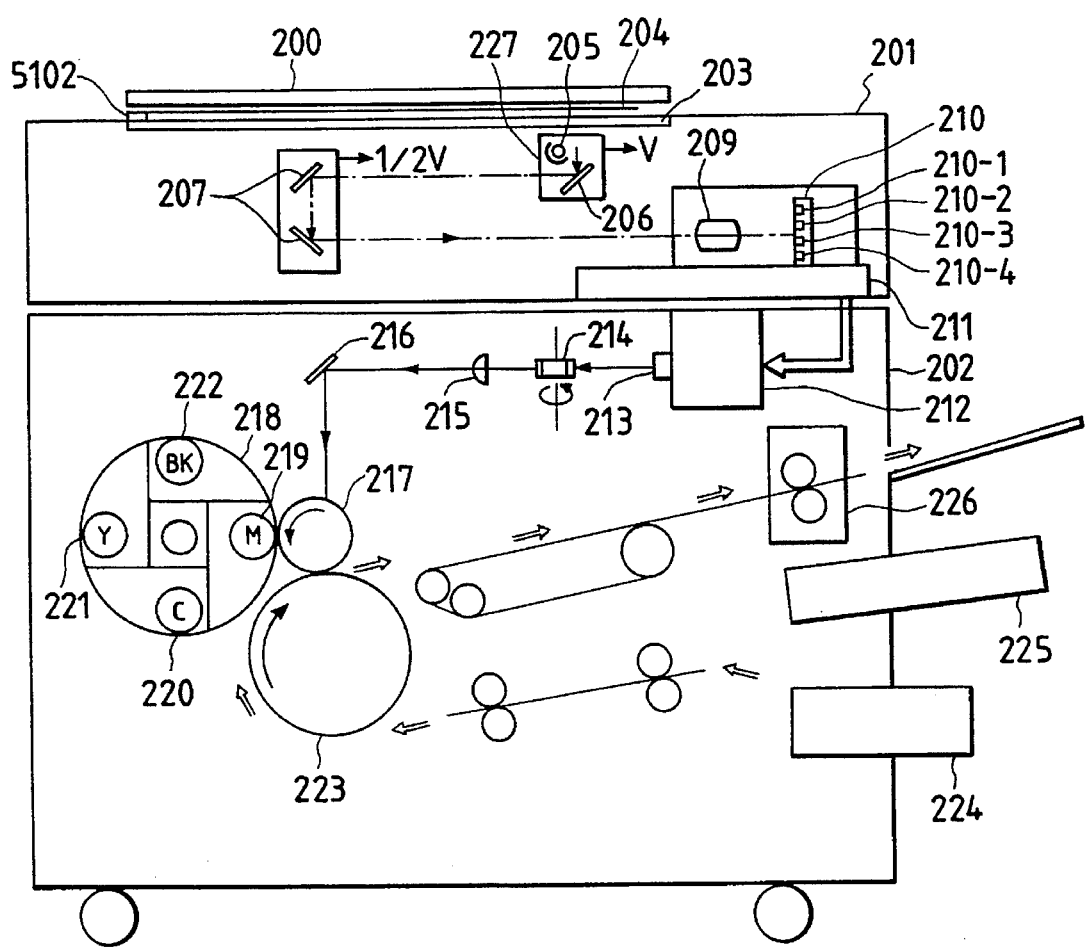
FIG. 2 is a view showing a color copying apparatus according to the first embodiment.

FIG. 2 shows the outer appearance of the apparatus of the first embodiment of the present invention.

Referring to FIG. 2, an image scanner unit 201 reads an original and performs digital processing of the read original image. A printer unit 202 prints out a full color image corresponding to the original image read by the image scanner unit 201 on a paper sheet.

The image scanner unit 201 includes a mirror surface thick plate 200. An original 204 on an original glass table (to be referred to as a platen hereinafter) 203 is illuminated with light from a halogen lamp 205. A reflector 227 is used to effectively illuminate light from the halogen lamp 205 onto the original 204. Light reflected by the original 204 is guided to mirrors 206 and 207, and an image is formed on a 4-line CCD sensor (to be referred to as a CCD hereinafter) (to be described in detail later) 210 through a lens 209. The respective line sensors generate full color information red (R), green (G), and blue (B) components based on visible light, and infrared information (IR) component based on light having a wavelength range except for the visible range. These light components are supplied to a signal processing unit 211. The halogen lamp 205 and the mirror 206 are mechanically moved at a speed V in a direction (sub scan direction) perpendicular to an electric scan direction (to be referred to as a main scan direction) of the line sensor, and the mirror 207 is moved at a speed ½ V in the same direction, thereby scanning the entire surface of the original.

A standard white plate 5102 generates correction data for correcting variations in output characteristics of the respective line sensor outputs from IR, R, G, and B line sensors 210-1 to 210-4. This standard white plate 5102 exhibits almost uniform reflection characteristics for light components ranging from visible light to infrared light, as shown in FIG. 36. The standard white plate 5102 is white in the visible range (characteristics given by a curve 20701). Using this standard white plate, output data for infrared light incident on the IR sensor as the sensor 210-1 and output data of visible sensors as the sensors 210-2 to 210-4 are corrected.

The signal processing unit 211 electrically processes the signals read by the sensors 210-1 to 210-4 and separates the input data into magenta (M), cyan (C), yellow (Y), and black (Bk) components. These components are sent to the printer unit 202. One of the M, C, Y, and Bk is sent to the printer unit 202 every original scan cycle of the image scanner unit 201. One print is obtained by four scan cycles of the original.

M, C, Y, and Bk frame-sequential image signals sent from the image scanner unit 201 are sent to a laser driver 212. The laser driver 212 modulates and drives a semiconductor laser 213 in accordance with the respective color image signals. A laser beam scans a photosensitive drum 217 through a polygon mirror 214, an f-Θ lens 215, and a mirror 216.

A rotary developing assembly 218 comprises a magenta developing unit 219, a cyan developing unit 220, a yellow developing unit 221, and a black developing unit 222. These four developing units are sequentially brought into contact with the photosensitive drum, and the M, C, Y, and Bk latent images formed on the photosensitive drum 217 are developed with the corresponding toners.

A paper sheet supplied from a paper cassette 224 or 225 is wound around a transfer drum 223, and the toner images formed on the photosensitive drum 217 are transferred to the paper sheet.

In this manner, the four colors, i.e., M, C, Y, and Bk are sequentially transferred to the paper sheet, the paper sheet passes through a fixing unit 226 and then discharged outside the copying apparatus.

The halogen lamp 205 is used to read visible information and infrared light information. The halogen lamp 205 has illumination wavelength components necessary for reading these two kinds of information. The reflector 227 is also commonly used for reading these two kinds of information. In this manner, a common illumination system is used to effectively illuminate the original with illumination light components having different wavelengths for reading visible information and infrared information.

Figure 16A:
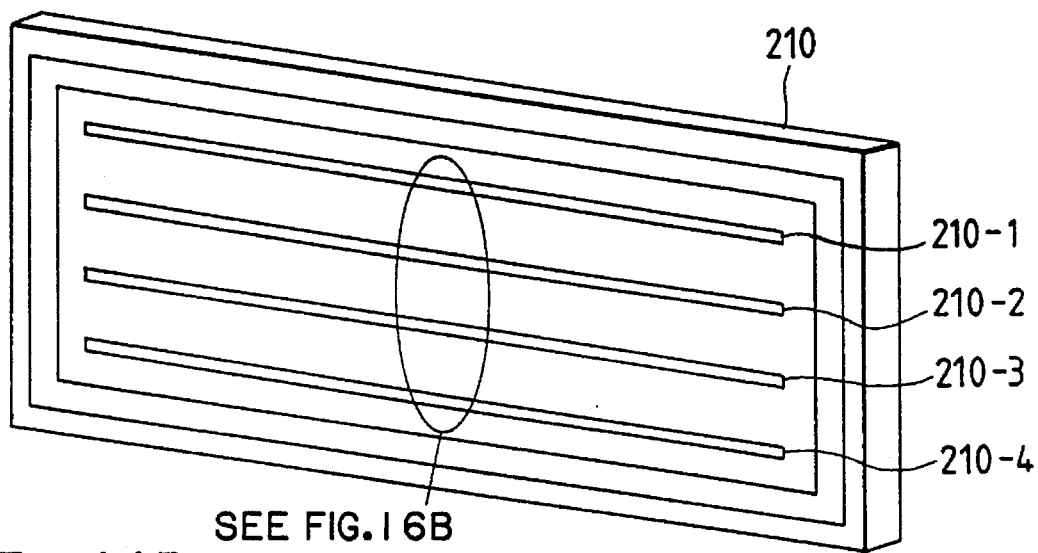
FIGS. 16A and 16B are views showing the arrangement of a CCD sensor according to the first embodiment.

FIG. 16A shows the structure of the CCD 210 used in this embodiment.

The CCD line sensor 210-1 is a light-receiving element array for reading infrared ray (IR) having wavelength characteristics except for those of visible light. The CCD line sensors 210-2, 210-3, and 210-4 are light-receiving element arrays for reading the R, G, an B wavelength components, respectively.

These four light-receiving element arrays having different optical characteristics are monolithically parallelly arranged on a single silicon chip so as to read the same line of the original.

Use of the CCD line sensors having the above structure allows a common optical system including a lens to be used to read visible light and an infrared ray. Precision of optical adjustment and the like can be improved, and the adjustment of the common optical system can be facilitated. The monolithic arrangement can eliminate a need for adjustment of the positions and orientations of the respective line sensors and makes it possible to obtain a compact apparatus and increase the integration density.

Figure 16B:
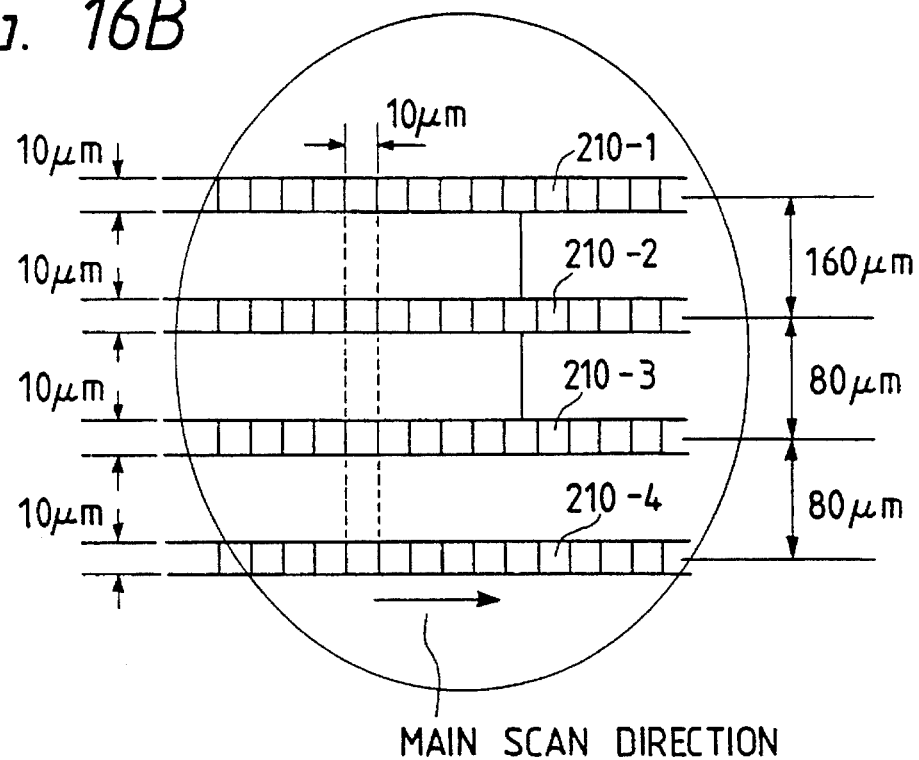

FIG. 16B is an enlarged view of light-receiving elements. Each line sensor has a length of 10 µm per pixel in the main scan direction. Each line sensor has a total length corresponding to 5,000 pixels in the main scan direction so as to read an image of an A3-size original at a resolution of 400 dpi in a widthwise direction (297 mm).

The pitch between the R, G, and B sensors is 80 µm, and these sensors are spaced apart from each other by eight lines with respect to the sub scan resolution of 400 dpi. The pitch between the IR sensor 210-1 and the R sensor 210-2 is 160 µm (16 lines), which is twice the pitch between the remaining sensors.

Optical filters are formed on the surfaces of the respective line sensors to obtain predetermined spectral characteristics of the IR, R, G, and B components.

The spectral characteristics of the R, G, and B line sensors of the CCD 210 will be described with reference to FIGS. 20 and 21.

Figure 20:
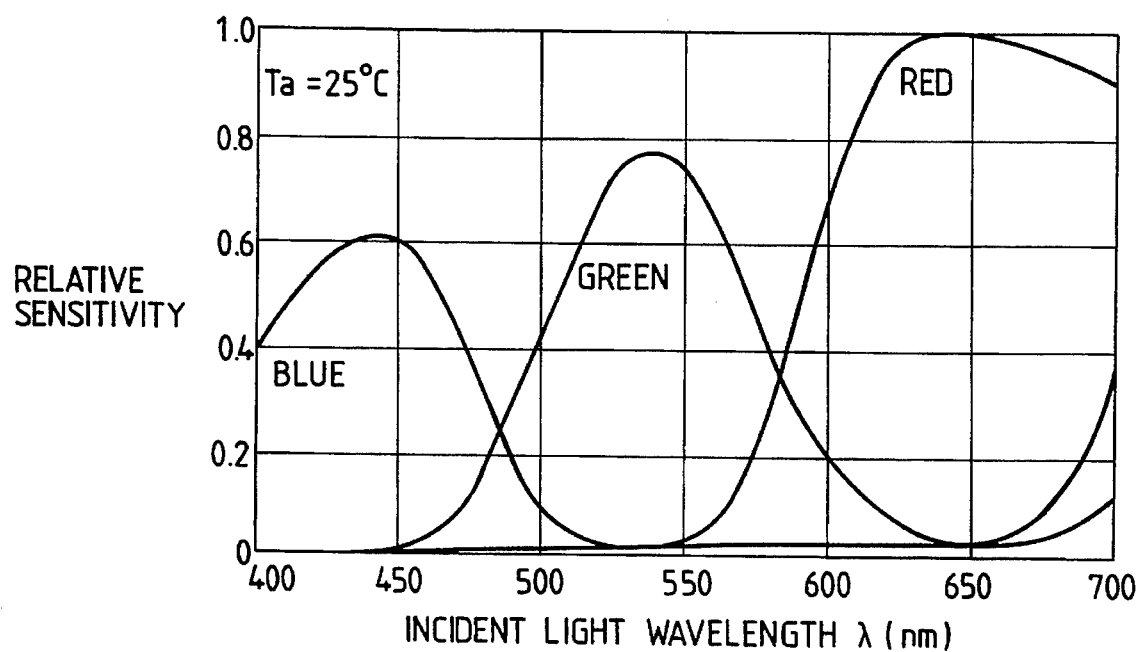
FIG. 20 is a graph showing the spectral sensitivity characteristics of a visible line sensor according to the first embodiment.
Figure 21:
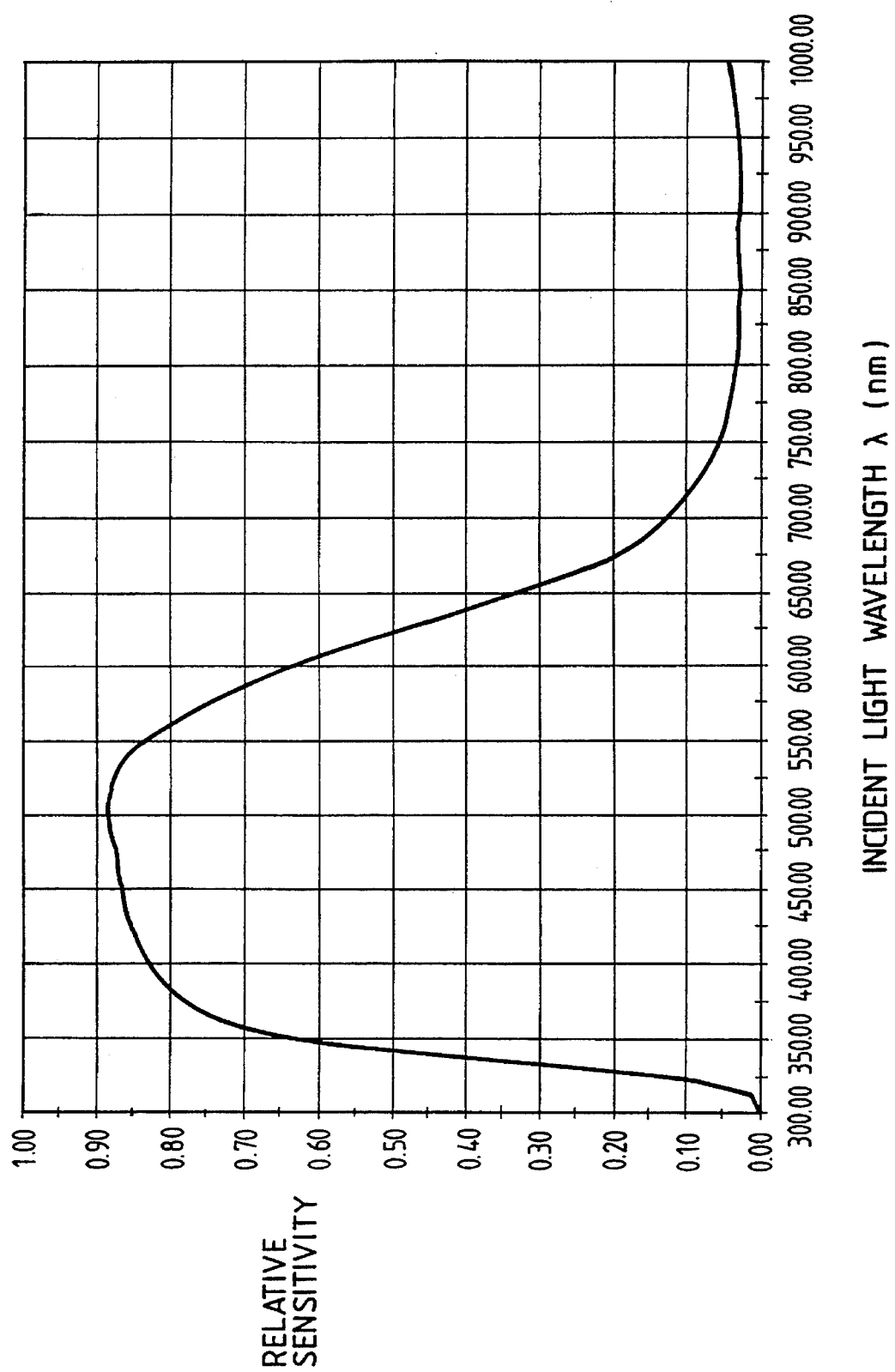
FIG. 21 is a graph showing the spectral sensitivity characteristics of the visible line sensor according to the first embodiment.

FIG. 20 shows the characteristics of conventional R, G, and B filters. As can be apparent from FIG. 20, the conventional R, G and B filters have sensitivities to infrared rays having a wavelength of 700 nm or more. In a conventional arrangement, an infrared cut filter shown in FIG. 21 is arranged on the lens 209.

According to this embodiment, an infrared component passing through the lens 209 is read by the IR sensor 210-1, and no infrared cut filter can be arranged on the lens 209. To eliminate the influence of the infrared rays, the filters arranged on the R, G, and B sensors have characteristics as a combination of the characteristics (FIG. 20) of the respective color components and the infrared cut characteristics (FIG. 21).

Figure 17:
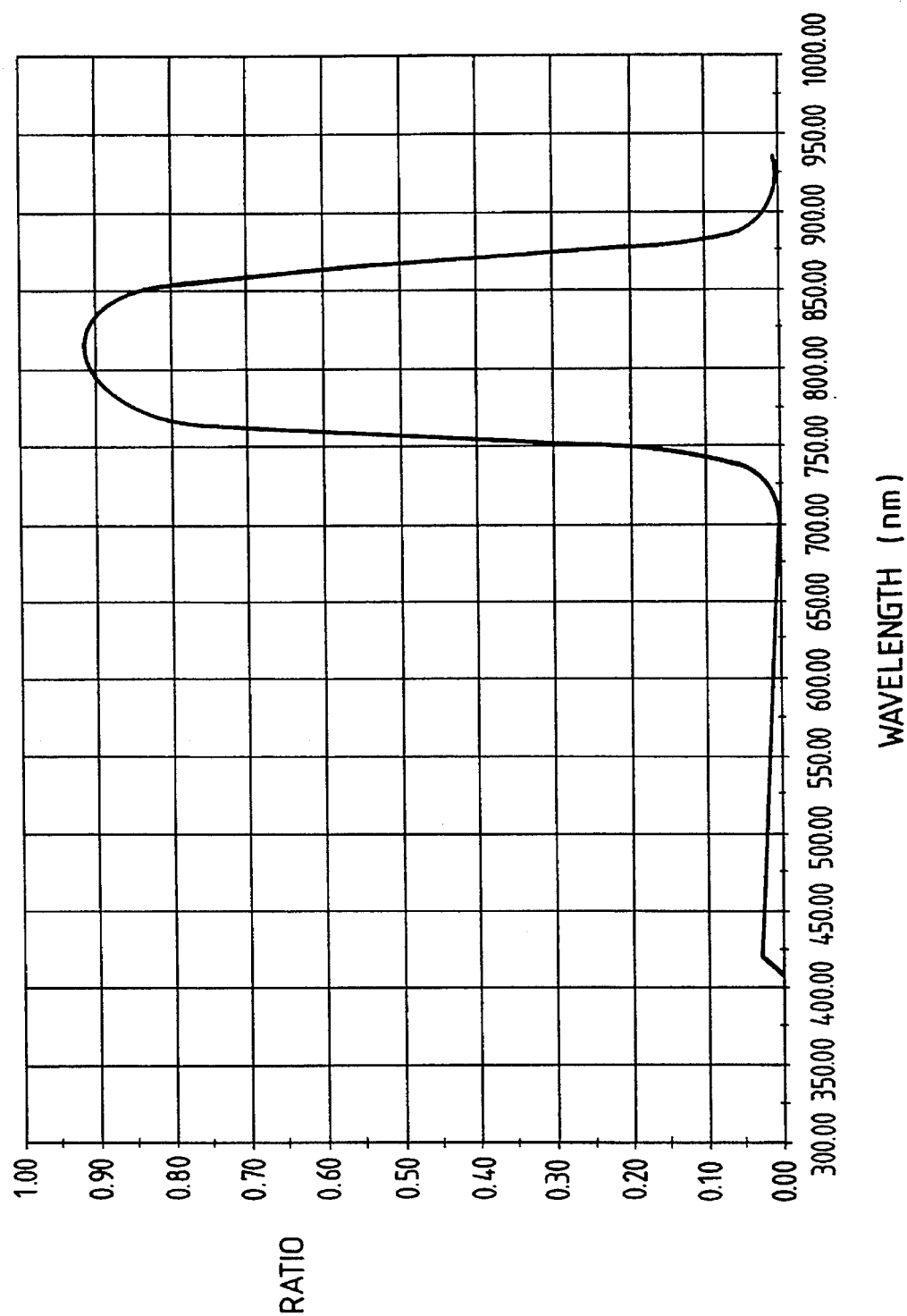
FIG. 17 is a graph showing the filter characteristics of an infrared read sensor according to the first embodiment.

FIG. 17 shows the characteristics of a visible cut filter arranged on the IR sensor 210-1. This filter eliminates a visible light component incident on the IR sensor for reading the infrared component.

Figure 18:
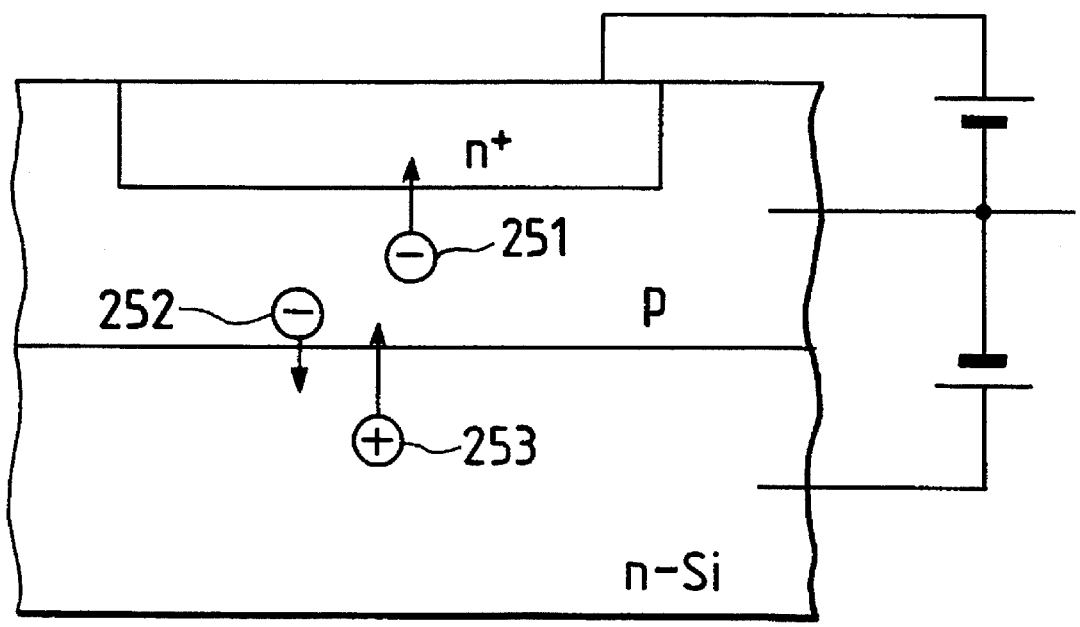
FIG. 18 is a schematic view of CCD photoelectric conversion according to the first embodiment.

FIG. 18 shows the structure of the photodiode of the CCD. This photodiode has an npn structure. The upper n-p junction is reverse-biased to constitute the photodiode. Carriers 251 generated above the p layer are absorbed by the upper n-p Junction and extracted as a signal.

Long-wavelength light such as an infrared ray causes generation of carriers 252 in a deep portion of the p layer and carriers 253 in the n layer as the substrate. The carriers generated in the deep portion are absorbed by the p-n Junction, as shown in FIG. 18, and cannot be read as a signal.

Figure 19:
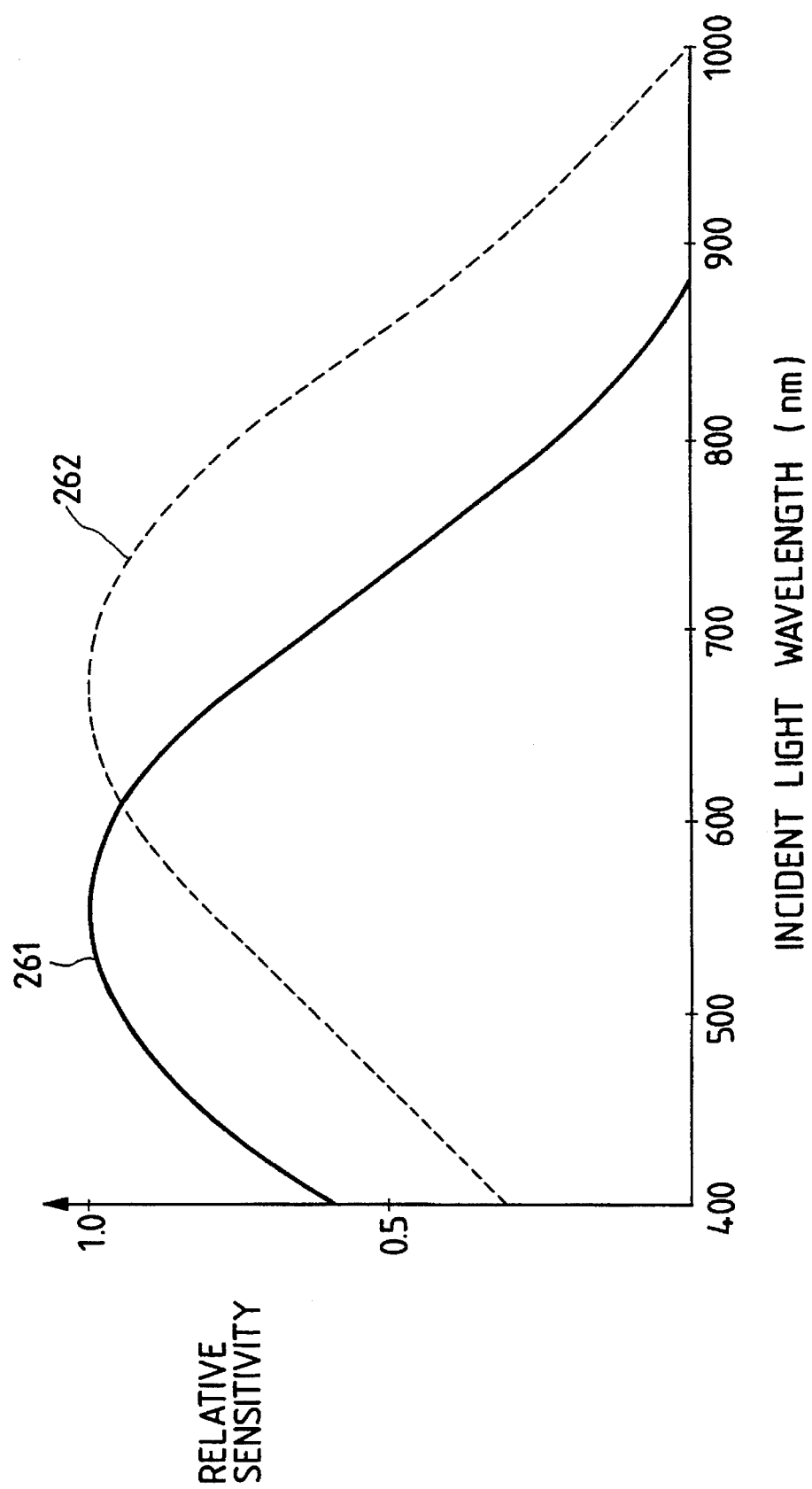
FIG. 19 is a graph showing the spectral sensitivity characteristics obtained when the CCD filter of the first embodiment is removed.

A characteristic curve 261 indicated by a solid curve in FIG. 19 represents the spectral characteristics of a general visible CCD. The sensitivity of an infrared ray having a wavelength of 800 nm and a peak of 550 nm is reduced by about 20%. The thickness of the p layer of each of the R, G, and B sensors represented by the characteristic curve 261 is about 1,000 nm.

In this embodiment, the IR read sensor 210-1 has a thicker p layer than those of the remaining line sensors on the same silicon chip so as to cause the sensor 210-1 to have a sensitivity to infrared rays. The thickness of the p layer of the IR sensor is set to be about 1,500 nm so as to have a sensitivity peak for infrared rays having wavelengths falling within the range of 700 nm to 800 nm.

The spectral characteristics of the IR sensor having no filter represented by the characteristics in FIG. 17 are represented by a characteristic curve 262 in FIG. 19.

Each of the IR, R, G, and B sensors 210-1 to 210-4 has a 10-µm opening in the sub scan direction.

In this embodiment, assume an original printed at a predetermined position (FIG. 4) with a mark similar to a cinnabar seal, using an ink having absorption characteristics for infrared rays, is exemplified as a copy forbidden, i.e., copy-prohibited original that is not supposed to be printed. When the mark is detected by an infrared signal read from the original placed on the original table, a normal image forming operation is forbidden. For this purpose, various methods may be proposed such that image data is changed and the apparatus itself is powered off.

Figure 4:
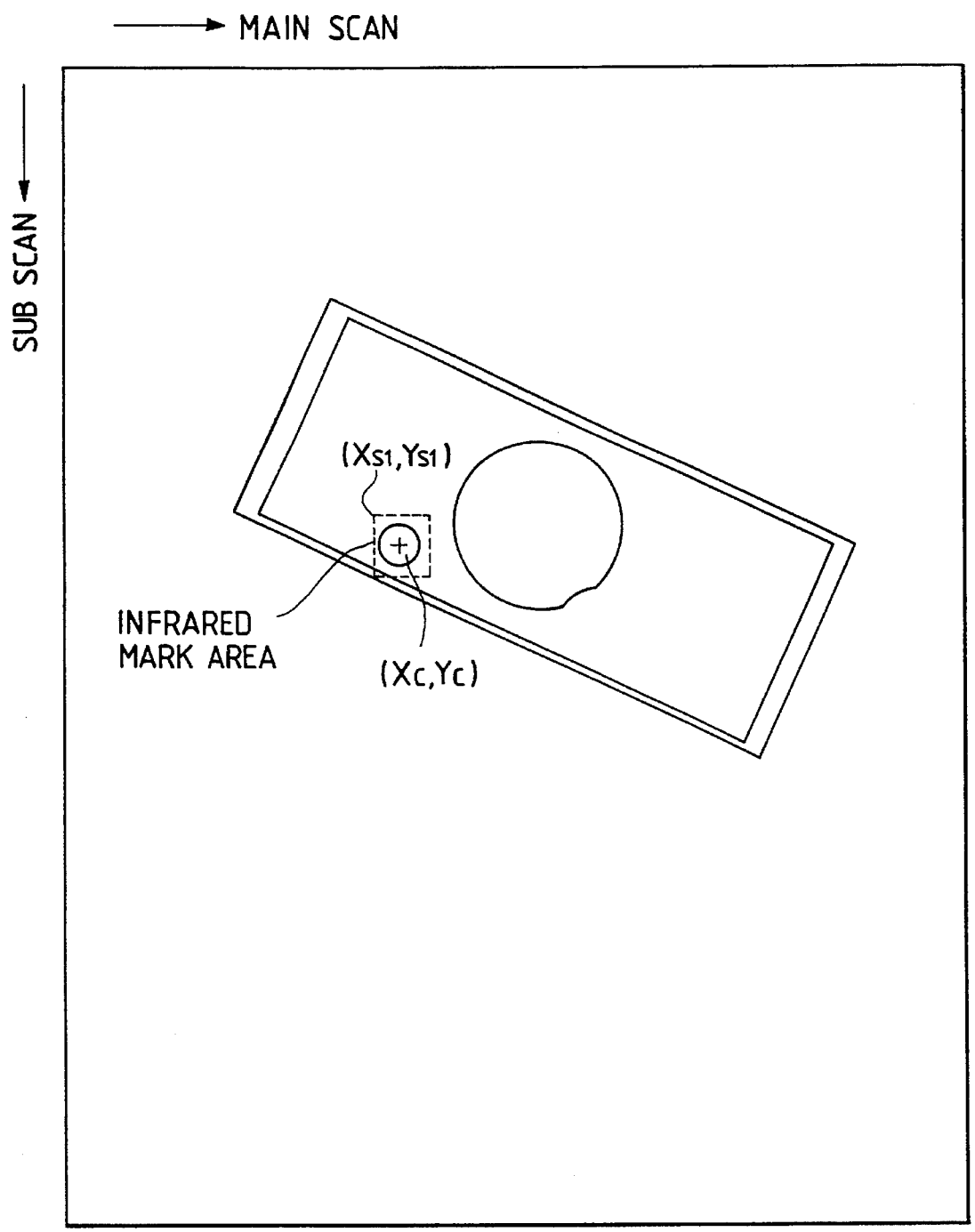
FIG. 4 is a view showing the detection state of a copy forbidden original identification mark according to the first embodiment.

The size and mark of the copy forbidden original are not limited to the ones shown in FIG. 4.

Figure 32:
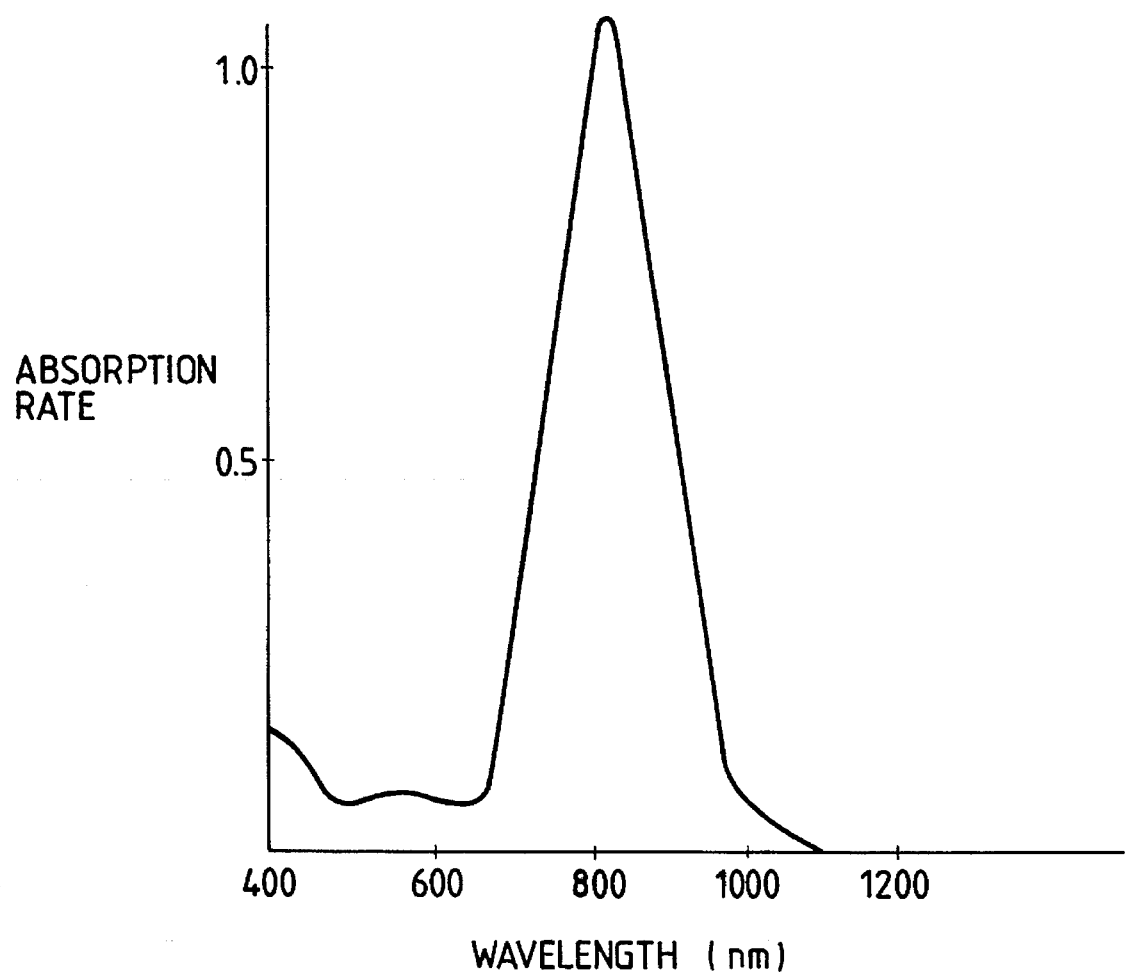
FIG. 32 is a graph showing the light absorption characteristics of a recognition mark according to the first embodiment.

FIG. 32 shows the absorption spectral characteristics of a copy forbidden original recognition mark (to be referred to as a recognition mark hereinafter) included in the copy forbidden original as a target in this embodiment.

The recognition mark according to this embodiment is formed using a material obtained by mixing a dyestuff such as SIR-128 available from Mitsui Toatsu Senryo Kabushiki Kaisha in a binder. This dyestuff is almost transparent to visible light. Therefore, infrared information can be detected without causing a general user to recognize the presence of the recognition mark in the copy forbidden original.

Figure 15:
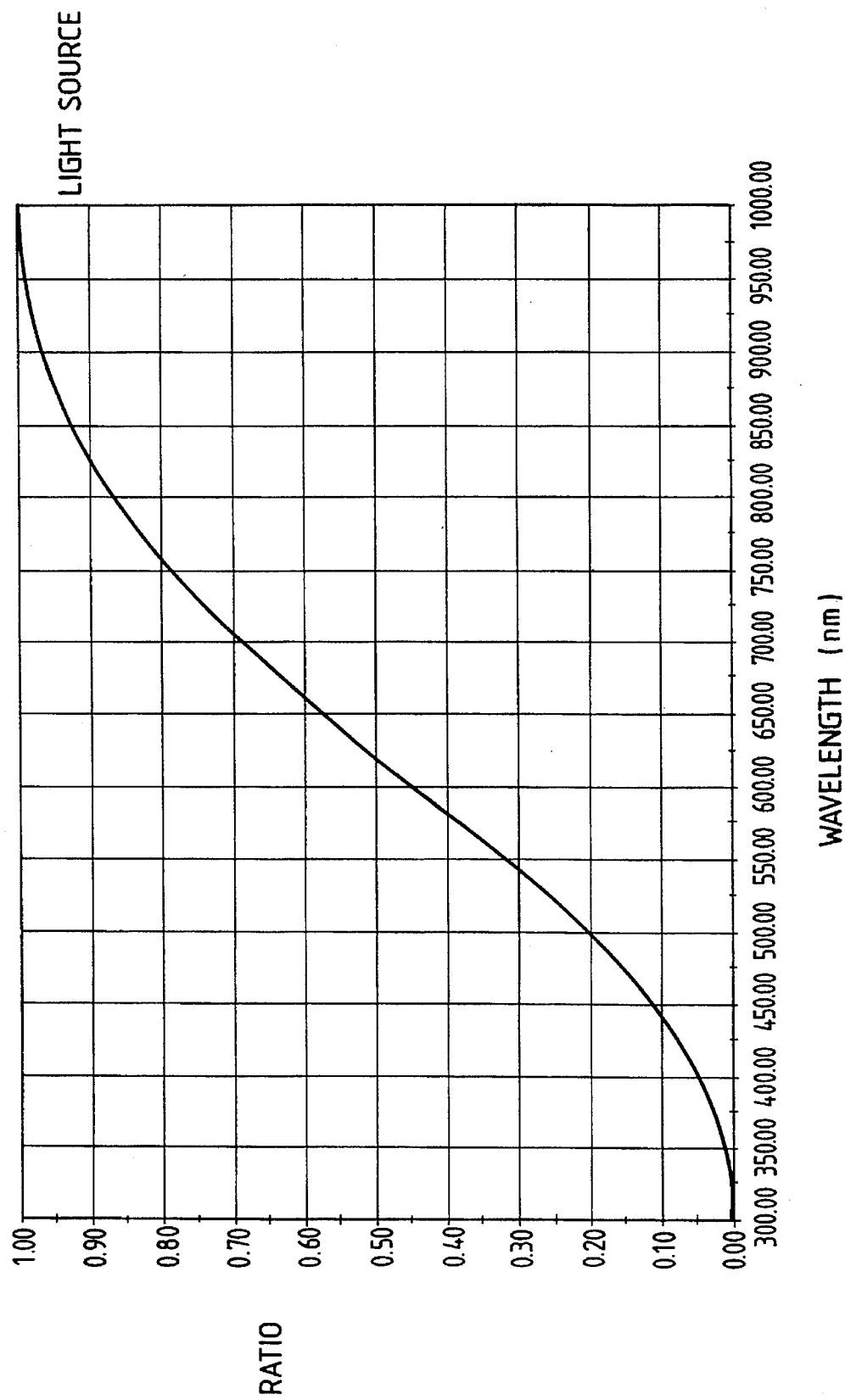
FIG. 15 is a graph showing the spectral characteristics of an original illumination lamp according to the first embodiment.

FIG. 15 shows the spectral characteristics of the original illumination halogen lamp used in this embodiment.

The light reflected by the original is focused through the mirrors 206 and 207 and the lens 209 to form images on the full color information red (R), green (G) and blue (B) component read line sensors and the infrared information (IR) component read line sensor of the CCD 210.

As described above, the R, G, and B filters having the characteristics (FIG. 21) for sufficiently attenuating 700-nm reflected light are formed on the R, G, and B sensors 210-2 to 210-4, respectively. A full color read operation free from the influence of infrared rays can be performed.

The filter for transmitting light components having wavelengths falling within the range of 750 nm to 850 nm is formed on the IR sensor 210-1, as shown in FIG. 17. For this reason, the recognition mark having the characteristics shown in FIG. 32 can be read by this IR sensor. When the recognition mark is read, the read output level of the IR sensor is reduced. When contents except for the recognition mark are read, the output level of the IR sensor increases. The infrared ray can be extracted during image reading/recording of the original in accordance with the spectral characteristics of these IR, R, G, and B sensors. An extra original scan operation for detecting the recognition mark, such as prescan, need not be performed.

With the above arrangement, the normal color area of the original and the infrared area of the recognition mark of the original can be properly separated from each other.

Figure 1B:
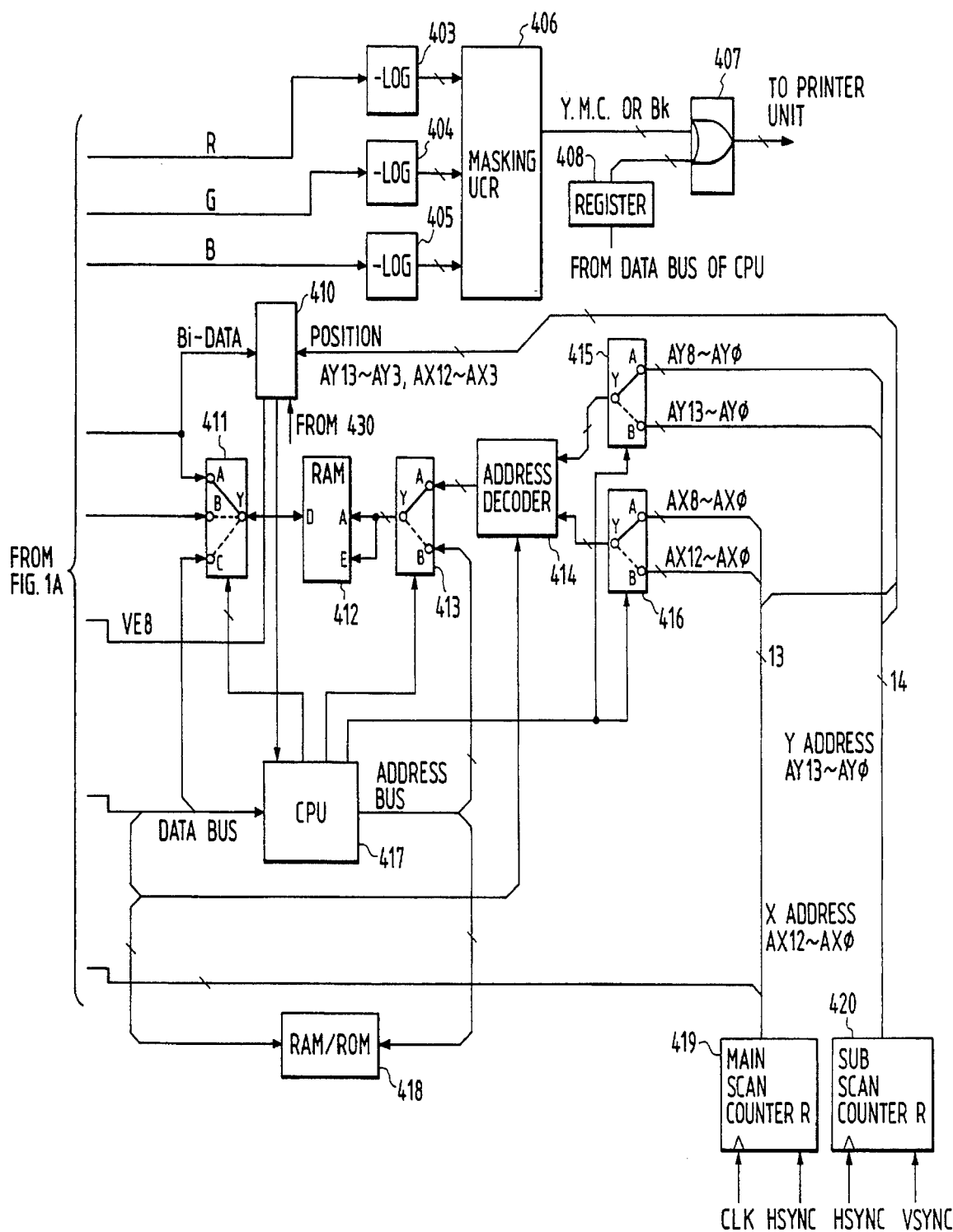
FIG. 1 is comprised of FIGS. 1A and 1B showing block diagrams of a signal processing unit according to the first embodiment.

FIGS. 1A and 1B are block diagrams showing the flow of an image signal in the image scanner unit 201. The image signal output from the CCD 210 is input to an analog signal processing unit 4001 and converted into an 8-bit digital image signal in the analog signal processing unit 4001. The 8-bit digital image signal is input to a shading correction unit 4002. A decoder 4008 decodes a main scan address from a main scan address counter 419 and generates unit line CCD drive signals such as a shift pulse and a reset pulse.

Figure 29:
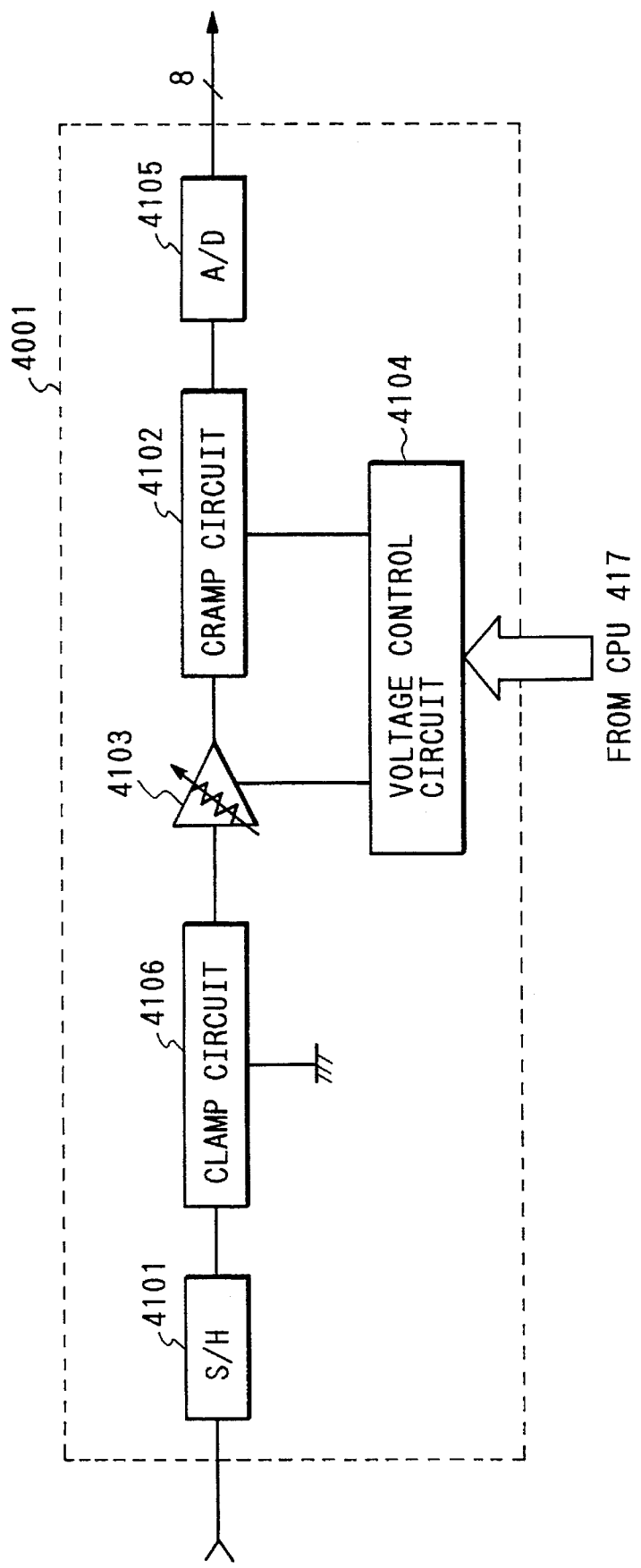
FIG. 29 is a block diagram of an analog signal processing unit according to the second embodiment.

FIG. 29 is a block diagram of the analog signal processing unit 4001. R, G, and B processing circuits are identical to each other, and a circuit arrangement for one color component is shown. The image signal output from the CCD 210 is sampled and held by a sample & hold unit (S/H unit) 4101 to stabilize the waveform of the analog signal. A CPU 417 controls a variable amplifier 4103 and a clamp circuit 4102 through a voltage control circuit 4104 so that the dynamic range of an A/D converter 4105 can be fully utilized. The A/D converter 4105 converts the analog image signal into an 8-bit digital image signal.

The 8-bit digital image signal is subjected to shading correction by a known shading correcting means in the shading correction unit 4002.

The read signal from the IR sensor 210-1 is subjected to shading correction as follows. The CPU 417 stores a one-line infrared signal from the standard white plate 5102 in a line memory 4003, calculates a multiplication coefficient for each pixel so as to set the read data of each pixel recorded in this line memory 4003 to have 255 levels, and stores the calculated multiplication coefficients in a one-line coefficient memory 4006. The multiplication coefficient corresponding to a given pixel is read out in synchronism with the output of the given pixel upon reading one line by the IR 210-1 in the actual original read mode. The readout multiplication coefficient is multiplied with the corresponding pixel signal from the IR sensor 210-1 by a multiplier 4007, thereby performing shading correction of the infrared ray.

Shading correction of the R, G, and B signals is performed in the same manner as that of the IR signal. That is, a one-line read signal from the standard white plate 5102 is written in the line memory, multiplication coefficients for setting the read signal to have 255 levels are stored in the coefficient memory, and the multiplication coefficient from the coefficient memory is multiplied with the read signal of the corresponding pixel.

As shown in FIG. 16B, the line sensors 210-1, 210-2, 210-3, and 210-4 of the CCD 210 are spaced apart from each other at predetermined pitches. Spatial shift amounts in the sub scan direction are corrected by line delay elements 401, 402, and 4005. More specifically, the IR, R, and G signals obtained by reading an original in the sub scan direction are delayed to match the B signal in the sub scan direction. Log converters 403, 404, and 405 are constituted by look-up table ROMs and convert the R, G, and B luminance signals into C, M, and Y density signals. A known masking and UCR circuit 406 will not be described in detail, but three primary color input signals are sequentially output as Y, M, C, and Bk signals each having a predetermined bit length, e.g., an 8-bit length every time a read operation is performed.

Figure 31:
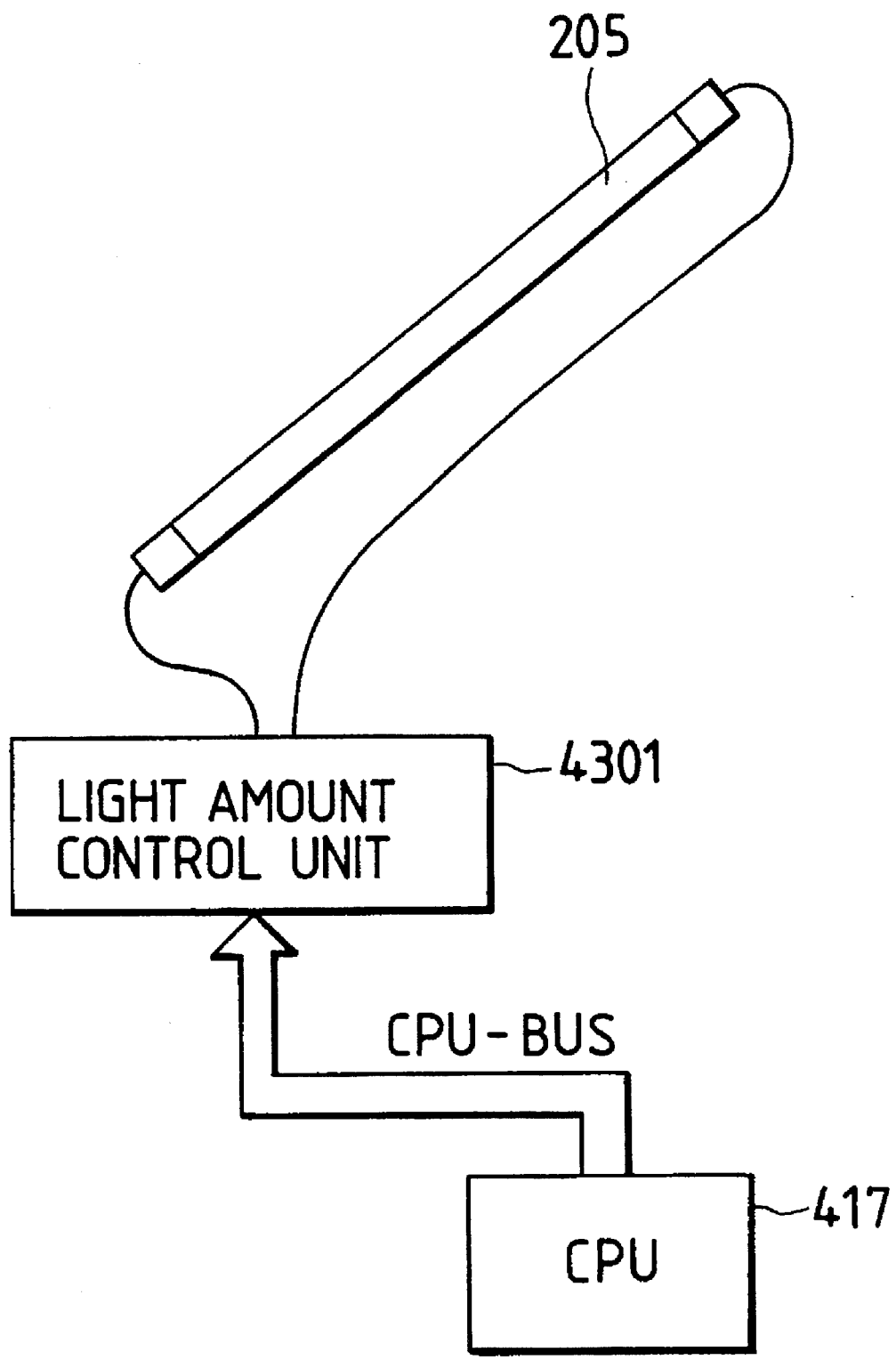
FIG. 31 is a block diagram showing light amount control of an original illumination lamp according to the second embodiment.

FIG. 31 is a block diagram of a light amount control unit 4301 for the halogen lamp 205.

Figure 30B:
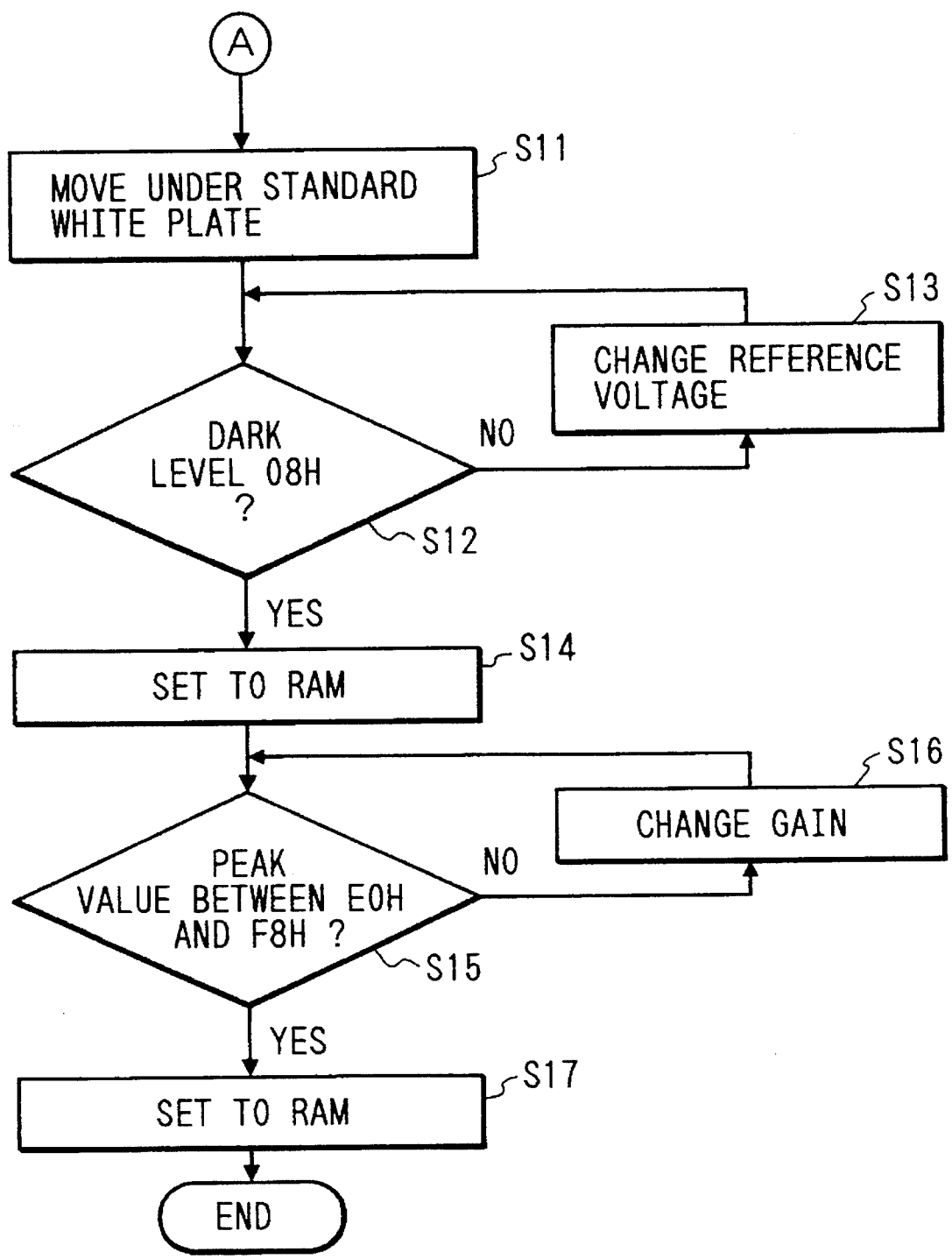
FIG. 30 is comprised of FIGS. 30A and 30B showing flow charts of control of the light amount adjustment and the circuit gain according to the second embodiment.

A light amount adjusting method of the halogen lamp 205 and a method of controlling the variable amplifier 4103 and the clamp circuit 4102 will be described with reference to a flow chart in FIGS. 30A and 30B.

The analog signal processing unit 4001 performs the following operations so as to fully utilize the dynamic range of the A/D converter 4105. The gain of the variable amplifier 4103 is adjusted on the basis of image data obtained upon reading the standard white plate 5102 for the R, G, and B signals, and the control voltage of the clamp circuit 4102 is regulated by the voltage control circuit 4104 on the basis of the image data obtained in a state wherein light is not incident on the CCD 210. As for the IR signal, adjustment operations similar to the R, G, and B signals are performed on the basis of image data obtained upon reading infrared information from the standard white plate 5102.

When an adjustment mode is started from an operation unit (not shown), the reflecting mirror 206 is moved to a position under the standard white plate 5102 to set a halogen lamp definition gain of the variable amplifier 4103 (step 1). Image data obtained in a state wherein light is not incident on the CCD 210 is stored in the line memory (shading RAM) 4003. The stored image data is calculated by the CPU 417, the voltage control circuit 4104 is controlled so that the average value of the one-line image data is set closest to 08H, and the reference voltage of the clamp circuit 4102 is regulated (steps 2 and 3). The adjusted or regulated control values are stored in a RAM 418 of the CPU 417 (step 4).

The halogen lamp 205 is turned on, image data obtained upon reading the standard white plate 5102 is stored in the line memory 4003, and the light amount control unit 4301 is controlled by the CPU 417 so that the peak value of the G signal falls within the range of D0H to F0H (steps 5 and 6; halogen lamp adjustment). After the adjustment, the control value is stored in the RAM 418 of the CPU 417 (step 7). The halogen lamp 205 is turned on in a light amount adjusted in steps 5 and 6, image data obtained upon reading the standard white plate 5102 are stored in the line memories 4003 corresponding to the R, G, and B components, the voltage control circuits 4104 are controlled such that the peak values of the R, G, and B images fall within the range of E0H to F8H, and the R, G, and B gains of the variable amplifiers 4103 are adjusted (steps 8 and 9). Gain data in use of the halogen lamp 205 (to be referred to as H-gain data hereinafter) are stored in the RAM 418 of the CPU 417 (step 10).

The adjustment operations of the clamp circuit and the variable amplifier of the analog signal processing unit for processing signals from the IR sensor and the storage operations of the control values will be described below. In order to read the standard white plate, the halogen lamp 205 is turned off, and the reflecting mirror 206 is moved to a position under the standard white plate 5102 (step 11). Image data in a state wherein light is not incident on the CCD 210 is stored in the IR signal line memory, the stored image data is calculated by the CPU 417 to control the IR voltage control circuit 4103 such that the average value of one-line image data is set closest to 08H, and the reference voltage of the clamp circuit 4102 is regulated (steps 12 and 13). After the adjustment, the control values are stored in the RAM 418 of the CPU 417 (step 14).

The halogen lamp 205 is turned on in a light amount adjusted in steps 5 and 6, infrared image data obtained upon reading the standard white plate 5102 is stored in the IR line memory, the IR signal voltage control circuit 4104 is controlled so that the peak value of the one-line IR signal image data falls within the range of E0H to F8H, and the R, G, and B gains of the variable amplifiers 4103 are adjusted (steps 15 and 16). IR signal gain data is stored in the RAM 418 of the CPU 417, and the halogen lamp is turned off (step 17).

The control data obtained in the above adjustment mode are set in all the control units upon a power-ON operation.

A normal copying operation and a recognition mark determination operation performed during the normal copying operation will be described below.

When an operator places an original on the platen 203 and starts a copying operation at an operation unit (not shown), the CPU 417 controls a motor (not shown) to move the reflecting mirror 206 to a position under the standard white plate 5102.

The halogen lamp 5102 is turned on to irradiate the standard white plate 5102 with light. Shading correction of the R, G, and B signals is performed in the shading correction unit 4002.

The CPU 417 causes the halogen lamp 5101 to turn on to irradiate the standard white plate 5102 with light. Shading correction of the IR signal using the infrared ray is performed in the shading correction unit 4002.

The four original read cycles are performed in synchronism with the image recording operation in four colors M, C, Y, and Bk at the printer unit, thereby performing image recording. At the same time, detection of a recognition mark is performed, and the recording operation is controlled in accordance with the detection result.

In this embodiment, a total of four read operations (scan cycles) are performed to perform copying. The operations of the image scanner unit 201 and the printer unit 202 in each scan cycle are shown in FIG. 3.

More specifically, when forgery prevention of a copy forbidden original is to be performed, the image scanner detects the rough position of the recognition mark in the state of mode 1 in the first scan cycle. A magenta component is output at the printer unit.

In the second scan cycle, the image scanner unit is set in the state of mode 2. The recognition mark is extracted on the basis of the recognition mark position detected in the first scan cycle, and the extracted data is stored in a memory to determine whether the stored data represents a predetermined copy forbidden mark. At this time, a cyan component is output at the printer unit.

In the third and fourth scan cycles, the image scanner unit is set in the state of mode 3. If forgery is determined in the second scan cycle, a practical countermeasure against forgery is performed.

During the first to fourth scan cycles, any intentional hindrance action of the operator against the operation for detecting an infrared recognition mark is always detected. Upon detection of such hindrance action, the forgery prevention processing is immediately performed.

Figure 5:
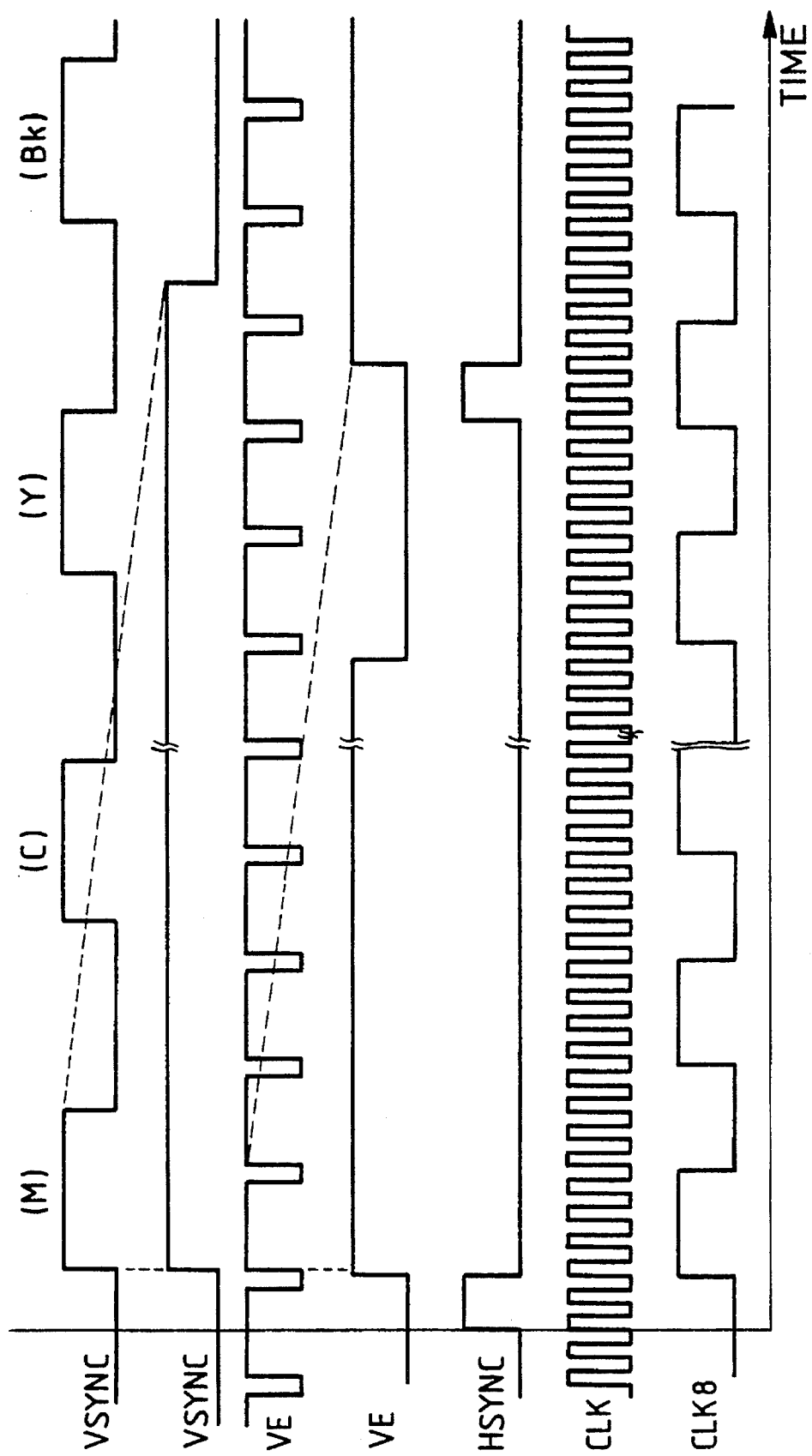
FIG. 5 is a timing chart of image control signals of the first to third embodiments.

FIG. 5 is an operation timing chart of the respective components in the image scanner unit of this embodiment. CLOCK, HSYNC, VSYNC, and VE signals are generated by a clock generating circuit 430 in FIG. 1, and a predetermined signal is output for each circuit.

The VSYNC signal is an image valid interval signal in the sub scan direction. When the VSYNC signal is set at "1", an image is read (scanned) to form (C), (M), (Y), and (Bk) signals during the "1" interval. The VE signal is an image valid interval signal in the main scan direction. When the VE signal is set at "1", the main scan start position is timed during the "1" interval. The CLK signal is a pixel sync signal. When the CLK signal goes high ("1"), image data is transferred. A CLK8 signal is a timing signal output every eight pixels. When the CLK8 signal goes high ("1"), an 8×8 block signal (to be described later) is timed.

[Image Scanner Unit]

The internal blocks of the image scanner unit 201 in FIGS. 1A and 1B, which detects an infrared recognition mark and records an image at the printer unit will be described below. The log converters 403, 404, and 405 are constituted by look-up table ROMs and convert the R, G, and B luminance signals into C, M, and Y density signals. The known masking and UCR circuit 406 will not be described in detail, but three primary color input signals are sequentially output as Y, M, C, and Bk signals each having a predetermined bit length, e.g., an 8-bit length every time a read operation is performed. An OR gate circuit 407 logically ORs an input signal and a value held in a register 408. A value of 00H is normally written in the register 408. An output from the masking and UCR circuit 406 is directly output to the printer unit. However, in forgery prevention processing, the CPU 417 sets data FFH in the register 408 through a data bus to output an image painted with a toner.

The CPU 417 controls the apparatus in each mode. A binarization circuit 4009 binarizes an infrared signal with an appropriate slice level. An output of "0" from the binarization circuit 4009 represents the presence of infrared recognition information constituting an infrared recognition mark at a position where an infrared ray is absorbed by the original. An output of "1" from the binarization circuit 4009 represents the absence of the infrared recognition information at an original position where infrared ray is reflected. The output from the binarization circuit 4009 is output every pixel. This signal from the binarization circuit 4009 is inverted by an inverter 428 to obtain an IRI signal. The IRI signal of "1" represents the presence of the infrared recognition information, and the IRI signal of "0" represents the absence of the infrared recognition information.

A block processing circuit 409 performs 8×8 block processing and processes the IRI signal in units of 8×8 blocks.

Data in a random access memory (RAM) 412 is switched by a selector 411, and the address of the RAM 412 is switched by a selector 413.

On the other hand, a main scan counter 419 is reset by the HSYNC signal. The main scan counter 419 starts a count-up operation in response to the CLK signal to generate 13 main scan address bits (to be referred to as X address bits hereinafter) X12 to X0.

A sub scan address counter 420 is reset during the "0" interval of the VSYNC signal and starts a count-up operation at the timing of the HSYNC signal to generate 14 sub scan address bits (Y address bits) Y13 to Y0.

The CPU 417 controls the selectors 411 and 413, selectors 415 and 416, and an address decoder 414 in accordance with each mode and performs read/write access to the RAM 412. In this embodiment, a contact A of the selector and contacts A of the selectors 415 and 416 are not used. The RAM/ROM 418 is incorporated in the CPU 417. An infrared recognition mark detecting circuit 410 detects the position of an infrared recognition mark.

Figure 6B:
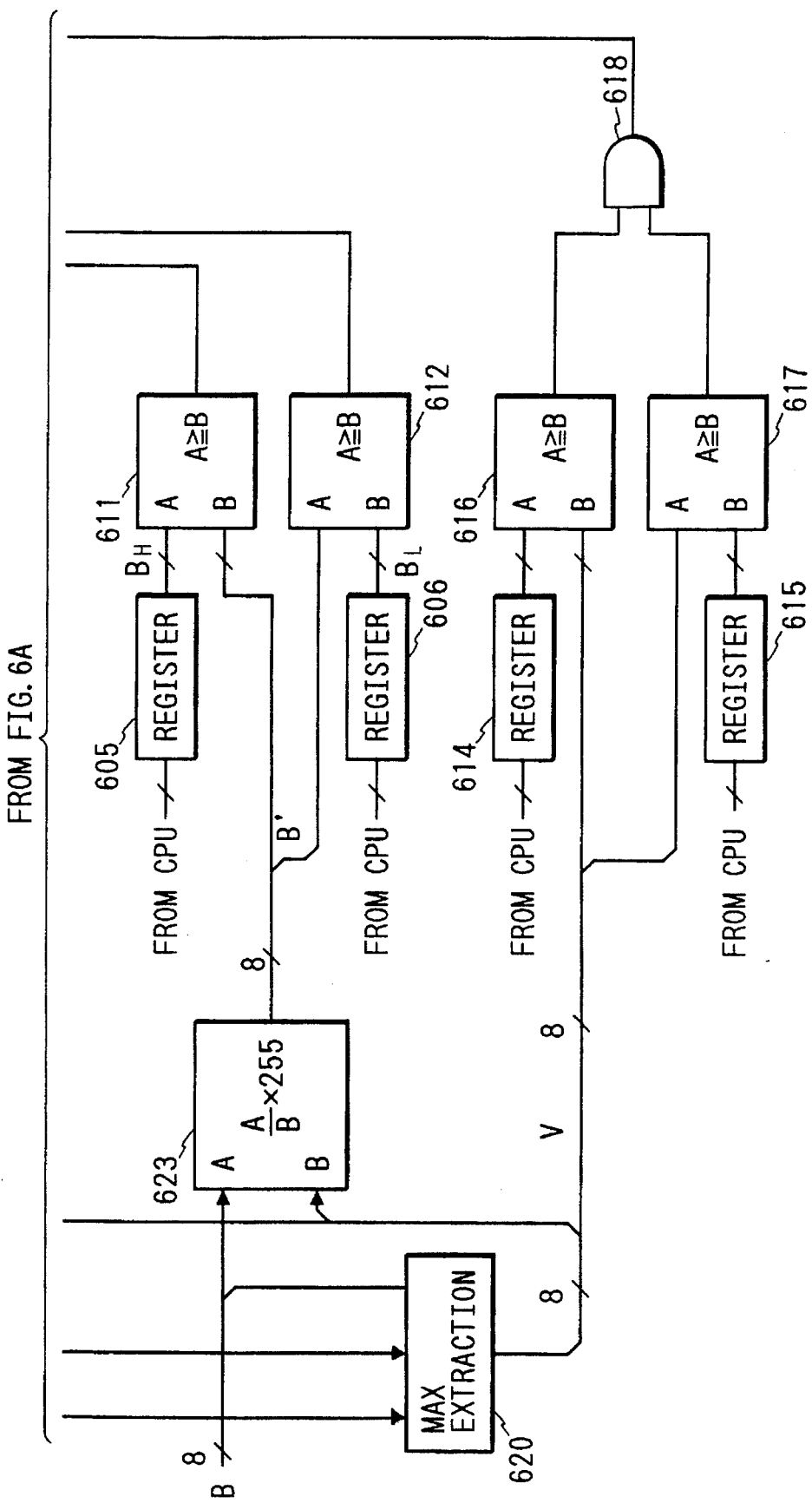
FIG. 6 is comprised of FIGS. 6A and 6B showing block diagrams of a color detecting circuit (black) according to the first embodiment.
Figure 39:
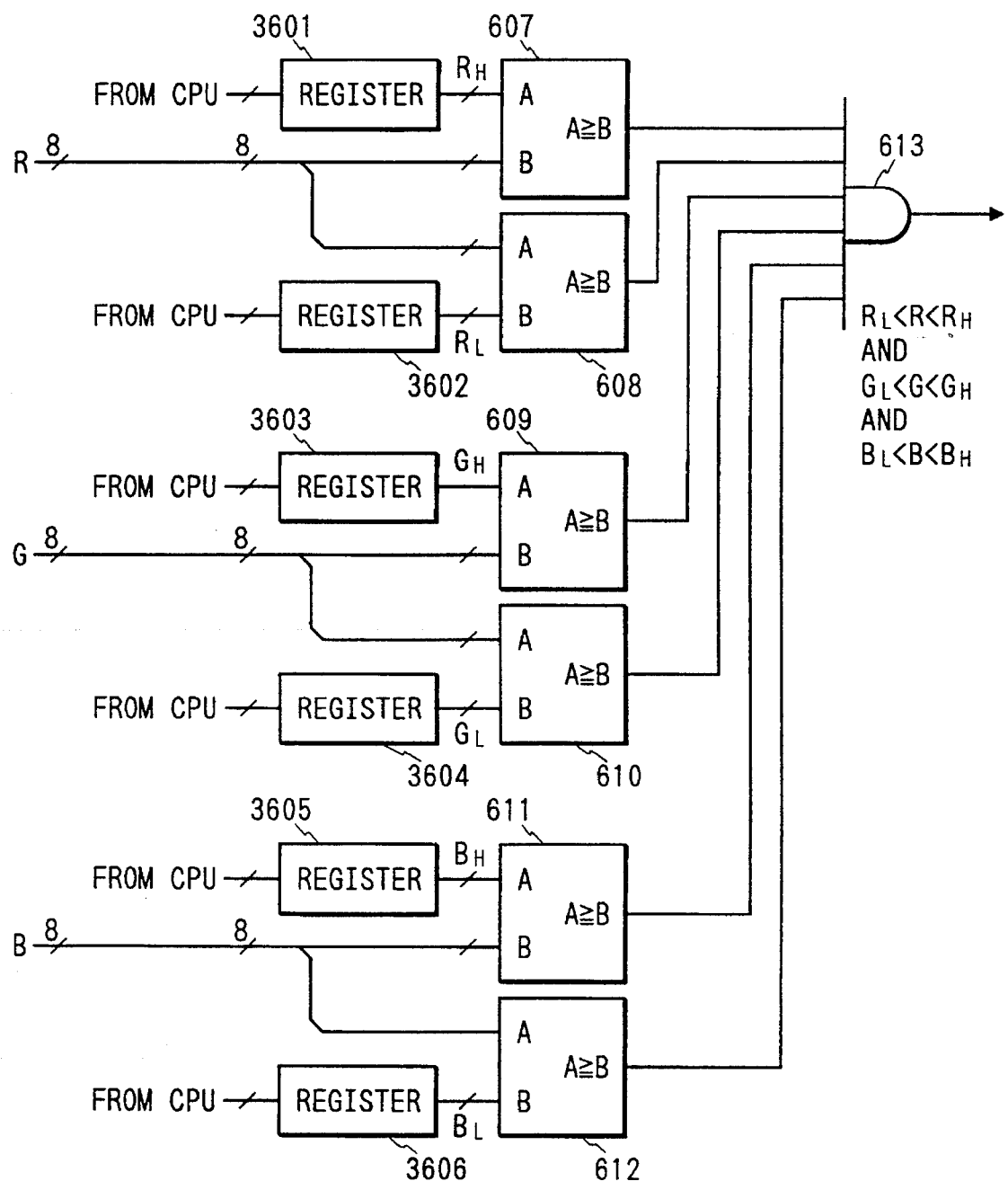
FIG. 39 is a block diagram showing a color detecting circuit (green) according to the first embodiment.

Color detecting circuits 421 and 422 are arranged, as shown in FIGS. 6A, 6B and 39, respectively. In FIGS. 6A and 6B, a MAX extraction detecting circuit 620 detects maximum values V of the R, G, and B signals, and operation units 621, 622, and 623 calculate ratios of R, G, and B to V, and output R', G', and B' signals obtained by normalizing the ratios with "255". These signals represent the color tones of the read pixels. These signals are compared with the set value of the CPU in comparators 607 to 611. Outputs from the comparators 607 to 611 are logically ANDed by a gate 613 to detect that the read pixel has a predetermined color tone.

A V signal representing the brightness of the read pixel is also compared with the set value of the CPU in comparators 616 and 617. Outputs from the comparators 616 and 617 are logically ANDed by a gate 618 to detect that the brightness of the read pixel falls within a predetermined range. The above two signals are logically ANDed by a gate 619 to detect that the color tone and brightness of the read signal fall within the predetermined ranges.

In this embodiment, the color detecting circuit 421 detects black corresponding to carbon black (to be described later). Since black has a low saturation level, the R', G', and B' signals corresponding to black have values close to "255". In addition, the brightness V corresponding to black has a value close to zero. For this reason, the color detecting circuit 421 detects that the values of the R', G', and B' signals fall within the range of 230 to 255 under the conditions that a constant of 255 is set in registers 601, 603, and 605 and a constant of 230 is set in registers 602, 604, and 606 in setting the constants in the window comparators of the color detecting circuit 421. A constant of 64 is set in a register 614 and a constant of 0 is set in a register 615 to detect that the original density is considerably high.

In this embodiment, the color detecting circuit 422 detects green corresponding to a printing green ink (e.g., a GREEN C ink of PANTONE®). The green (G) signal in FIG. 39 has a value close to "255", and the R and B signals have relatively small values. In the present invention, a threshold value of 127 or less is a determination condition. For this reason, constants of the CPU are set in the window comparators of the color detecting circuit 422 as follows. A constant of 127 is set in registers 3601 and 3605, a constant of 255 is set in a register 3603, zero is set in registers 3602 and 3606, and a constant of 200 is set in a register 3604. When the signal values of the R' and B' signals are both determined to fall within the range of 0 to 127, and the signal value of the G' signal is determined to fall within the range of 200 to 255, it is detected that the input pixel is green. The same reference numerals as in FIGS. 6A and 6B denote the same parts in FIG. 39, and a detailed description thereof will be omitted.

A block processing circuit 426 performs 8×8 block processing as in the block processing circuit 409 to perform block formation of an output from the AND gate 425 in units of 8×8 blocks.

A counter 427 counts the number of 8×8 blocks as the processing result.

Figure 7:
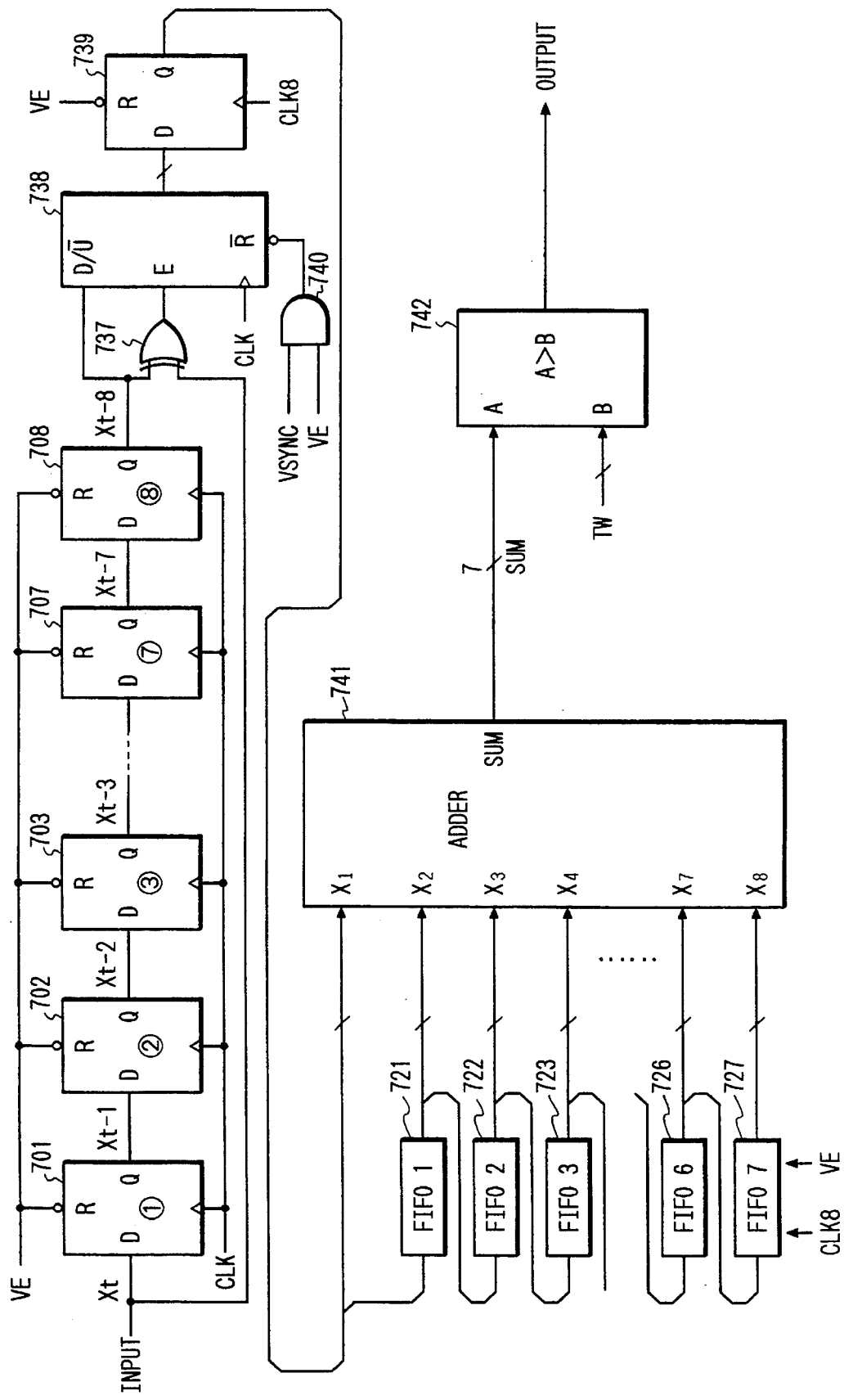
FIG. 7 is a block diagram showing noise elimination of an infrared signal according to the first embodiment.

FIG. 7 is a block diagram showing the internal arrangement of the block processing circuits 409 and 426 in FIGS. 1A and 1B.

Eight D flip-flops (to be referred to as DFFs hereinafter) 701, 702, 703, ..., 707, and 708 are connected in series with each other. The DFFs 701 to 708 sequentially delay the input signal in accordance with the pixel clock CLK signal and are cleared to "0" for VE="0", i.e., a non-image interval.

A 4-bit up/down counter 738, an EX-OR gate 737, and an AND gate 740 operate as indicated by Table 1 as follows.

TABLE 1

| VSYNC | VE | $X_t$ | $X_{t-7}$ | Counter Output |
|---|---|---|---|---|
| 0 | X | X | X | 0 (clear) |
| X | 0 | X | X | 0 (clear) |
| 1 | 1 | 0 | 0 | Hold |
| 1 | 1 | 0 | 1 | Count down |
| 1 | 1 | 1 | 0 | Count up |
| 1 | 1 | 1 | 1 | Hold |

More specifically, the output from the counter 738 is cleared to zero during the "0" interval of the VSYNC or VE signal, held for $X_t=X_{t-8}$, counted up for $X_t=1$ and $X_{t-8}=0$, and counted down for $X_t=0$ and $X_{t-8}=1$. This counter output is latched by a latch 739 in response to the CLK8 signal having an 8-clock period to output a total (=the number of 1s) of eight input data $X_t$ input within one period of the CLK8 signal. Eight-line data are simultaneously input from one-line FIFO memories 721, 722, 723, ..., 726, and 727 to an adder 741 to obtain a sum. As a result, a sum total SUM of the number of 1s in the 8×8 window is output as 0 to 64.

A digital comparator 742 compares the output SUM from the adder 741 with a predetermined comparison value TW from the CPU 417 and outputs a comparison result as "0" or "1".

When an appropriate value is set as the comparison value TW, noise elimination in units of 8×8 blocks can be performed.

Figure 8B:
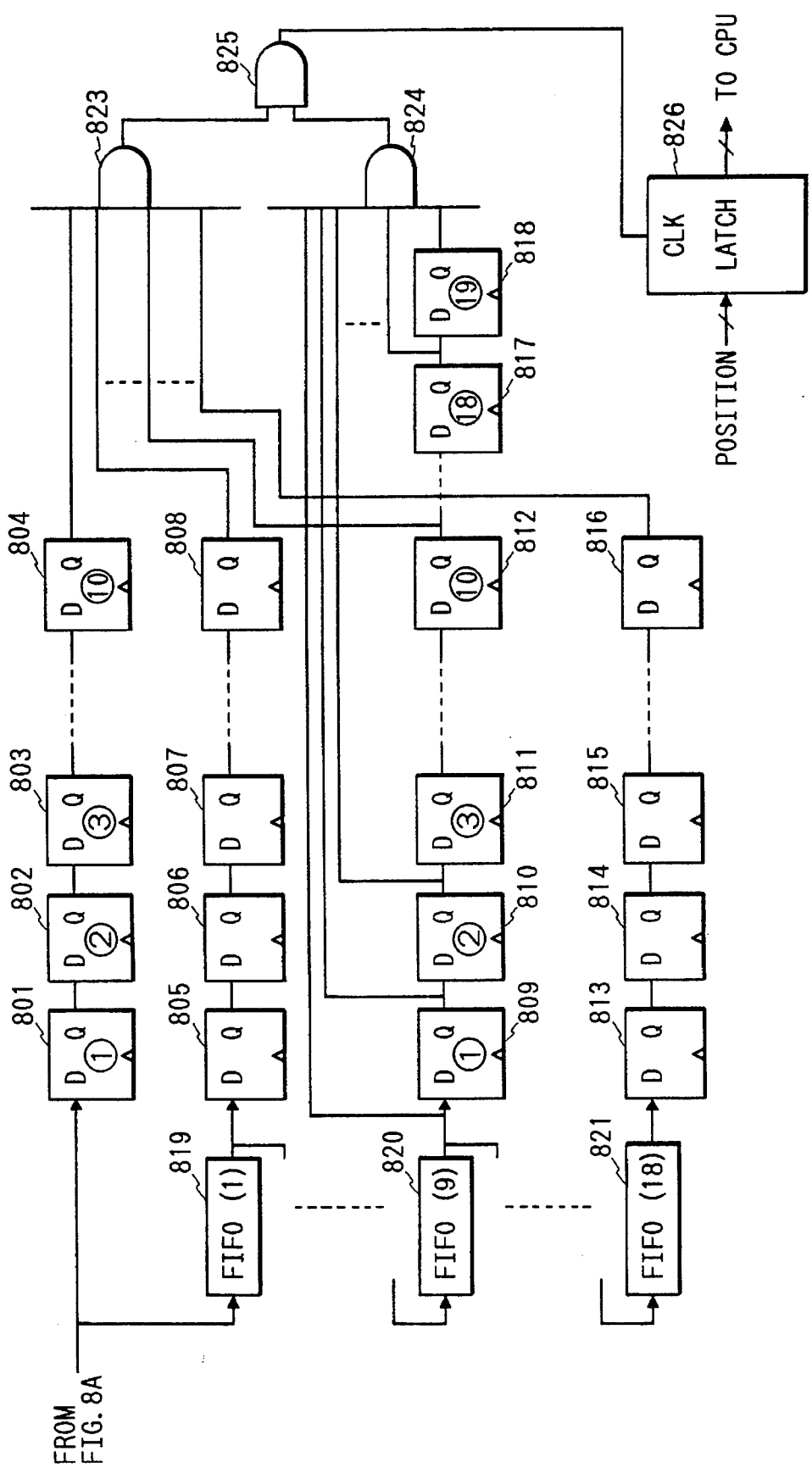
FIG. 8 is comprised of FIGS. 8A and 8B showing block diagrams for detecting the position of an infrared mark according to the first embodiment.

FIGS. 8A and 8B are a view for explaining the infrared recognition mark position detecting circuit 410. A line thinning circuit 827 thins the lines to output the VE signal every eight lines. The ⅛ thinned VE8 signal is used to perform write control of each FIFO memory. The contents of each FIFO memory are updated every eight lines. Each F/F is operated in response to the CLK8 signal. The operation of this circuit is performed every 8 pixels/8 lines.

Each of three FIFOs 828, 829, and 830 delays the input signal by one line, and four lines are simultaneously processed. DFFs 831, 832, 833, ..., 839, 840, 841 are arranged such that series DFF circuits each consisting of three DFFs are arranged for four line outputs. All the DFFs are driven by the CLK8 signal. If even one signal of "1" (the presence of an infrared recognition mark) is present in a 4×4 area (a 2 mm×2 mm area on the original), signals in the 4×4 area are set to "1"s by an OR gate 857. Therefore, a blank portion in the mark is painted as an infrared recognition mark portion, thereby correcting infrared component omissions caused by scratchy portions.

Each of three FIFOs 842, 843, and 844 delays the input signal by one line, and four lines are simultaneously processed. DFFs 845, 846, 847, ..., 854, 855, 856 are arranged such that series DFF circuits each consisting of three DFFs are arranged for four line outputs. All the DFFs are driven by the CLK8 signal. A signal of "1" representing all "1"s (the presence of the infrared recognition mark) in the entire 4×4 area is output from an AND gate 858. A portion expanded as an infrared recognition mark portion outside the mark, which is filled as a blank portion in the mark, is restored to the previous size.

Each of eighteen FIFOs 819, 820, ..., 821 delays the input signal by one line, and 19 lines are simultaneously processed.

DFFs 801, 802, 803, ..., 804, 805, 806, 807, ..., 808, ..., 809, 810, 811, ..., 812, ..., 813, 814, 815, ..., 816 are arranged such that series DFF circuits each consisting of ten DFFs are arranged for nineteen line outputs, and DFFs ... 817 and 818 constitute a series DFF circuit consisting of nine DFFs connected to the output of the DFF 812. All the DFFs are driven by the CLK8 signal. A signal of "1" is output through AND gates 823, 824, and 825 when all the outputs from the DFFs 804, 808, ..., 812, and 816 (19 blocks in the vertical direction) and the DFFs 809, 810, 811, 812, 817, and 818 (19 blocks in the horizontal direction) are set at "1"s. Each block consists of 8 pixels/8 lines, which corresponds to about 0.5 mm$^2$ on an original. That is, if an infrared recognition mark continues by 9.5 mm in both the vertical and horizontal directions, the original position corresponding to almost the central position of the mark is latched as Position data in the latch 826 using the X and Y address data output from the main and sub scan counters. The latched data is sent to the CPU. The 9.5-mm size is set slightly smaller than the size of the mark in the copy forbidden original, so that the position of the mark can be accurately detected while eliminating the influence of noise components.

Figure 9:
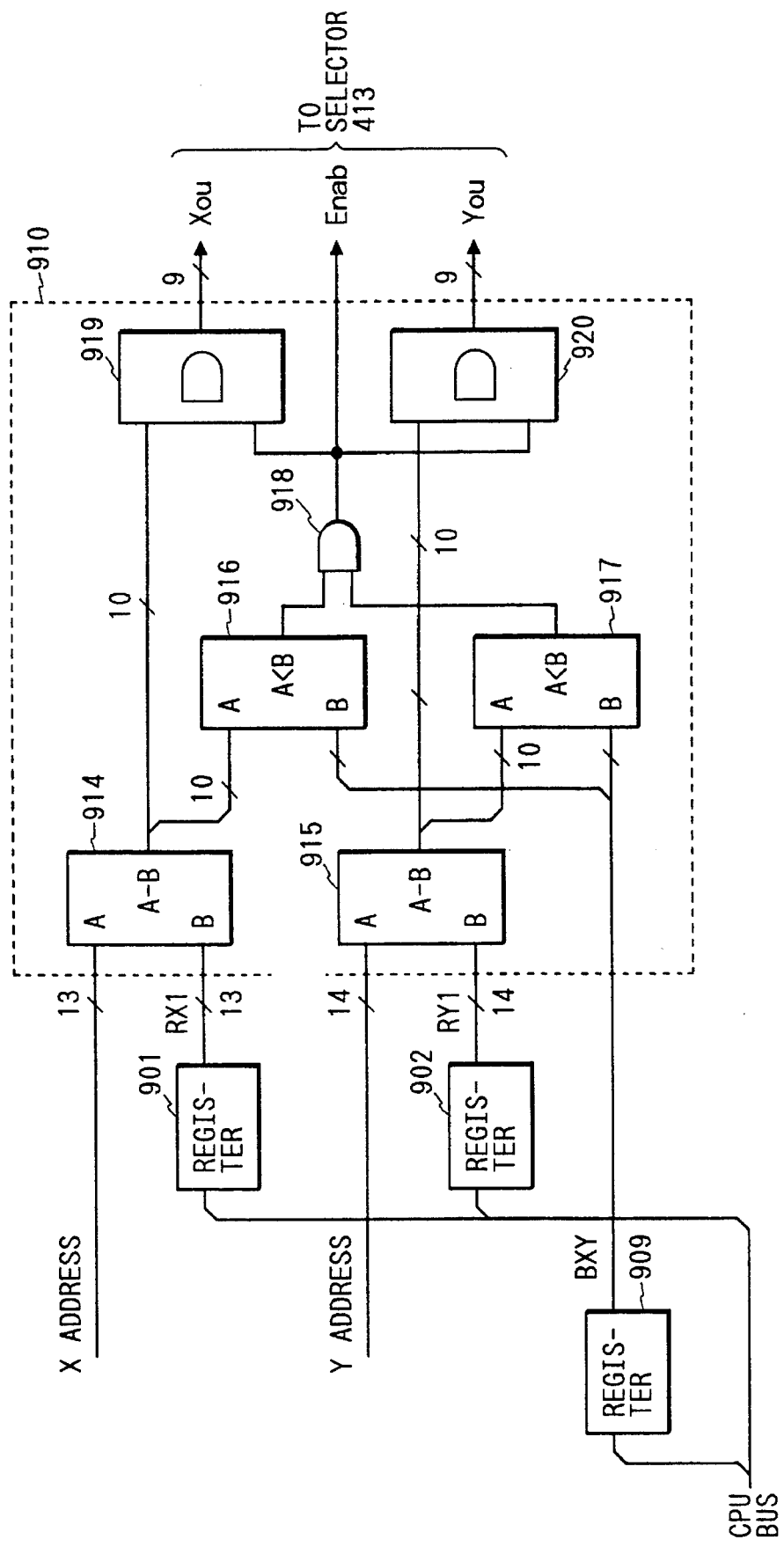
FIG. 9 is a block diagram showing an address generating unit for a memory for storing the infrared mark according to the first embodiment.

FIG. 9 is a block diagram of the address decoder 414.

Registers 901, 902, and 909 are directly coupled to the data bus of the CPU, and values of the detected Position data in the forms of 13 bits in the main scan direction and 14 bits in the sub scan direction are written by the CPU.

Subtracters 914 and 915 receive inputs A and B and output A−B. Only lower nine bits of the address data of the output A−B have a value, and a total of ten bits, i.e., these nine bits and a sign bit as the MSB, are input to AND gates 919 and 920 and comparators 916 and 917. The sign bit is output as MSB=1 when the calculation result of each subtracter becomes negative. Each of the comparators 916 and 917 outputs a signal of "1" when A<B is established in response to the inputs A and B. Note that if the MSB is "1", each comparator outputs a signal of "0" regardless of the input B.

An AND gate 918 and the AND gates 919 and 920 output the following signals:

$X_{ou}$=X address−RX1

$Y_{ou}$=Y address−RY1

Enab=1 if a value BXY is written in the register 909 and the following conditions are established:

$$RX1 < X \text{ address} < RX1 + BXY$$

$$RY1 < Y \text{ address} < RY1 + BXY \quad (1)$$

That is, an area having the size BXY in the vertical and horizontal directions is addressed using RX1 and RY1 as start addresses in main and sub scan operations.

[Detection of Hindrance Action Against Operation of Detecting Infrared Recognition Mark]

The present applicant previously proposed a scheme for determining whether a target original is a specified original by separately detecting light (ultraviolet or infrared rays) except for visible light from an original.

According to this detection scheme, the level of light reflected by the original is detected. For this reason, if a filter means such as an ultraviolet or infrared cut filter is inserted between the original and the platen glass, information supposed to be detected cannot be detected, resulting in inconvenience.

To the contrary, in this embodiment, an ink having characteristics for absorbing infrared rays is used, and a possibility of the presence of a recognition mark is detected when an infrared ray is not detected. As a hindrance action against an operation for detecting an infrared recognition mark, an infrared cut filter is inserted between the original and the original glass, and copying is performed under this condition. In this case, infrared components are cut from both an infrared ray from the light source to the original and light reflected by the original and incident on the IR sensor, and optical information is not input to the IR sensor. For this reason, infrared recognition information is determined to be present on the entire surface of the original, and an IRI signal is detected from the entire surface of the original. As a result, the recognition mark detecting operation is not normally performed.

In this embodiment, if a large number of pieces of infrared recognition information IRI are detected from an original, the presence of a hindrance action against an operation for detecting an infrared recognition mark is determined.

Normal paper and a normal printing ink reflects infrared rays, and IRI signals are not detected. However, if original information represents, e.g., carbon black, the carbon black absorbs infrared rays, and a large number of IRI signals are detected. Similarly, the above-mentioned green ink also absorbs infrared rays, and a large number of IRI signals are detected.

In this embodiment, an ink having characteristics similar to infrared recognition information included in a normal original is determined by visible information of the R, G, and B components, and the corresponding pixels are not used for detecting a hindrance action.

The color detecting circuit 421 detects using the color tone and brightness whether original information represents carbon black for each pixel. The color detecting circuit 422 detects a possibility of the green ink for each pixel. These detection results are logically ORed by an OR gate 423, and an IRI signal is forcibly set to "0" by an inverter 424 and an AND gate 425, and the corresponding pixels are not used for detecting a hindrance action such as use of an infrared cur filter in the block processing circuit 426 and the counter 427.

A signal from the AND gate 425 is subjected to noise elimination in the block processing unit 426. The TW value in FIG. 7 is set to "63", and if IRI signals are detected from all the pixels in the 8×8 block, the block processing unit 426 outputs a signal of "1".

This result is counted by the counter 427 for the entire area of the original.

Figure 14:
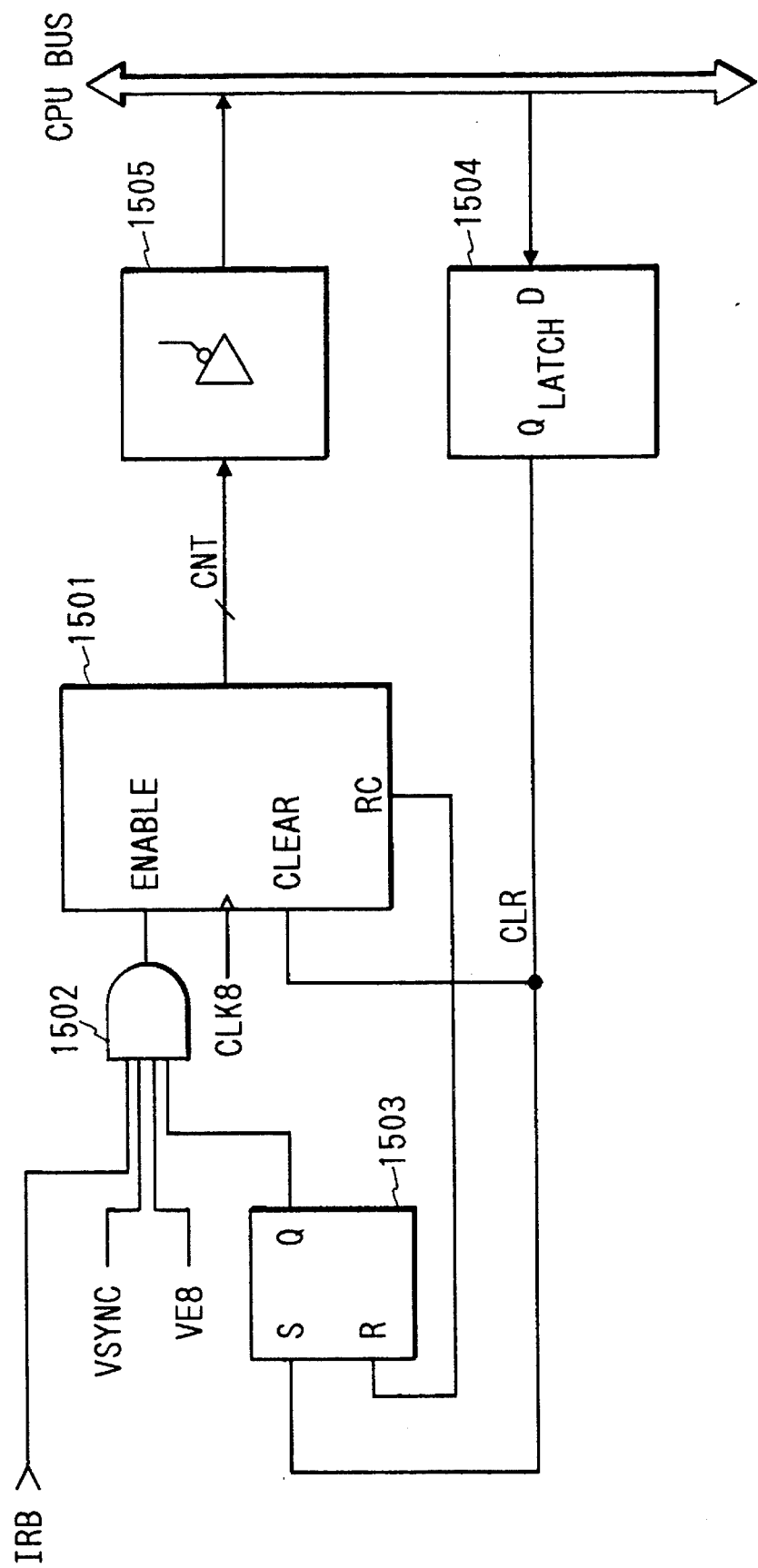
FIG. 14 is a block diagram of a count circuit according to the first embodiment.

FIG. 14 shows the arrangement of the counter 427. A typical copy forbidden original is a banknote. A General banknote has a size of 80 mm×160 mm. This size corresponds to about 51,200, 8×8 blocks (=160×320). In this embodiment, when about a half (25,600 blocks) of a banknote is covered with an infrared cut filter, the presence of a hindrance action against an operation for detecting a recognition mark is determined. For this purpose, a counter 1501 is a 15-bit counter for counting a maximum of 32,767. An AND Gate 1502 Gates an IRB signal from the block processing unit 426 in accordance with the VSYNC sub scan interval signal and the EV8 line interval signal output every eight lines. The CLK8 clock signal for every eight pixels is input to the counter 1501. The counting operation of the counter 1501 is controlled to be enabled in accordance with an output from the gate 1502. The counter counts the IRB signal for every 8×8 block. Prior to read scan of the original, the CPU clears the counter 1501 and sets a flip-flop 1503 through a latch 1504. When the count of the counter reaches a maximum value of 32,767, the flip-flop 1503 is reset. Subsequently, the counting operation of the counter is inhibited by the Gate 1502, and the counter 1501 keeps the maximum output as "32,767". The CPU can read the value of the counter 1501 through a buffer 1505, as needed.

[Processing Flow]

FIG. 3 shows the four scan cycles from the first scan cycle to the fourth scan cycle in the apparatus of this embodiment, three modes from mode 1 to mode 3 of the image scanner unit, and output contents at the printer unit.

Figure 10:
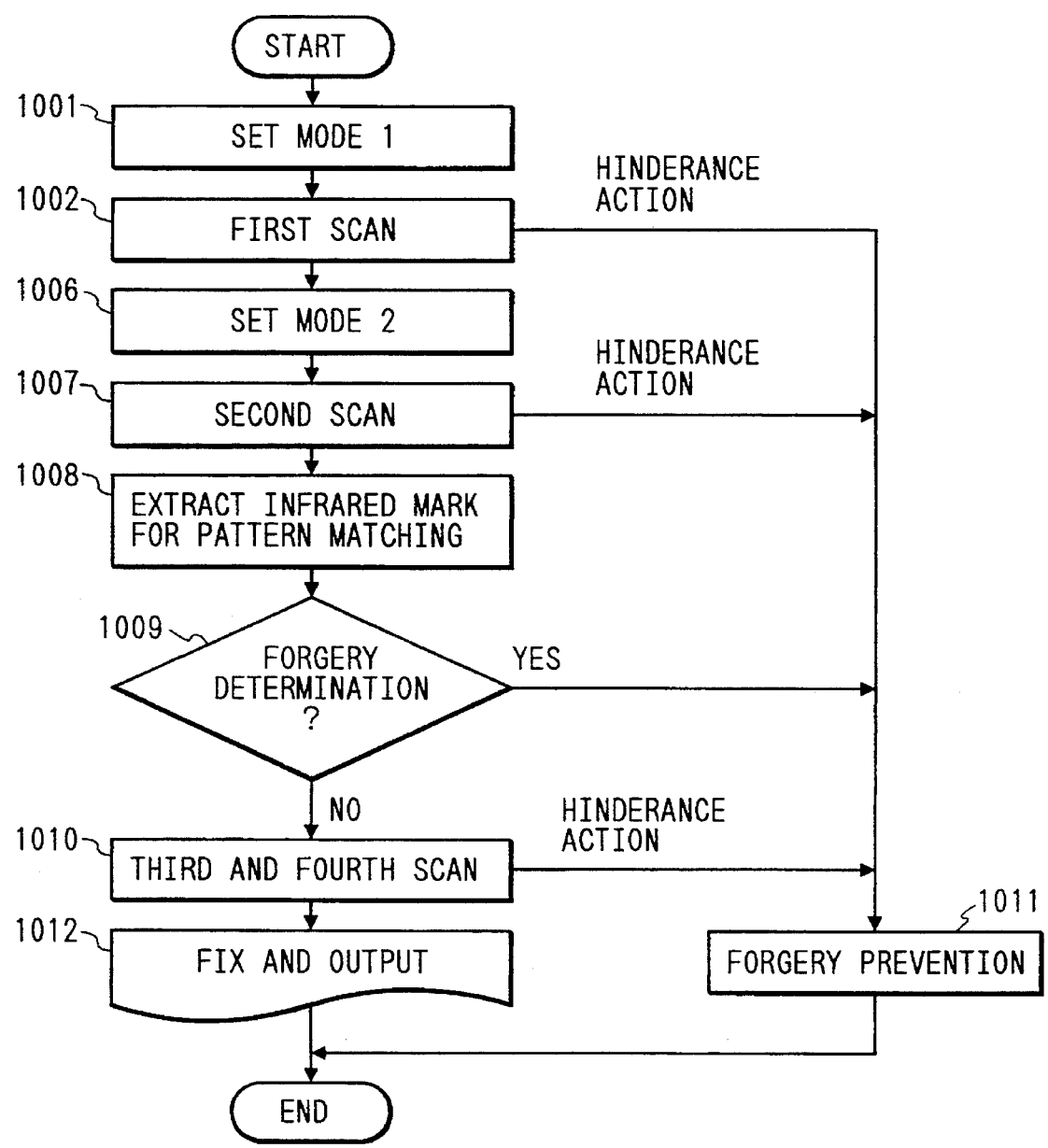
FIG. 10 is a flow chart showing control of a CPU according to the first embodiment.

FIG. 10 shows a processing flow under the control of the CPU. Referring to FIG. 10, mode 1 for the first scan cycle is set in the CPU in step 1001. At the same time, the counter 427 is cleared.

In this state, in step 1002, the first scan cycle is started. In mode 1, the magenta component is output at the printer unit, and at the same time the rough central position of an infrared recognition mark in a copy forbidden original is detected.

FIG. 4 shows a state in which the copy forbidden original is placed on the original table. In the first scan cycle, i.e., mode 1, an address corresponding to $(X_c, Y_c)$ is latched by a latch 826 at a portion corresponding to $(X_c, Y_c)$, i.e., the central portion of the infrared recognition mark portion, as indicated by a hatched portion. The latched address is sent to the CPU.

The CPU can roughly know the value of $(X_c, Y_c)$ as the center of the infrared recognition mark.

During the fist scan cycle, the CPU periodically reads the IRB count value of the counter 427. If this count value exceeds 25,600 blocks, as previously described, the CPU determines the presence of a hindrance action against an operation for detecting an infrared recognition mark. The CPU immediately writes FFH in the register 408 and attaches a magenta ink to the entire surface of the copying sheet, thereby preventing normal image formation. During the third and fourth scan cycles, a countermeasure against forgery in step 1101 is performed.

In step 1006, mode 2 for the second scan cycle is set. At this time, the selectors 411 and 413 are set to B and A, respectively, and the selectors 415 and 416 are set to B. The selector 411 is set to B so that the read IR data is input to the RAM every pixel. The selectors 415 and 416 are set to B, so that address data for detecting the recognition mark written in the RAM 412 is input to the address decoder. The selector 413 is set to A, so that addresses $X_{ou}$ and $Y_{ou}$ of the recognition code and Enab are input to the RAM 412, thereby sequentially writing IR data corresponding to the address.

In the address decoder 414, the position of the start address written in the RAM 412 to detect the infrared recognition mark is set in the registers 901 and 902 such that:

$RX1=X_{s1}$ and $RY1=Y_{s1}$ (units of pixels)

$X_c$ and $Y_c$ are data representing the central position of the mark in the 9.5-mm detection range, as described with reference to the mark detecting circuit in FIGS. 8A and 8B. To sufficiently cover the infrared recognition mark range having a diameter of 10 mm to 20 mm, the number of pixels (472 at 400 dpi) corresponding to about 30 mm is set in BXY. Values closer to the origin by 15 mm (236 pixels at 400 dpi) from $X_c$ and $Y_c$ are set as $X_{s1}$ and $Y_{s1}$. At the same time, the counter 427 is cleared.

In step 1007, the second scan cycle is set, and an infrared binary signal from the dotted area surrounding the infrared recognition mark in FIG. 4 is written in the RAM 412. Determination of a hindrance action against an operation for detecting an infrared recognition mark and an operation for preventing image formation on the basis of the determination of the hindrance determination are performed in the second scan cycle in the same manner as in the first scan cycle.

In step 1008, it is determined in accordance with an algorithm (to be described later) whether detection information represents an infrared recognition mark. If forgery is not determined in step 1009, i.e., if no infrared recognition mark is detected, the third and fourth scan cycles are performed in step 1010. A normal operation is performed to develop latent images with four color toners, i.e., Y, M, C, and Bk toners. A fixing operation is performed in step 1012. Determination of a hindrance action against an operation for detecting an infrared recognition mark and an operation for preventing image formation on the basis of the determination of the hindrance determination are performed in the third and fourth scan cycles in the same manner as in the first scan cycle.

On the other hand, if YES in step 1009, i.e., if a possibility of forgery is determined or an infrared recognition mark is detected, forgery prevention is performed in step 1011. More specifically, FFH is set in the register 408 in FIGS. 1A and 1B (normally 00H is set in this register), and FFH is sent to the printer unit. Y and Bk toners are applied to the entire surface, and copying is disabled.

[Pattern Matching]

Pattern matching of the infrared recognition mark in step 1008 will be described in detail.

Different marks may be formed on the upper and lower surfaces of a specified original in formation of infrared recognition marks. For this reason, two infrared recognition mark patterns for pattern matching are prestored to determine one copy forbidden original.

Figure 11:
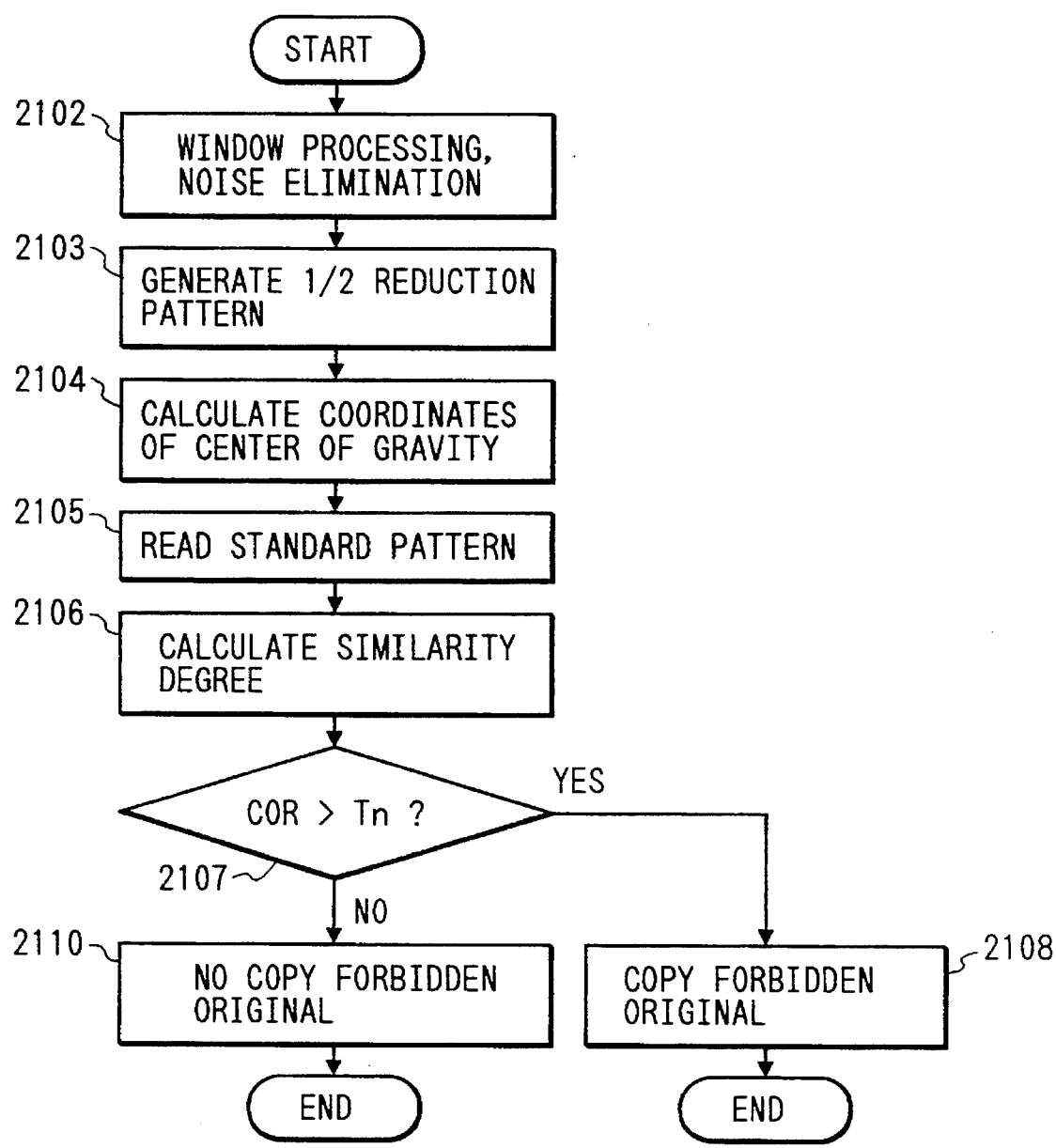
FIG. 11 is a flow chart for explaining a pattern matching operation of the CPU according to the first embodiment.

When a specified portion of a specified original is written in the RAM 412, the CPU 417 switches the selector 411 from B to C and the selector 413 from A to B to perform a pattern collation operation with reference to the contents of the RAM 412. A pattern collation flow chart is shown in FIG. 11. Binary data of the specified portion is stored in the RAM 412.

Processing from step 2102 is performed for this area. In step 2102, window processing is performed for noise elimination.

Assume that a binary image in area 1 is an image 2201 in FIG. 12. A small square represents one pixel. A white square represents a white pixel, and a cross-hatched square represents a black pixel. Assume that the binary image in FIG. 12 is scanned with a window of 2×2 pixels, that the number of black pixels within the window is counted, and that a portion whose count value exceeds 2 is newly defined as a black pixel. The processing result is reduced into ½ in both the vertical and horizontal directions, as indicated by 2203, thereby obtaining a pattern free from noise. The number of black pixels within the window at a position 2202 is one, and this window is replaced with a white pixel at a position 2204.

The center of gravity of a pattern 2203 is calculated.

The pattern 2203 is projected in the vertical and horizontal directions to calculate the center of gravity in accordance with a known method.

A similarity degree is calculated in accordance with standard pattern matching. A standard pattern registered as a dictionary in step 2105 is loaded from the ROM 418 of FIGS. 1A and 1B to the CPU. The standard pattern is the infrared recognition pattern 2303 for a copy forbidden original as a target object. A pattern extracted until step 2103 may be rotated in accordance with an angle at which the original 2302 is placed on the original table 2301. If this pattern is used as a single standard pattern, a satisfactory result cannot be obtained.

Figure 13A:
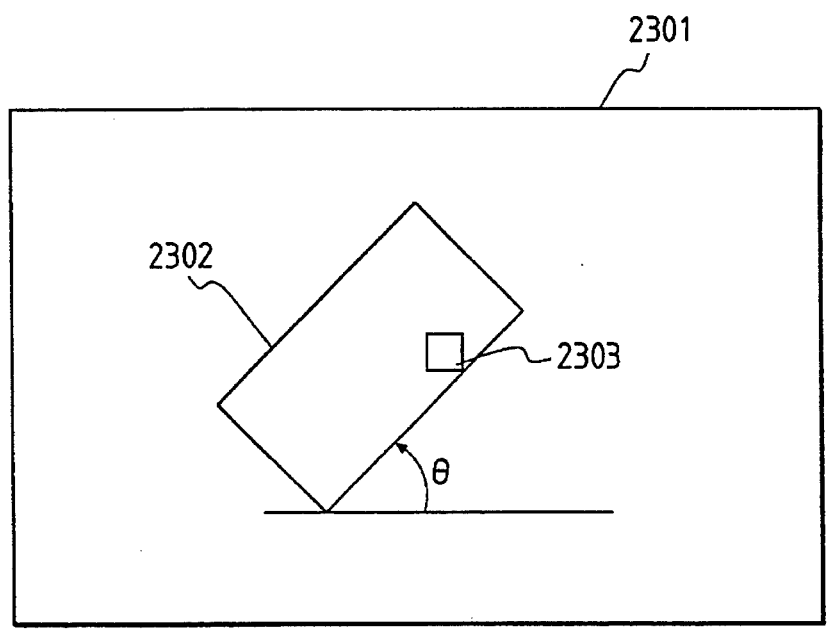
FIGS. 13A to 13C are schematic views of pattern matching of the infrared mark according to the first embodiment.
Figure 13B:
Figure 13C:

This state is shown in FIGS. 13A to 13C. As standard patterns, a plurality of patterns obtained by rotating an infrared recognition pattern every several degrees are prepared and stored in a ROM, and an appropriate pattern is selected and loaded in the CPU. The plurality of patterns are a total of 24 patterns obtained by, e.g., rotating a mark every 15 degrees within the range of 0 degrees to 360 degrees. Various methods can be considered for calculating a similarity degree. For example, an extracted pattern is shown in FIG. 13A, a standard pattern rotated at a predetermined angle $\Theta$ and selected from the patterns obtained by rotating the mark every 15 degrees in accordance with the above method is obtained, as shown in FIG. 13B, and these patterns are represented as B(i,j) and P(i,j) (B(i,j) and P(i,j) represent 1 for a black pixel and 0 for a white pixel). The coordinates of the center of gravity of B(i,j) obtained in step 2104 of FIG. 11 are defined as $(i_{BC}, j_{BC})$, and the coordinates of the center of gravity of P(i,J) obtained by a method similar to the method described above are defined as $(i_{PC}, j_{PC})$. A similarly degree COR between these patterns is obtained by comparing the center of gravity of one data with that of the other data as follows:

$$COR = \sum_i \sum_j P(i - i_{PC}, j - j_{PC}) \star B(i - i_{BC}, j - j_{BC}) \quad (1)$$

where ☆ represents the exclusive OR of P and B. Equation (1) represents a Hamming distance when the center of gravity of the pattern B(i,j) matches that of the pattern P(i,j). A similarity degree between these two patterns is larger when the value COR is larger.

In this embodiment, to increase the similarity degree reliability and minimize recognition errors, the similarity degree COR using equation (2) obtained by rewriting equation (1) is obtained:

$$COR = 2 \times \left( \sum_i \sum_j P(i - i_{PC}, j - j_{PC}) \times B(i - i_{BC}, j - j_{BC}) \right) - \left( \sum_i \sum_j \overline{P(i - i_{PC}, j - j_{PC})} \times B(i - i_{BC}, j - j_{BC}) \right) \quad (2)$$

where . represents the AND.

$\overline{P(i - i_{PC}, j - j_{PC})}$ represents determination of the pattern P. If the patterns P and B represent black pixels, 2 is added to the similarity degree COR. If P=0 and B=1, then 1 is subtracted from the similarity degree COR, thereby greatly improving recognition precision.

When the similarity degree COR is calculated as described above, a predetermined Th is compared with COR in step 2107.

If COR>Th, then the presence of an infrared mark is determined, and the presence of a copy forbidden original (2108) is determined, thereby completing the collation operation.

However, if COR<Th, the absence of an infrared mark within the target area is determined, and the absence of a copy forbidden original (2110) is determined, thereby completing the collation operation.

<Second Embodiment>

Figure 33:
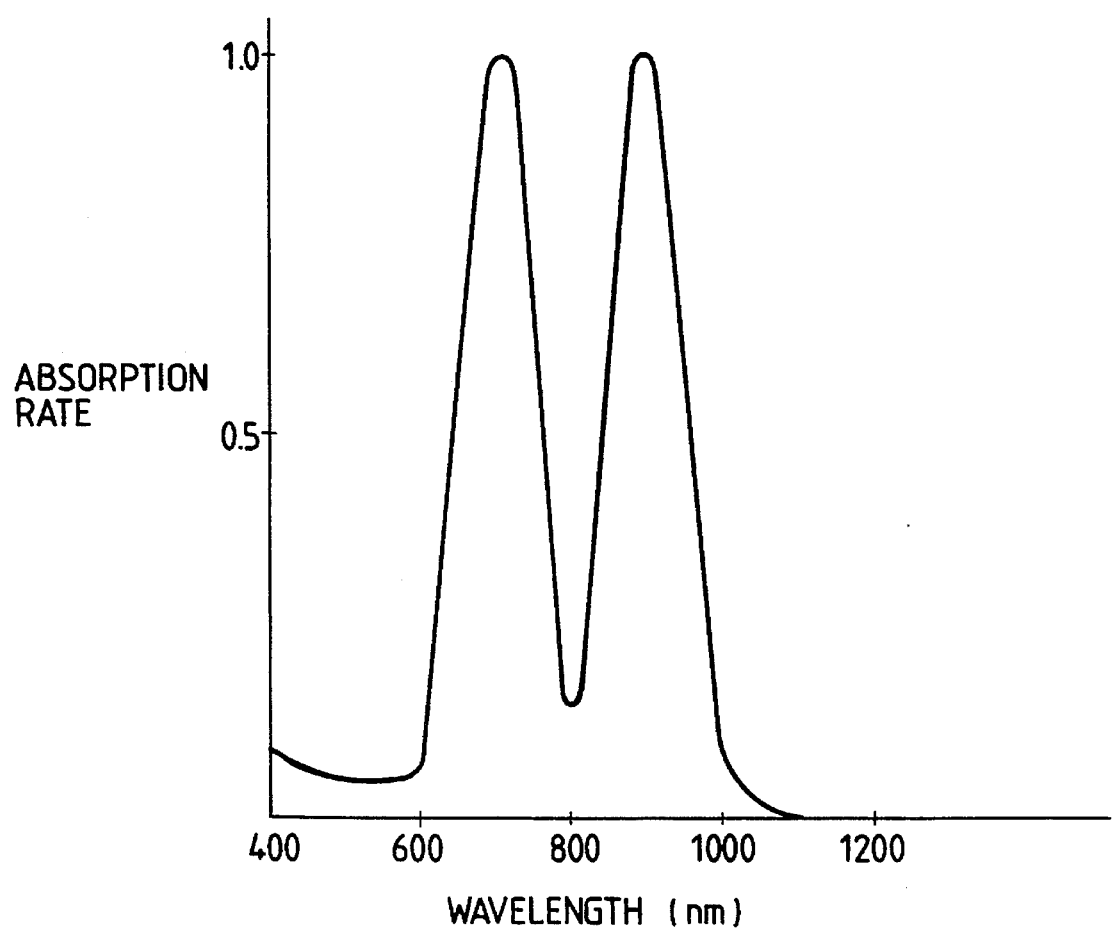
FIG. 33 is a graph showing the light absorption characteristics of a recognition mark according to the second embodiment.

FIG. 33 shows the absorption spectral characteristics of a copy forbidden original recognition mark (to be referred to as a recognition mark hereinafter) included in a copy forbidden original as a target object of this embodiment.

The recognition mark of this embodiment has characteristics almost transparent to visible light. Infrared information can be detected without causing a General user to notice the presence of the recognition mark in the copy forbidden original.

The ink having the absorption characteristics for one wavelength of the first embodiment may be used in General originals. In this embodiment, as shown in FIG. 33, a recognition mark recorded with an ink for absorbing light in the wavelength ranges of about 700 nm and 900 nm and reflecting an infrared ray having a wavelength of 800 nm is detected. The absorption and reflection characteristics of the light components in these three wavelength ranges are detected to detect the presence of a recognition mark. The second embodiment can further reduce determination errors for general originals than the first embodiment for detecting the absorption characteristics for one wavelength.

A hindrance action against an operation for detecting an infrared recognition mark, described with reference to the first embodiment, is detected using these three wavelengths.

Figure 22:
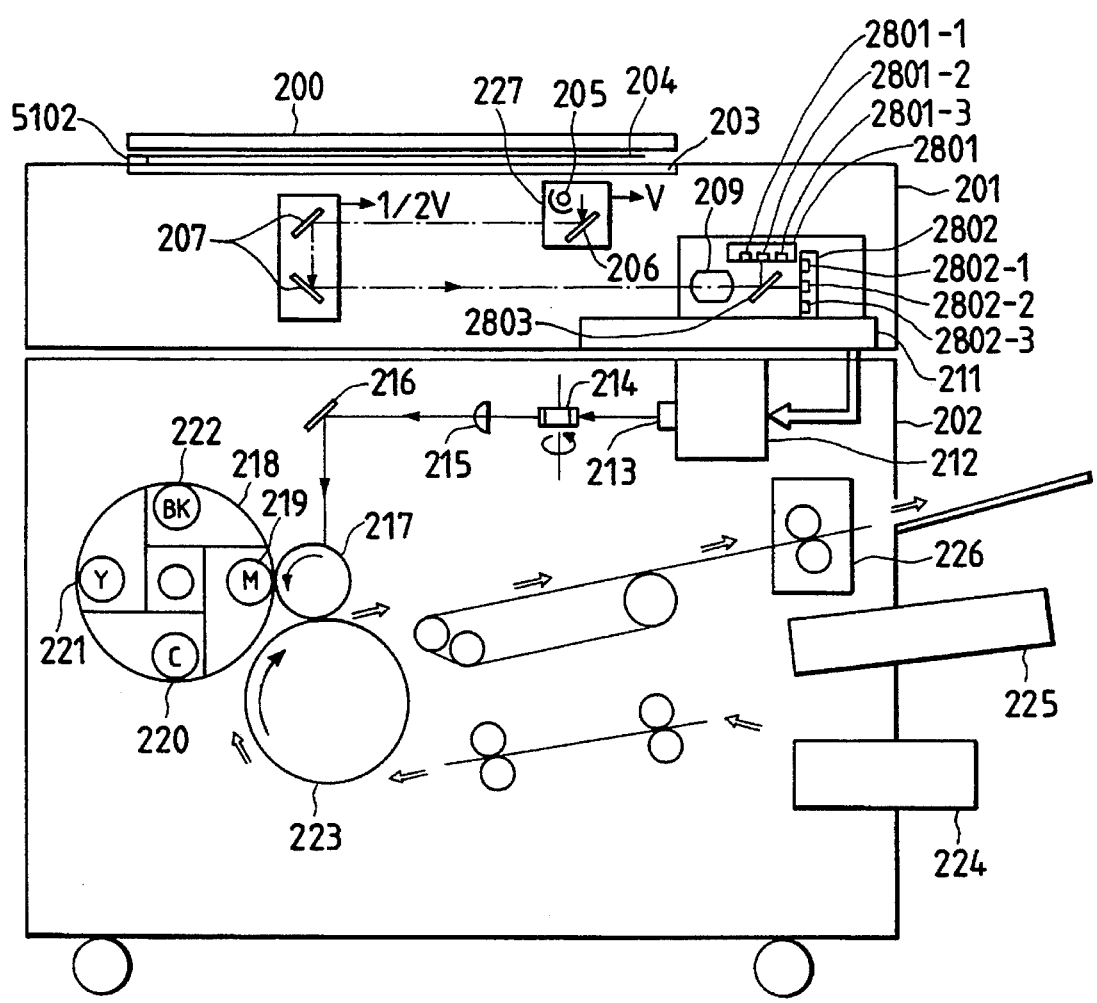
FIG. 22 is a view showing the structure of a color copying apparatus according to the second embodiment.

FIG. 22 shows the arrangement of a copying machine of this embodiment. The arrangement in FIG. 22 is substantially the same as that of FIG. 2 except that the arrangement of a CCD read sensor is changed. A 3-line CCD 2801 reads an infrared information. A 3-line CCD 2802 reads only visible information. Light passing through a lens 209 is incident on the two CCDs by a half mirror 2803.

FIG. 23 shows the structure of the infrared 3-line CCD 2801. This CCD has almost the same structure as described with reference to FIGS. 16A and 16B. The sensor pitch is 80 μm. A sensor 2801-1 reads an infrared ray having a wavelength centered on 700 nm, a sensor 2801-2 reads an infrared ray having a wavelength centered on 800 nm, and a sensor 2801-3 reads an infrared ray having a wavelength centered on 900 nm.

Figure 34:
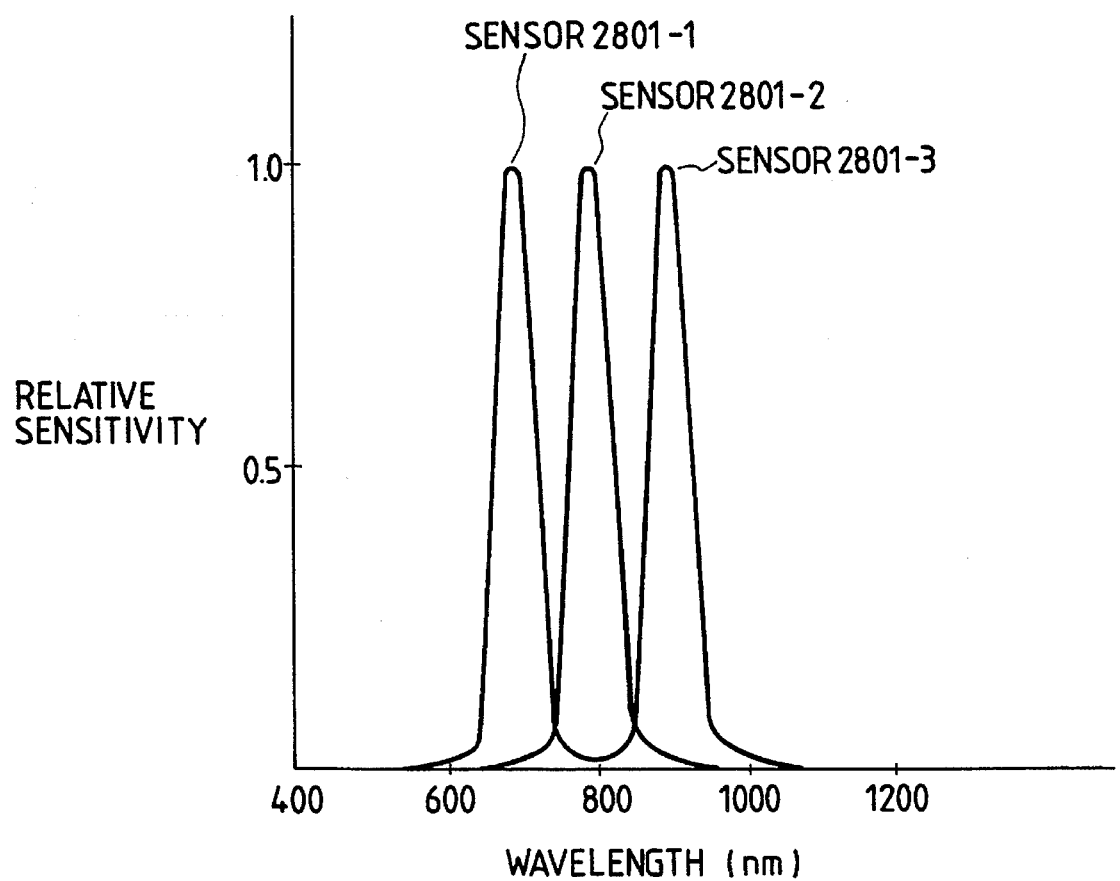
FIG. 34 is a graph showing the spectral sensitivity characteristics of a 3-line infrared CCD according to the second embodiment.

FIG. 34 shows the spectral characteristics of filters formed on the sensors 2801-1, 2801-2, and 2801-3.

FIG. 24 shows the structure of the visible information read 3-line CCD 2802. This CCD has almost the same structure as that described with reference to FIGS. 16A and 16B. The sensor pitch is 80 μm. A sensor 2802-1 reads R optical information, a sensor 2802-2 reads G optical information, and a sensor 2802-3 reads B optical information. The spectral characteristics of these sensor are the same as those of FIG. 21 and have no sensitivity to infrared rays.

Figure 25:
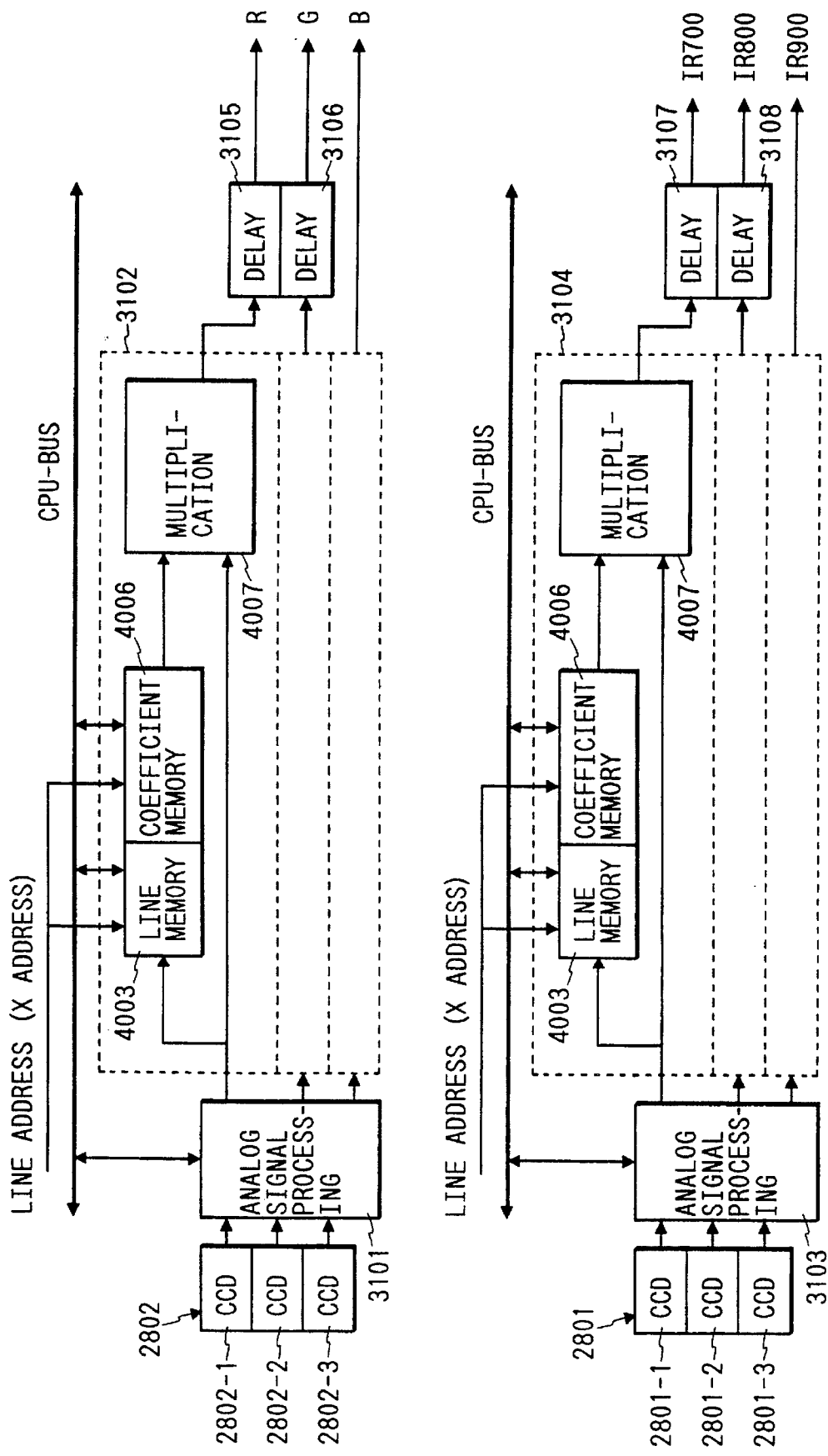
FIG. 25 is a view showing the arrangement of a signal processing unit according to the second embodiment.
Figure 26B:
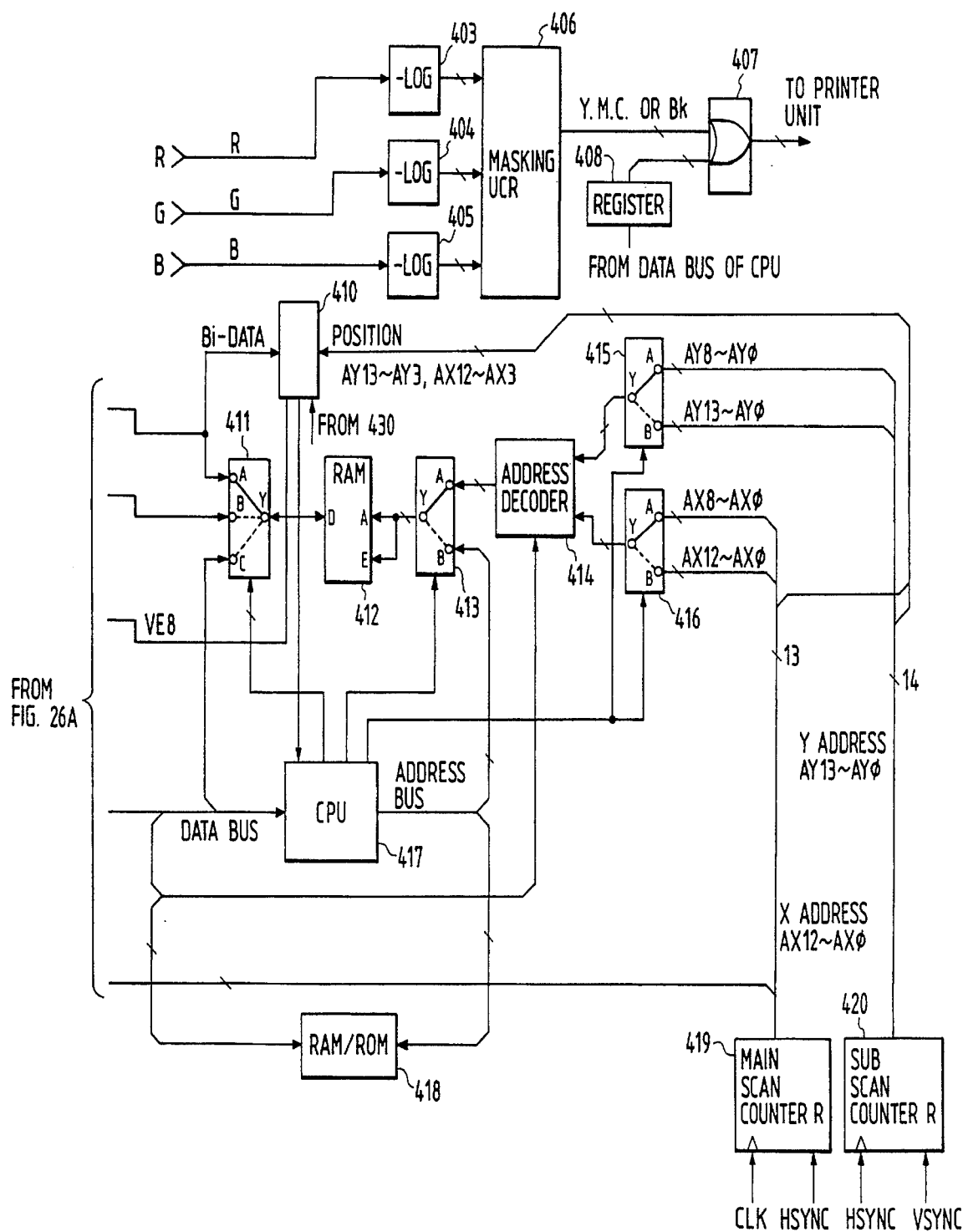
FIG. 26 is comprised of FIGS. 26A and 26B showing block diagrams of the arrangement of the signal processing unit according to the second embodiment.

FIGS. 25, 26A and 26B are block diagrams of a control circuit according to this embodiment. The same reference numerals as in FIGS. 1A and 1B denote the same parts in FIGS. 25, 26A and 26B. An output from the visible CCD 2802 and an output from an infrared CCD 2801 are input to analog processing circuits 3101 and 3103 having the same arrangement as the analog signal processing unit 4001 in FIGS. 1A and 1B. A method of controlling signals of the read visible signal and the infrared rays is the same as that described with reference to the first embodiment. The processed analog signals are subjected to the same shading correction as described with reference to the first embodiment in shading correction circuits 3102 and 3104. The R and G signals read by the CCD sensors 2802-1 and 2802-2 are phase-locked with the B signal by line delay circuits 3105 and 3106 in the sub scan direction in the same manner as in the first embodiment. IR700 and IR800 signals read by the CCD sensors 2801-1 and 2801-2 are phase-locked with an IR900 signal by line delay circuits 3107 and 3108 in the sub scan direction in the same manner as in the first embodiment.

A binarization circuit 3109 binarizes the IR700, IR800, and IR900 signals. These signals are binarized using 127 levels with respect to 8-bit signals. An output of "1" from the binarization circuit represents that an infrared ray is detected. An output of "0" from the binarization circuit represents that an infrared ray is not detected.

The IR700 and IR900 binary signals are inverted by inverters 3110 and 3111, respectively. The inverted signals are logically ANDed with the IR800 binary signal by an AND gate 3112. That is, an output from the AND gate 3112 is set at "1" when infrared information having the spectral characteristics of an infrared recognition mark shown in FIG. 33 is read. The output from the AND gate 3112 has the same meaning as that of the IRI signal in FIGS. 1A and 1B are input to a block processing circuit 409. An operation of detecting the recognition mark using this signal is the same as in the first embodiment, and a detailed description thereof will be omitted.

Figure 40B:
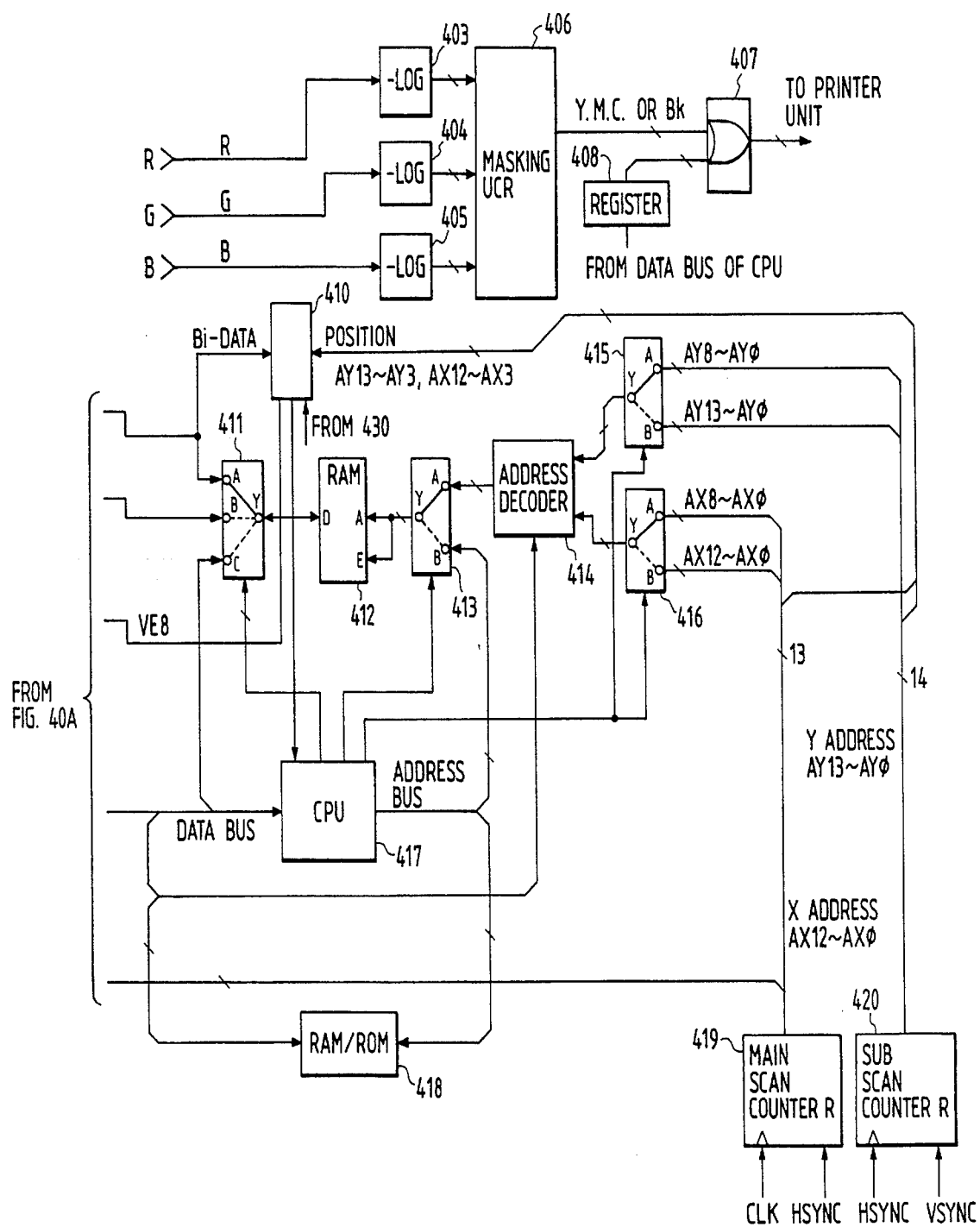
FIG. 40 is comprised of FIGS. 40A and 40B showing block diagrams for preventing a hindrance action using only an infrared absorbing wavelength of an actual copy forbidden original according to the second embodiment.

Inverted signals of the IR700, IR800, and IR900 binary signals are logically ANDed by an AND gate 3114. This AND signal represents that no optical information of each of the infrared rays having the wavelengths 700 nm, 800 nm, and 900 nm is detected. An output of "1" from the AND gate 3114 represents a high possibility that an infrared cut filter or the like is inserted below the original. This signal is logically ANDed with the color tone information of the original by an AND gate 425 as in the first embodiment and is used to detect a hindrance action against an operation for detecting an infrared recognition mark. In addition, as shown in FIG. 40, an inverter 3113 is omitted to detect only the infrared absorption wavelength band of an actual copy forbidden original, thereby obtaining more advanced hindrance prevention.

Control of the actual sequence of the CPU, a method of detecting an infrared recognition mark, and the like are the same as those in the first embodiment.

<Third Embodiment>

Figure 35:
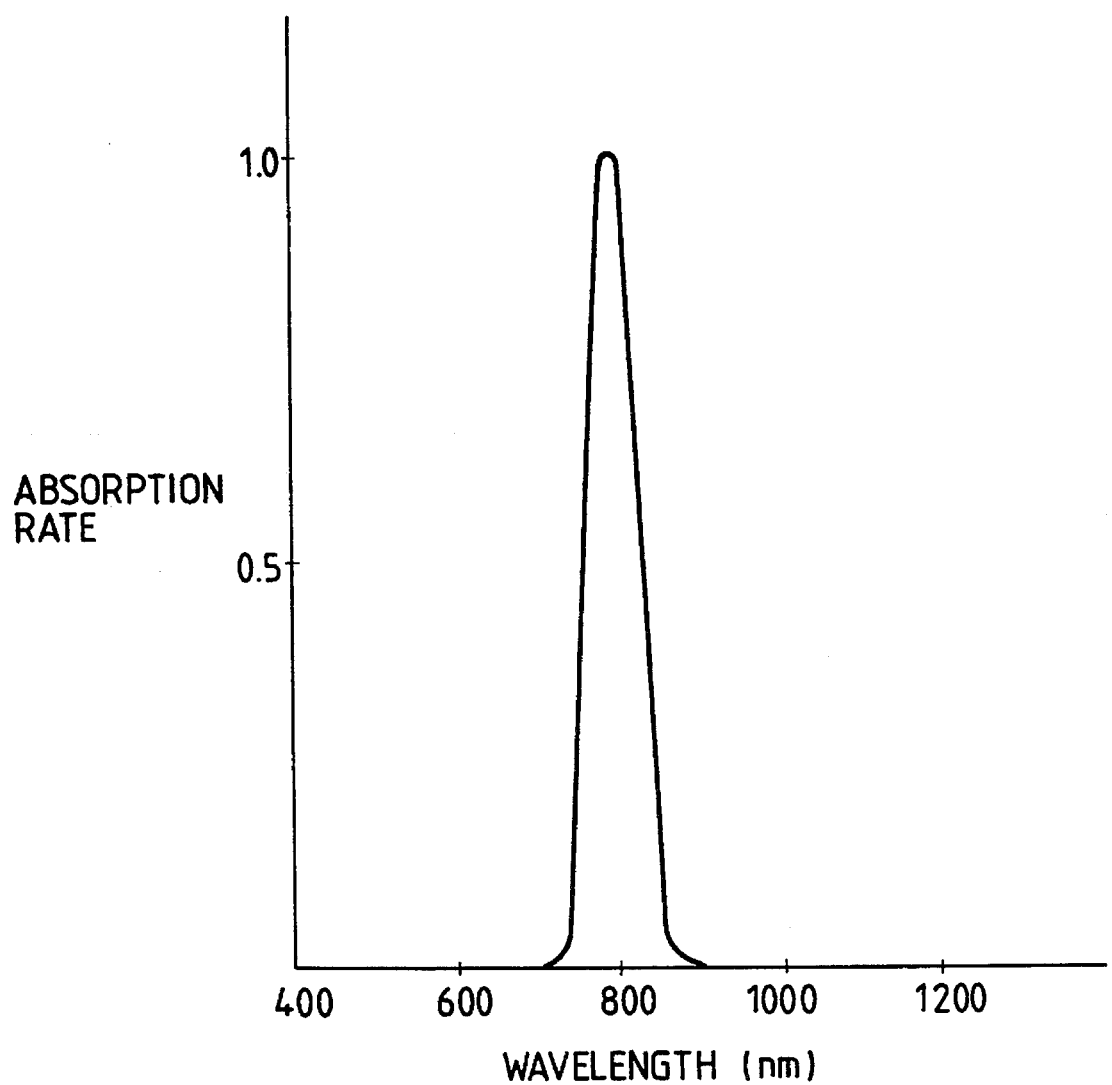
FIG. 35 is a graph showing the spectral absorption characteristics of a recognition mark according to the third embodiment.

FIG. 35 shows the absorption spectral characteristics of a copy forbidden original recognition mark (to be referred to as a recognition mark hereinafter) included in a copy forbidden original as a target object of this embodiment.

The recognition mark of this embodiment has characteristics almost transparent to visible light. Infrared information can be detected without causing a general user to notice the presence of the recognition mark in the copy forbidden original.

The recognition mark has characteristics for absorbing an infrared ray having a wavelength of, e.g., about 800 nm as in the first embodiment. In the third embodiment, the recognition mark recorded with an ink for absorbing light having a wavelength of 800 nm. In addition, characteristics for reflecting infrared rays having wavelengths of 700 nm and 900 nm as adjacent absorption bands of the 800-nm absorption band are also detected. The light absorbing and reflecting characteristics in these three wavelength ranges are detected to detect the presence of a recognition mark. Erroneous determination for a general original can be further prevented as compared to the first embodiment which detects the absorption characteristics of one wavelength.

An operation for detecting a hindrance action against an operation for detecting an infrared recognition mark, described with reference to the first embodiment, is performed in these three wavelength ranges.

The arrangements of a copying machine and a CCD of this embodiment are the same as those of the second embodiment in FIGS. 22, 23, and 24.

Figure 27:
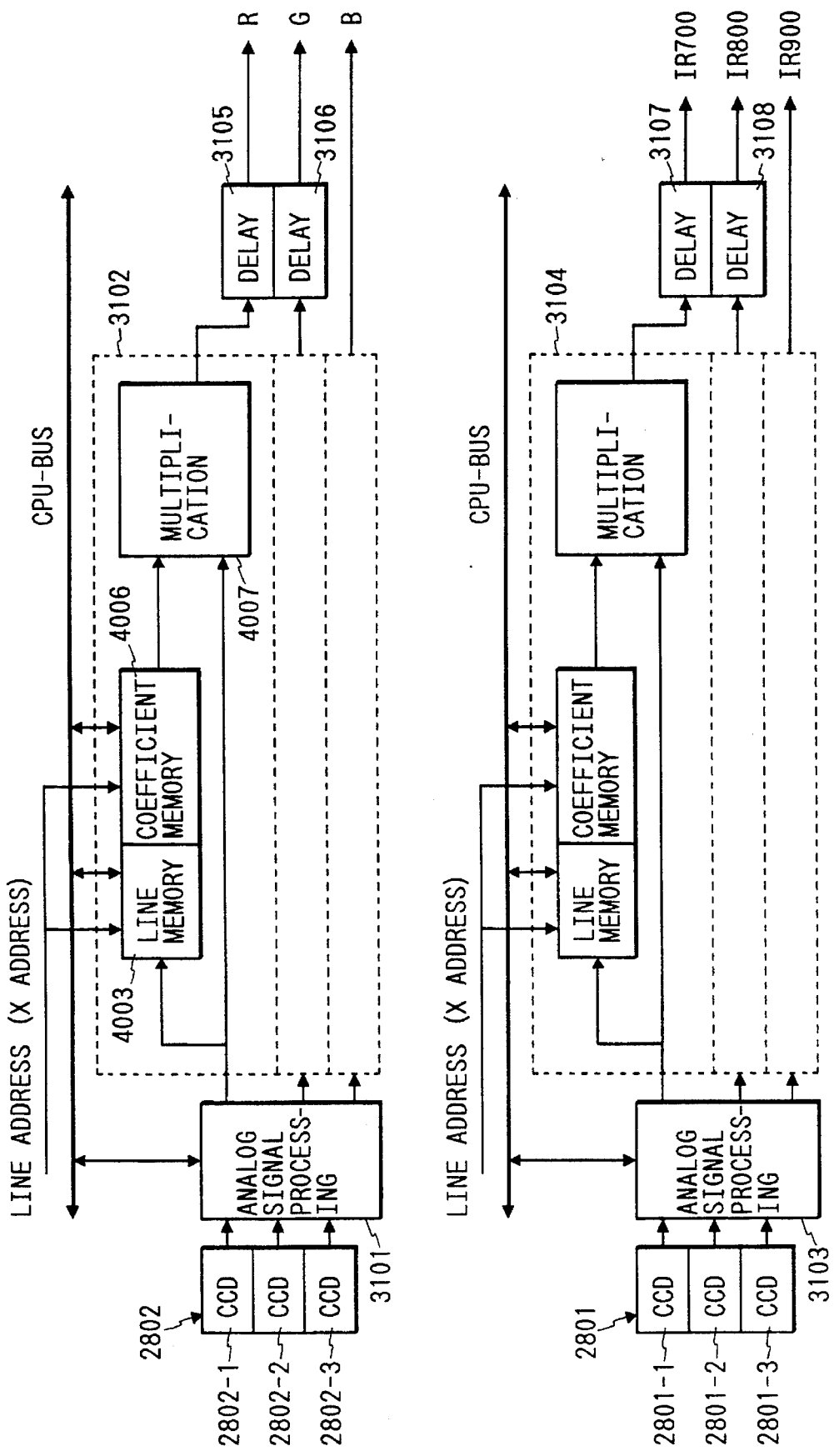
FIG. 27 is a view showing the arrangement of a signal processing unit according to the third embodiment.
Figures 28, 28A:
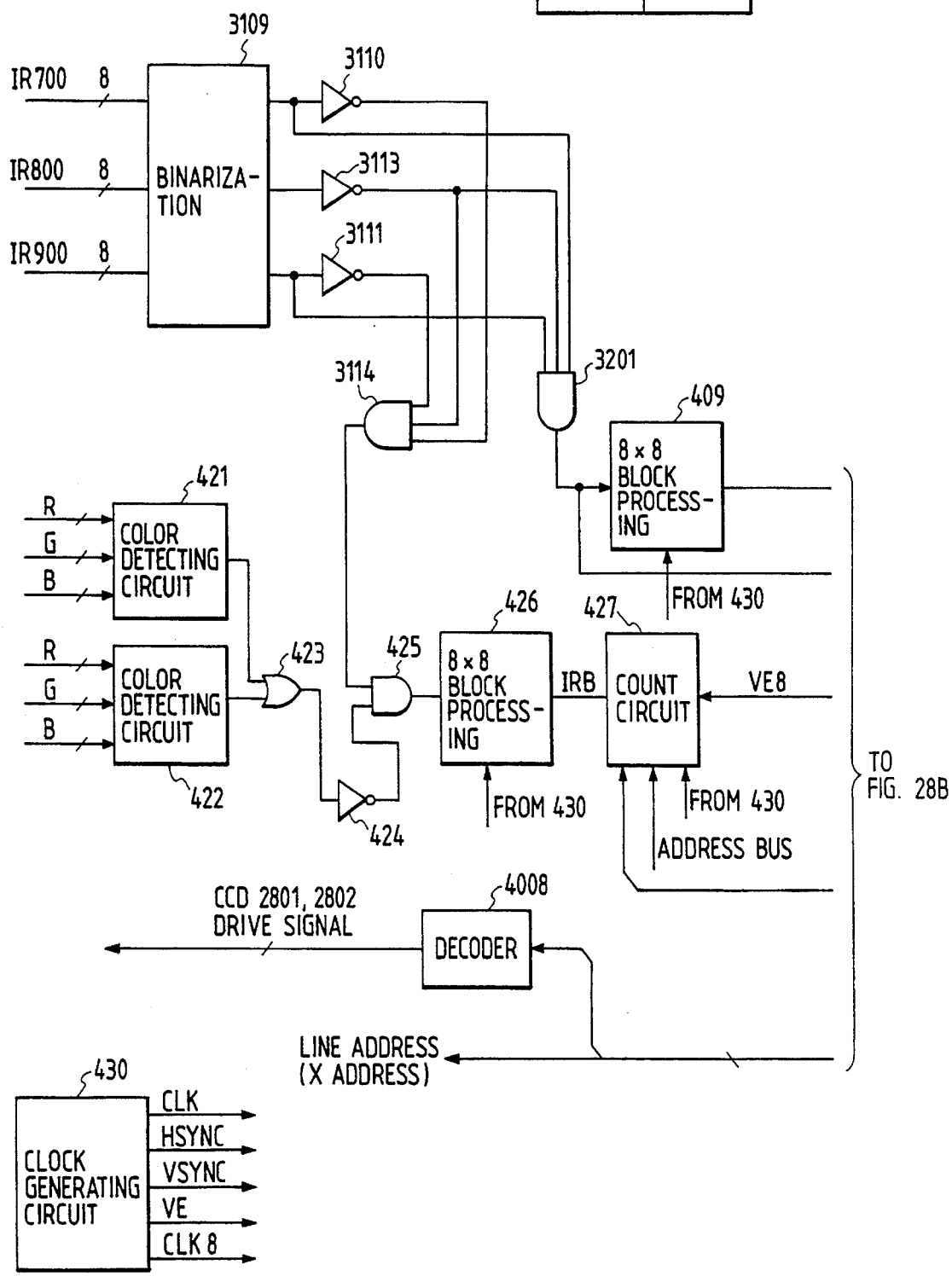
FIG. 28 is comprised of FIGS. 28A and 28B showing block diagrams of the arrangement of the signal processing unit according to the third embodiment.
Figure 28B:
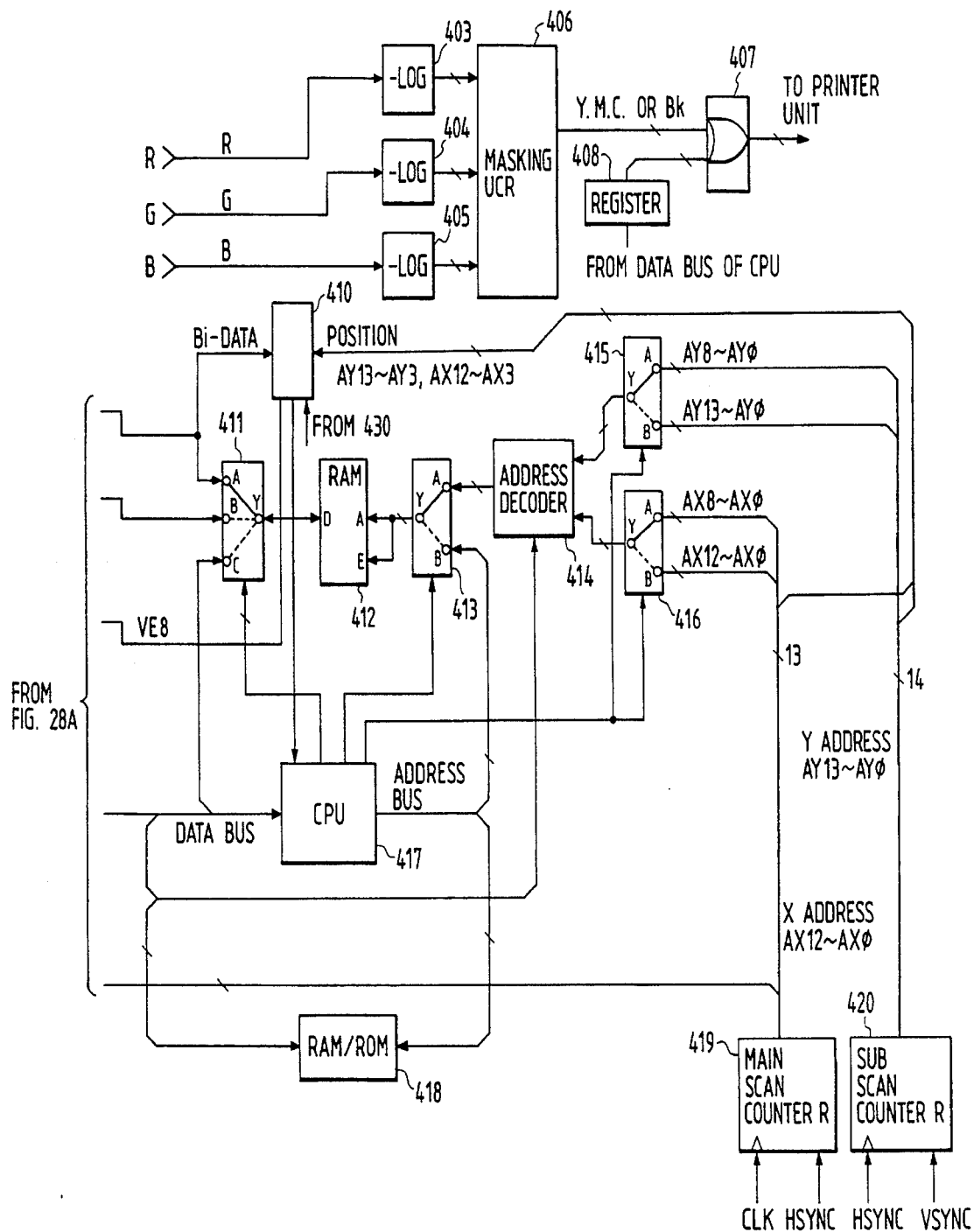

The control blocks of the third embodiment are shown in FIGS. 27, 28A and 28B. The control blocks of the third embodiment are almost the same as those of the second embodiment in FIGS. 25, 26A and 26B, except that an AND gate 3201 for detecting infrared information of the spectral characteristics of an infrared recognition mark is different from that in FIGS. 25, 26A and 26B. When an original which reflects optical information of each of the wavelengths of 700 nm and 900 nm shown in FIG. 34 and absorbs 800-nm optical information is read, the AND gate 3201 outputs "1". This signal of "1" has the same meaning as that of the IRI signal in FIGS. 1A and 1B are input to a block processing circuit 409. An operation of detecting the recognition mark using this signal is the same as that in the first embodiment, and a detailed description thereof will be omitted. The output of "1" from the AND gate 3114 represents a possibility that an infrared cut filter or the like is placed under the original. This signal is logically ANDed with the color tone information of the original by an AND gate 425 as in the first embodiment. The resultant signal is used for detecting a hindrance action against an operation for detecting an infrared recognition mark.

Control of the actual copy sequence of the CPU, a method of detecting an infrared recognition mark, and the like are the same as those in the first embodiment.

<Other Embodiments>

The above embodiments have exemplified detection of recognition marks with infrared rays. However, the present invention is not limited to infrared rays, but can be extended to ultraviolet optical information.

In the above embodiments, optical information having a plurality of wavelengths except for visible wavelengths is used to detect recognition marks. However, at least one of a plurality of pieces of optical information used in this detection may be visible information.

In the above embodiments, seal marks are used as recognition marks. However, the recognition marks are not limited to seal marks, but may be periodic patterns.

The above embodiments have exemplified carbon black and the green ink as materials for almost absorbing infrared rays. However, the materials are not limited to carbon black and the green ink.

In the above embodiments, recognition marks are detected simultaneously with copy operations. However, recognition operations may be performed independently of the copy sequences.

In the above embodiments, the independent sensor means for reading visible information and infrared information are arranged. However, a common sensor means may be used and be switched using a spectral filter, thereby detecting the visible information and information other than the visible information by a common sensor. In this case, when visible information and information other than the visible information of an original is to be determined, one of the kinds of information may be stored in a memory.

In each of the above embodiments, the common light source is used to read visible information and information other than the visible information. However, a plurality of light sources having different wavelength characteristics may be used.

Figure 37A:
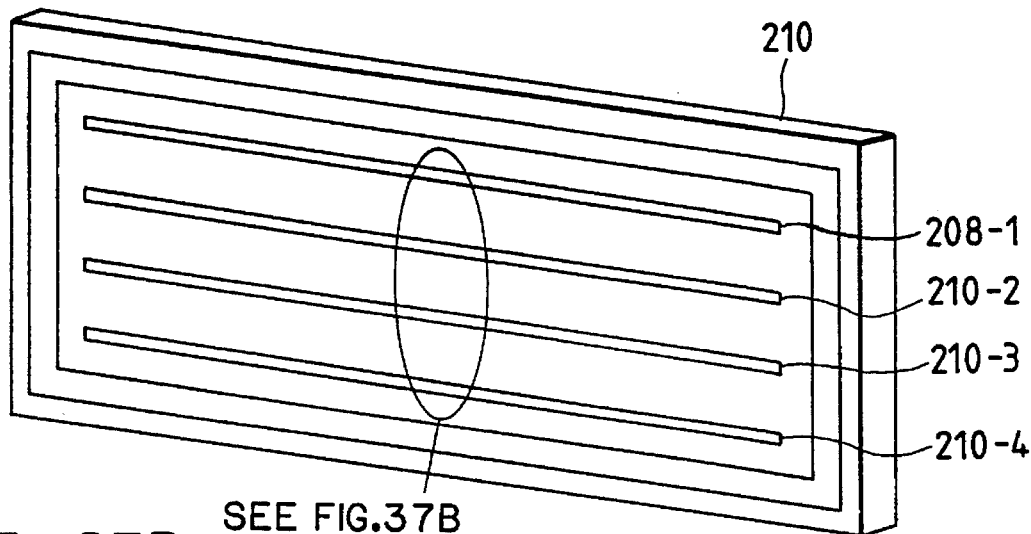
FIGS. 37A and 37B are views showing another arrangement of the line sensor.

In each of the second and third embodiments, to read infrared rays having a plurality of wavelengths, a plurality of line sensors shown in FIG. 23 are arranged. However, the plurality of line sensors may be replaced with a one-line sensor, the arrangement of which is shown in FIGS. 37A and 37B.

The one-line sensor has almost the same arrangement as that of the CCD in FIGS. 16A and 16B. The one-line sensor monolithically has three line sensors 210-2 to 210-4 for reading visible information and a sensor 208-1 for simultaneously reading pieces of infrared information in the three infrared wavelength bands.

Figure 37B:
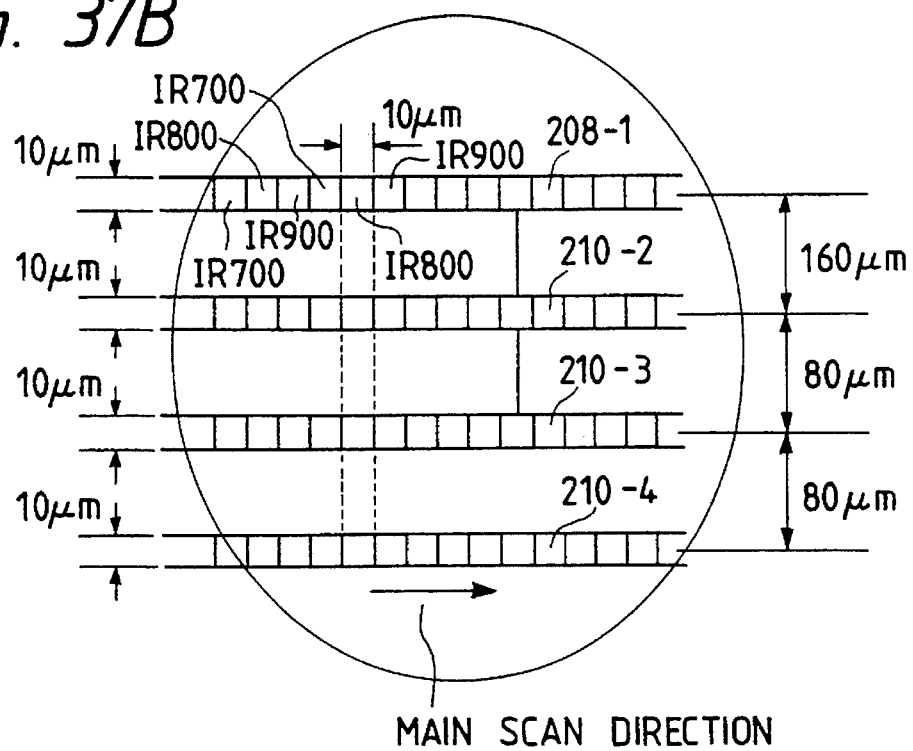

As shown in the enlarged view of pixels in FIG. 37B, filters having transmission characteristics in the 700-, 800-, and 900-nm bands (FIG. 34) are adhered in units of pixels. That is, infrared signals of the respective wavelengths read by this sensor have a ⅓ resolution (133 dpi) of the visible information resolution (400 dpi). To cope with this sensor, an output IR from a delay 401 is separated into IR700, IR800, and IR900 by three F/F 20903 to 20905 in the circuit of FIG. 38, using an analog processing unit 4001 (FIGS. 1A and 1B) and a shading correction circuit 4002 (FIGS. 1A and 1B). The separated signals are input to a determination circuit shown in FIG. 26.

An up counter 20901 repeatedly counts values from 0 to 2. A decoder outputs a clock signal to each F/F in accordance with the count value of the up counter 20901. The counter 20901 is cleared by an HSYNC line sync signal and is synchronized with the read operation of the CCD. As a result, an output from a decoder 20902 is generated such that each infrared signal input through an IR signal line is held in the corresponding F/F.

According to each of the above embodiments, the optical characteristics inherent to an original are detected to detect a hindrance action against an operation for determining a specified original so as to detect the optical characteristics of the original. An illegal action for copying a copy forbidden original such as a banknote can be more perfectly prevented.

In addition, for example, a hindrance action of inserting a filter for distorting the optical characteristics of a recognition mark between an original and the platen glass can be easily detected because the light absorbing characteristics of a material for recording a mark are used to detect the recognition mark of the specified original. That is, a general filter is made of a material having characteristics for absorbing light. When an attempt to hinder the operation of detecting the recognition mark is made using a filter, the filter attenuates only the wavelength component of the recognition mark. According to the present invention, a recognition mark is detected at a wavelength absorbed by a material for forming the recognition mark, so that the recognition mark and the hindrance action can be detected using the same signal, thereby simplifying the apparatus.

The pieces of information of a plurality of wavelengths except for the visible wavelengths are used to detect a recognition mark of a specified original. For this reason, the recognition mark can be accurately detected independently of the visible information of the original.

As has been described above, according to the present invention, a specified original can be accurately determined.

A hindrance action in determination of a specified original can be accurately determined to effectively prevent the specified original from being copied.

Detection of a specified original according to the present invention is also applicable to a scanner connected to a computer or an image forming apparatus connected to the scanner.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for controlling output of visible component data corresponding to an original in accordance with infrared reflected light detected from the original, comprising:

detecting means for detecting the presence or absence of a pattern formed on the original on the basis of the infrared reflected light; and control means for determining that the original is a specified original in accordance with the result of the detection by said detecting means, and for controlling the visible component data output in accordance with the determination.

2. An apparatus according to claim 1, wherein said control means forbids the visible component data output.

3. An apparatus according to claim 1, further comprising storage means for storing a predetermined pattern compared with the pattern detected by said detecting means.

4. An apparatus according to claim 3, wherein the predetermined pattern comprises at least two patterns corresponding to upper and lower surfaces of the original.

5. An image processing apparatus for controlling output of visible component data corresponding to an original in accordance with infrared reflected light detected from the original, comprising:

detecting means for detecting the presence or absence on the original of a pattern that performs infrared absorption with respect to the infrared light, on the basis of the infrared reflected light; and control means for determining that the original is a specified original in accordance with the result of the detection by said detecting means, and for controlling the visible component data output in accordance with the determination.

6. An image processing method for detecting patterns of reflected light components of visible light and light other than visible light, which are detected from an image, determining that the image is a specified image, and controlling image processing control, comprising the steps of:

detecting pixels having a reflected light component except for the visible light that has a level lower than a predetermined level;

determining that the image is the specified image in accordance with the number of detected pixels; and controlling the image processing in accordance with said determining step.

7. A method according to claim 6, further comprising the detection step of detecting that the reflected light component of the visible light has a level other than the predetermined level.

8. A method according to claim 7, wherein said determining step comprises performing determination on the basis of a detection result using the reflected light component of the light other than the visible light and a detection result of the reflected light component of the visible light.

9. A method according to claim 6, wherein said controlling step comprises forbidding the visible component data output.

10. A method according to claim 6, further comprising the storage step of storing a predetermined pattern compared with the pattern detected by said detecting means.

11. An image processing apparatus for controlling image processing in accordance with visible reflected light components having a plurality of wavelength components and an infrared reflected light component, the reflected light components being detected from a target image, characterized by comprising:

first detecting means for detecting the visible reflected light components having the plurality of wavelength components on an entire image a plurality of times;

second detecting means for detecting the infrared reflected light component on the entire image in association with every detection of said first detecting means;

determining means for determining that the target image is a predetermined image in accordance with detection results of said first and second detecting means; and control means for controlling the image processing in accordance with a determination result of said determining means.

12. An apparatus according to claim 11, wherein the plurality of wavelength components are R, G, and B components.

13. An apparatus according to claim 11, wherein said first and second detecting means are formed on the same substrate.

14. An apparatus according to claim 11, wherein said control means forbids the visible component data output.

15. An apparatus according to claim 11, further comprising storage means for storing a predetermined pattern compared with the pattern detected by said detecting means.

16. An apparatus according to claim 11, wherein the image processing is image formation.

17. An image processing apparatus for controlling image processing in accordance with reflected light except for visible light detected from an image, comprising:

a plurality of detecting means for detecting the reflected light except for the visible light; and determining means for determining whether the image is a specified image that has a distinguishing infrared characteristic in a predetermined wavelength, in accordance with detection results of said plurality of detecting means, wherein said plurality of detecting means respectively detect a characteristic in the predetermined wavelength, a characteristic in a wavelength shorter than the predetermined wavelength, and a characteristic in a wavelength longer than the predetermined wavelength.

18. An apparatus according to claim 17, wherein the reflected light except for the visible light is an infrared ray.

19. An apparatus according to claim 17, wherein said determining means performs determination in accordance with a combination of outputs of the plurality of wavelength components.

20. An apparatus according to claim 17, wherein the image processing is image formation.

21. An image processing method for controlling output of visible component data corresponding to an original in accordance with infrared reflected light detected from the original, comprising the steps of:

detecting the presence or absence of a pattern formed on the original on the basis of the infrared reflected light; and determining that the original is a specified original in accordance with the result of said detecting step, and controlling the visible component data output in accordance with said determining.

22. An image processing method for controlling image processing in accordance with visible reflected light components having a plurality of wavelength components and an infrared reflected light component, the reflected light components being detected from a target image, characterized by comprising the steps of:

detecting the visible reflected light components having the plurality of wavelength components on an entire image a plurality of times;

detecting the infrared reflected light component on the entire image in association with every detection of said first detecting;

determining that the target image is a predetermined image in accordance with detection results of said first and second detecting step; and control means for controlling the image processing in accordance with a determination result of said determining step.

* * * * *

UNITED STATES PATENT AND TRADEMARK OFFICE
CERTIFICATE OF CORRECTION

PATENT NO. : 5,481,334
DATED : January 2, 1996
INVENTOR(S) : Shinobu ARIMOTO, et al.

It is certified that error appears in the above-indentified patent and that said Letters Patent is hereby corrected as shown below:

On drawing sheet:

SHEET 34 of THE DRAWINGS:

"CRAMP" should read --CLAMP--.

COLUMN 2:

Line 41, "flow chart" should read --flowchart--.
Line 43, "flow chart" should read --flowchart--.

COLUMN 3:

Line 58, "<First Embodiment>" should read --First Embodiment--.

COLUMN 6:

Line 5, "Junction" should read --junction--.
Line 10, "Junction," should read --junction,--.

UNITED STATES PATENT AND TRADEMARK OFFICE
CERTIFICATE OF CORRECTION

PATENT NO.  : 5,481,334
DATED       : January 2, 1996
INVENTOR(S) : Shinobu ARIMOTO, et al.

It is certified that error appears in the above-indentified patent and that said Letters Patent is hereby corrected as shown below:

COLUMN 10:

Line 4, "image" should read --image- --.

COLUMN 13:

Line 17, "Position data" should read --position data--.
    Line 27, "Position data" should read --position data--.

COLUMN 14:

Line 40, "cur" should read --cut--.

COLUMN 15:

Line 3, "Gate" should read --gate--.
    Line 53, (Close up right margin).

COLUMN 17:

Line 17, "P(i,J)" should read --P(i,j)--.
    Line 19, "similarly" should read --similar--.
    Line 62, "<Second Embodiment>" should read --Second Embodiment--.

UNITED STATES PATENT AND TRADEMARK OFFICE
CERTIFICATE OF CORRECTION

PATENT NO. : 5,481,334
DATED : January 2, 1996
INVENTOR(S) : Shinobu ARIMOTO, et al.

It is certified that error appears in the above-indentified patent and that said Letters Patent is hereby corrected as shown below:

<u>COLUMN 18</u>:

Line 7, "General" should read --general--.

<u>COLUMN 19</u>:

Line 38, "<Third Embodiment>" should read --Third Embodiment--.

Signed and Sealed this

Twenty-third Day of July, 1996

BRUCE LEHMAN

*Attest:*

*Attesting Officer*    *Commissioner of Patents and Trademarks*